United States Patent
Adlem et al.

(10) Patent No.: US 11,053,442 B2
(45) Date of Patent: Jul. 6, 2021

(54) LIQUID CRYSTAL MIXTURE AND LIQUID CRYSTAL DISPLAY

(71) Applicant: MERCK PATENT GMBH, Darmstadt (DE)

(72) Inventors: Kevin Adlem, Bournemouth (GB); Alex Davis, Chandlers Ford (GB); Joseph Sargent, Southampton (GB); Ian Charles Sage, Malvern (GB); Edward Plummer, Frankfurt am Main (DE); Izumi Saito, Muehltal (DE); Rocco Fortte, Frankfurt am Main (DE); Helga Haas, Lampertheim (DE); Lars Lietzau, Rossdorf (DE)

(73) Assignee: MERCK PATENT GMBH, Darmstadt (DE)

( * ) Notice: Subject to any disclaimer, the term of this patent is extended or adjusted under 35 U.S.C. 154(b) by 382 days.

(21) Appl. No.: 16/062,824

(22) PCT Filed: Dec. 2, 2016

(86) PCT No.: PCT/EP2016/002035
§ 371 (c)(1),
(2) Date: Jun. 15, 2018

(87) PCT Pub. No.: WO2017/102068
PCT Pub. Date: Jun. 22, 2017

(65) Prior Publication Data
US 2020/0255740 A1    Aug. 13, 2020

(30) Foreign Application Priority Data

Dec. 17, 2015   (EP) .................................. 15200931
Aug. 25, 2016   (EP) .................................. 16185694

(51) Int. Cl.
| | | |
|---|---|---|
| G02F 1/1333 | (2006.01) | |
| C09K 19/56 | (2006.01) | |
| C09K 19/30 | (2006.01) | |
| C09K 19/34 | (2006.01) | |
| G02F 1/1337 | (2006.01) | |
| G02F 1/1341 | (2006.01) | |
| C09K 19/04 | (2006.01) | |

(52) U.S. Cl.
CPC .......... C09K 19/56 (2013.01); C09K 19/3003 (2013.01); C09K 19/3098 (2013.01); C09K 19/3402 (2013.01); G02F 1/1341 (2013.01); G02F 1/133305 (2013.01); G02F 1/133788 (2013.01); C09K 2019/0448 (2013.01); C09K 2019/0466 (2013.01); C09K 2019/301 (2013.01); C09K 2019/3004 (2013.01); C09K 2019/3009 (2013.01); C09K 2019/3016 (2013.01); C09K 2019/3422 (2013.01)

(58) Field of Classification Search
CPC ................ C09K 19/56; C09K 19/3003; C09K 19/3098; C09K 19/3402; C09K 2019/0488; C09K 2019/0466; C09K 2019/3004; C09K 2019/3009; C09K 2019/301; C09K 2019/3016; C09K 2019/3422; G02F 1/1333; G02F 1/1341; G02F 1/133788; G02F 1/133305
USPC ..................................................... 252/299.01
See application file for complete search history.

(56) References Cited

U.S. PATENT DOCUMENTS

| | | |
|---|---|---|
| 5,770,107 A | 6/1998 | Hassall |
| 6,613,245 B1 | 9/2003 | Ohlemacher et al. |
| 6,696,114 B1 * | 2/2004 | Kawatsuki ........ G02F 1/133711 349/123 |
| 9,644,145 B2 * | 5/2017 | Sargent .............. C09K 19/3814 |
| 9,719,017 B2 | 8/2017 | Kurisawa |
| 2005/0227021 A1 | 10/2005 | Harding |
| 2015/0299570 A1 | 10/2015 | Kurisawa |
| 2015/0315469 A1 | 11/2015 | Sudo |

FOREIGN PATENT DOCUMENTS

| | | |
|---|---|---|
| EP | 1524308 A1 | 4/2005 |
| EP | 2843027 A1 | 3/2015 |
| EP | 2933308 A1 | 10/2015 |
| EP | 2955570 A1 | 12/2015 |
| WO | 2000005189 A1 | 2/2000 |

OTHER PUBLICATIONS

International Search Report PCT/EP2016/002035 dated Apr. 26, 2017.
Zande Van Der B M I et al: "Patterned Retarders Prepared by Photoisomerization and Photopolymerization of Liquid Crystalline Films", Liquid Crystals, Taylor & Francis, vol. 33, No. 6, Jun. 1, 2006 (Jun. 1, 2006), pp. 723-737, XP001244939, ISSN: 0267-8292.

* cited by examiner

*Primary Examiner* — Geraldina Visconti
(74) *Attorney, Agent, or Firm* — Millen, White, Zelano and Branigan, P.C.

(57) ABSTRACT

The invention relates to a liquid crystal mixture characterised in that it comprises one or more photoreactive mesogens of formula I

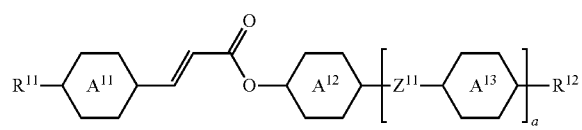

wherein the parameters and groups occurring are defined as indicated in claim 1, to a process for the fabrication of liquid crystal displays using these liquid crystal mixtures and to a liquid crystal display obtainable by this process. The invention further relates to new compounds of formula I.

20 Claims, No Drawings

LIQUID CRYSTAL MIXTURE AND LIQUID CRYSTAL DISPLAY

The invention relates to a liquid crystal mixture comprising a photoreactive mesogen, its use for the fabrication of liquid crystal displays (LCD) with homogeneous alignment, to a process for the fabrication of LCD by photoaligning the liquid crystal mixture after assembly of the display and to the display fabricated by said process.

Liquid-crystalline media have been used for decades in electro-optical displays for the purpose of information display. The liquid crystal displays used at present are usually those of the TN ("twisted nematic") type. However, these have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place. Furthermore, so-called IPS ("in plane switching") displays and later, FFS ("fringe-field switching") displays have been reported (see, inter alia, S. H. Jung et al., Jpn. J. Appl. Phys., Volume 43, No. 3, 2004, 1028), which contain two electrodes on the same substrate, one of which is structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays, but comprise a layer of an LC medium with negative dielectric anisotropy instead of an LC medium with positive dielectric anisotropy. The LC medium with negative dielectric ansiotropy shows a more favourable director orientation that has less tilt and more twist orientation compared to the LC medium with positive dielectric anisotropy, as a result of which these displays have a higher transmission.

A further development are the so-called PS (polymer sustained) or PSA (polymer sustained alignment) displays, for which the term "polymer stabilised" is also occasionally used. The PSA displays are distinguished by the shortening of the response times without significant adverse effects on other parameters, such as, in particular, the favourable viewing-angle dependence of the contrast.

In these displays, a small amount (for example 0.3% by weight, typically <1% by weight) of one or more polymerisable compound(s) is added to the LC medium and, after introduction into the LC cell, is polymerised or crosslinked in situ, usually by UV photopolymerisation, between the electrodes with or without an applied electrical voltage. The addition of polymerisable mesogenic or liquid-crystalline compounds, also known as reactive mesogens or "RMs", to the LC mixture has proven particularly suitable. PSA technology has hitherto been employed principally for LC media having negative dielectric anisotropy.

Unless indicated otherwise, the term "PSA" is used below as representative of PS displays and PSA displays.

In the meantime, the PSA principle is being used in diverse classical LC displays. Thus, for example, PSA-VA, PSA-OCB, PSA-IPS, PSA-FFS and PSA-TN displays are known. The polymerisation of the polymerisable compound(s) preferably takes place with an applied electrical voltage in the case of PSA-VA and PSA-OCB displays, and with or without an applied electrical voltage in the case of PSA-IPS displays. As can be demonstrated in test cells, the PS(A) method results in a 'pretilt' in the cell. In the case of PSA-OCB displays, for example, it is possible for the bend structure to be stabilised so that an offset voltage is unnecessary or can be reduced. In the case of PSA-VA displays, the pretilt has a positive effect on the response times. A standard MVA or PVA pixel and electrode layout can be used for PSA-VA displays. In addition, however, it is also possible, for example, to manage with only one structured electrode side and no protrusions, which significantly simplifies production and at the same time results in very good contrast at the same time as very good light transmission.

PSA-VA displays are described, for example, in JP 10-036847 A, EP 1 170 626 A2, U.S. Pat. Nos. 6,861,107, 7,169,449, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221. PSA-VA-IPS displays are disclosed, for example, in WO 2010/089092 A1.

Like the conventional LC displays described above, PSA displays can be operated as active-matrix or passive-matrix displays. In the case of active-matrix displays, individual pixels are usually addressed by integrated, nonlinear active elements, such as, for example, transistors (for example thin-film transistors or "TFTs"), while in the case of passive-matrix displays, individual pixels are usually addressed by the multiplex method, both methods being known from the prior art.

In the prior art, polymerisable compounds of the following formula, for example, are used for PSA-VA:

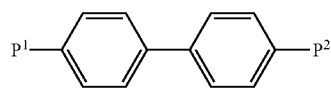

in which P denotes a polymerisable group, usually an acrylate or methacrylate group, as described, for example, in U.S. Pat. No. 7,169,449.

Below the polymer layer which induces the above mentioned pretilt, an orientation layer—usually a polyimide—provides the initial alignment of the liquid crystal regardless of the polymer stabilisation step of the production process.

The effort for the production of a polyimide layer, treatment of the layer and improvement with bumps or polymer layers is relatively great. A simplifying technology which on the one hand reduces production costs and on the other hand helps to optimise the image quality (viewing-angle dependence, contrast, response times) would therefore be desirable. Rubbed polyimide has been used for a long time to align liquid crystals. The rubbing process causes a number of problems: mura, contamination, problems with static discharge, debris, etc.

Photoalignment is a technology for achieving liquid crystal (LC) alignment that avoids rubbing by replacing it with a light-induced orientational ordering of the alignment surface. This can be achieved through the mechanisms of photodecomposition, photodimerization, and photoisomerization (N. A. Clark et al. Langmuir 2010, 26(22), 17482-17488, and literature cited therein) by means of polarised light. However, still a suitably derivatised polyimide layer is required that comprises the photoreactive group. A further improvement would be to avoid the use of polyimide at all. For VA displays this was achieved by adding a self alignment agent to the LC that induces homeotropic alignment in situ by a self assembling mechanism as disclosed in WO 2012/104008 and WO 2012/038026.

N. A. Clark et al. Langmuir 2010, 26(22), 17482-17488 have shown that it is possible to self assemble a compound of the following structure

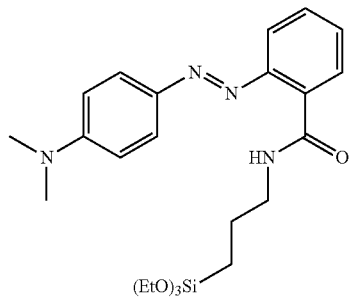

onto a substrate to give a monolayer that is able to be photoaligned to induce homogeneous alignment of a liquid crystal. However, a separate step of self assembly before manufacture of the LC cell is required and the nature of the azo-group causes reversibility of the alignment when exposed to light.

Another functional group known to enable photoalignment is the phenylethenylcarbonyloxy group (cinnamate). Photocrosslinkable cinnamates are known from the prior art, e.g. of the following structure

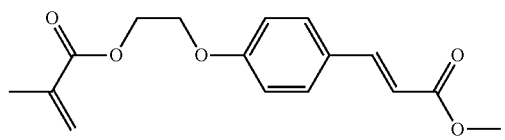 [SMILES: C=C(C)C(=O)OCCOc1ccc(/C=C/C(=O)OC)cc1]

as disclosed in EP0763552. From such compounds, polymers can be obtained, for example the following

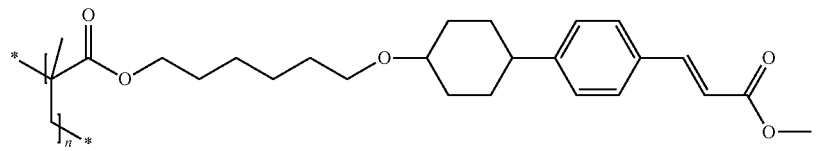

This material was used in a photoalignment process, as disclosed in WO 99/49360, to give an orientation layer for liquid crystals. A disadvantage of orientation layers obtained by this process is that they give lower voltage holding ratios (VHR) than polyimides.

In WO 00/05189 polymerisable direactive mesogenic cinnamates are disclosed for the use in polymerisable LC mixtures for e.g. optical retarders.

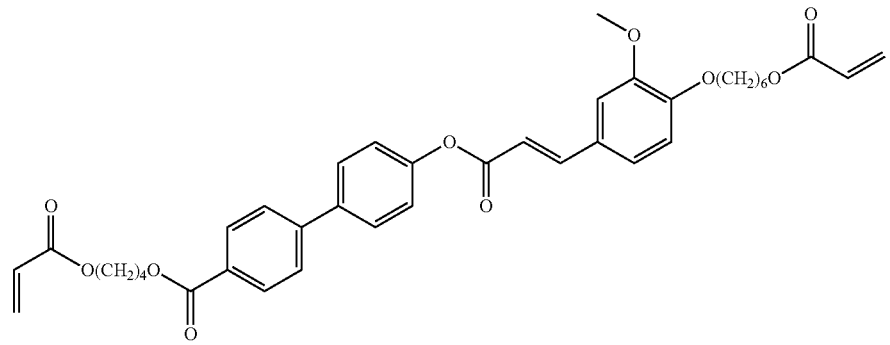

A structurally related compound of the following formula

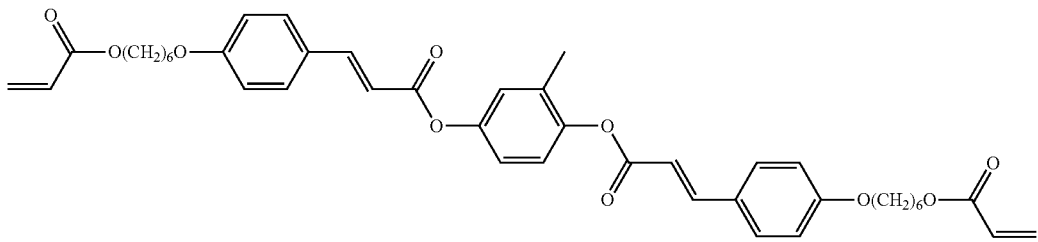

comprising two cinnamic acid moieties is disclosed in GB 2 306 470 A for the use as component in liquid crystalline polymer films. This type of compound has not been used or proposed for the use as photoalignment agent.

A very similar compound is published in B. M. I. van der Zande et al., Liquid Crystals, Vol. 33, No. 6, June 2006, 723-737, in the field of liquid crystalline polymers for patterned retarders, and has the following structure:

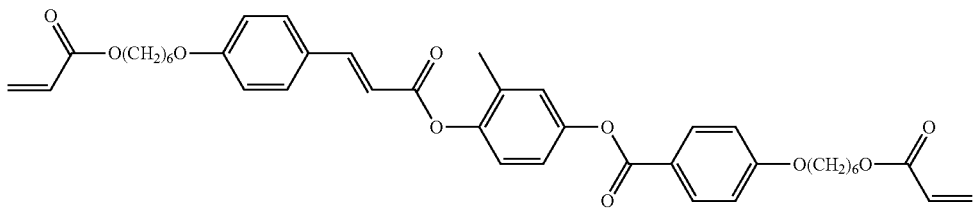

Object of the present invention is to provide a process for the fabrication of liquid crystal displays with planar alignment, whilst avoiding the rubbing process. The process may be useable without polyimide on the bottom and top substrates, with polymide on one substrate only, or with polyimide on both substrates, thus avoiding the problems involved with the rubbing process and offering to facilitate the simplification of the production process significantly.

Surprisingly it was found that it is possible to manufacture a liquid crystal display without a polyimide alignment layer by using a liquid crystal mixture comprising a photoreactive mesogen that enables photoalignment of the liquid crystal in situ, i.e. after assembly of the display, by means of linearly polarised light.

Therefore, the present invention relates to liquid crystal mixtures comprising a photoalignment component A) comprising one or more photoreactive mesogens of formula I below, and a liquid-crystalline component B), hereinafter also referred to as "LC host mixture", comprising one or more mesogenic or liquid-crystalline compounds, wherein formula I is as follows:

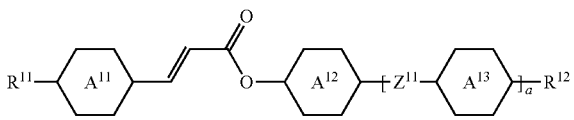

wherein
$A^{11}$ denotes an aryl or heteroaryl group, which may be substituted by one or more radicals L, $A^{12}$, $A^{13}$ are each, independently of one another, defined like $A^{11}$ or denote a cycloalkyl group having 3 to 10 C atoms, in which 1 to 4 non-adjacent $CH_2$ groups may be replaced by O and in which one or more H atoms may be replaced by a group L, L on each occurrence, identically or differently, denotes OH, F, Cl, Br, I, —CN, —$NO_2$, $SF_5$, —NCO, —NCS, —OCN, —SCN, —C(=O)N($R^z$)$_2$, —C(=O)$R^z$, —N($R^z$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, $Z^{11}$ on each occurrence, identically or differently, denotes —$CH_2CH_2$—, —$CF_2CF_2$—, —$CF_2CH_2$—, —$CH_2CF_2$—, —C(O)O—, —OC(O)—, —CH=CH—COO—, —OCO—CH=CH—, or a single bond,
preferably —C(O)O—, —OC(O)—, —CH=CH—C(O)O—, —O(O)C—CH=CH—, —$CH_2CH_2$— or a single bond, $R^{11}$ and $R^{12}$ identically or differently, denote a group P-Sp-, or halogen, CN, optionally fluorinated alkyl or alkenyl with up to 15 C atoms in which one or more non adjacent $CH_2$-groups may be replaced by —O—, —S—, —CO—, —C(O)O—, —O—C(O)—, O—C(O)—O—, with the proviso that at least one of $R^{11}$ and $R^{12}$ denotes a group P-Sp-, preferably both of $R^{11}$ and $R^{12}$ denote P-Sp-, $R^z$ each, independently of one another, denote H or alkyl having 1-12 C atoms,
P a polymerisable group,
Sp a spacer group or a single bond,
a is 0 or 1.

The present invention further relates to a process for the fabrication of liquid crystal displays comprising at least the steps of:
providing a first substrate which includes a pixel electrode and a common electrode for generating an electric field substantially parallel to a surface of the first substrate in the pixel region;

providing a second substrate, the second substrate being disposed opposite to the first substrate;
interposing a liquid crystal mixture between the first substrate and the second substrate, the liquid crystal mixture comprising component A), component B) and optionally component C);
irradiating the liquid crystal mixture with linearly polarised light causing photoalignment of the liquid crystal;
curing the polymerisable compounds of the liquid crystal mixture by irradiation with ultraviolet light or visible light having a wavelength of 450 nm or below.

The present invention further relates to the use of the liquid crystal mixtures according to the invention for the fabrication of a liquid crystal display.

The present invention further relates to liquid crystal displays fabricated by the process described above.

The invention further relates to a compound of formula I above, wherein one or both of the groups Sp denote a single bond.

A photoreactive group according to the present invention is a functional group of a molecule that causes a change of the geometry of the molecule either by bond rotation, skeletal rearrangement or atom- or group-transfer, or by dimerisation, upon irradiation with light of a suitable wavelength that can be absorbed by the molecule.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

A photoreactive mesogen according to the present invention is a mesogenic compound comprising one or more photoreactive groups. Examples of photoreactive groups are —C=C— double bonds and azo groups (—N=N—).

Examples of molecular structures and sub-structures comprising such photoreactive groups are stilbene, (1,2-difluoro-2-phenyl-vinyl)-benzene, cinnamate, 4-phenylbut-3-en-2-one, chalcone, coumarin, chromone, pentalenone and azobenzene.

According to the present application, the term "linearly polarised light" means light, which is at least partially linearly polarized. Preferably, the aligning light is linearly polarized with a degree of polarization of more than 5:1. Wavelengths, intensity and energy of the linearly polarised light are chosen depending on the photosensitivity of the photoalignable material. Typically, the wavelengths are in the UV-A, UV-B and/or UV-C range or in the visible range. Preferably, the linearly polarised light comprises light of wavelengths less than 450 nm, more preferably less than 420 nm.

The term "organic group" denotes a carbon or hydrocarbon group.

The term "carbon group" denotes a mono- or polyvalent organic group containing at least one carbon atom, where this either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group.

Unsaturated groups are, for example, aryl, alkenyl or alkynyl groups. A carbon or hydrocarbon radical having 3 or more atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one more non-adjacent $CH_2$ groups may each be replaced, independently of one another, by —C($R^z$)=C($R^z$)—, —C≡C—, —N($R^z$)—, —O—, —S—, —CO—, —CO—O—, —O—CO—, —O—CO—O— in such a way that O and/or S atoms are not linked directly to one another.

$R^z$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO— or —O—CO—O— and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, trifluoromethyl, perfluoro-n-butyl, 2,2,2-trifluoroethyl, perfluorooctyl and perfluorohexyl.

Preferred alkenyl groups are, for example, ethenyl, propenyl, butenyl, pentenyl, cyclopentenyl, hexenyl, cyclohexenyl, heptenyl, cycloheptenyl, octenyl and cyclooctenyl.

Preferred alkynyl groups are, for example, ethynyl, propynyl, butynyl, pentynyl, hexynyl and octynyl.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy and n-dodecoxy.

Preferred amino groups are, for example, dimethylamino, methylamino, methylphenylamino and phenylamino.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se. A ring system of this type may also contain individual non-conjugated units, as is the case, for example, in the fluorene basic structure.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are derived, for example, from the parent structures benzene, biphenyl, terphenyl, [1,1':3',1"]terphenyl, naphthalene, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dihydrothieno [3,4-b]-1,4-dioxin, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent CH$_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, and electron-withdrawing groups, such as fluorine, nitro or nitrile.

Preferred substituents, also referred to as "L" above and below, are F, Cl, Br, I, —CN, —NO$_2$, —NCO, —NCS, —OCN, —SCN, —C(=O)N(R$^z$)$_2$, —C(=O)Y$^1$, —C(=O)R$^z$, —N(R$^z$)$_2$, in which R$^z$ has the meaning indicated above, and Y$^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, preferably 2 to 12, in which one or more H atoms may optionally be replaced by F or Cl.

"Substituted silyl or aryl" preferably means substituted by halogen, —CN, R$^{y1}$, —OR$^{y1}$, —CO—R$^{y1}$, —CO—O—R$^{y1}$, —O—CO—R$^{y1}$ or —O—CO—O—R$^{y1}$, in which R$^{y1}$ has the meaning indicated above.

Particularly preferred substituents L are, for example, F, Cl, CN, CH$_3$, C$_2$H$_5$, —CH(CH$_3$)$_2$, OCH$_3$, OC$_2$H$_5$, CF$_3$, OCF$_3$, OCHF$_2$, OC$_2$F$_5$, furthermore phenyl.

In a preferred embodiment, the liquid crystal mixture according to the present invention further comprises a polymerisable component C) comprising one or more polymerisable compounds of formula P

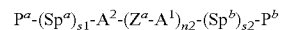

$$P^a\text{-}(Sp^a)_{s1}\text{-}A^2\text{-}(Z^a\text{-}A^1)_{n2}\text{-}(Sp^b)_{s2}\text{-}P^b \qquad P$$

wherein the individual radicals have the following meanings:

P$^a$, P$^b$ each, independently of one another, denote a polymerisable group,

Sp$^a$, Sp$^b$ on each occurrence, identically or differently, denote a spacer group, s1, s2 each, independently of one another, denote 0 or 1, A$^1$, A$^2$ each, independently of one another, denote a radical selected from the following groups:

a) the group consisting of trans-1,4-cyclohexylene, 1,4-cyclohexenylene and 4,4'-bicyclohexylene, wherein, in addition, one or more non-adjacent CH$_2$ groups may be replaced by —O— and/or —S— and wherein, in addition, one or more H atoms may be replaced by F, b) the group consisting of 1,4-phenylene and 1,3-phenylene, wherein, in addition, one or two CH groups may be replaced by N and wherein, in addition, one or more H atoms may be replaced by L,
c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L,
d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of

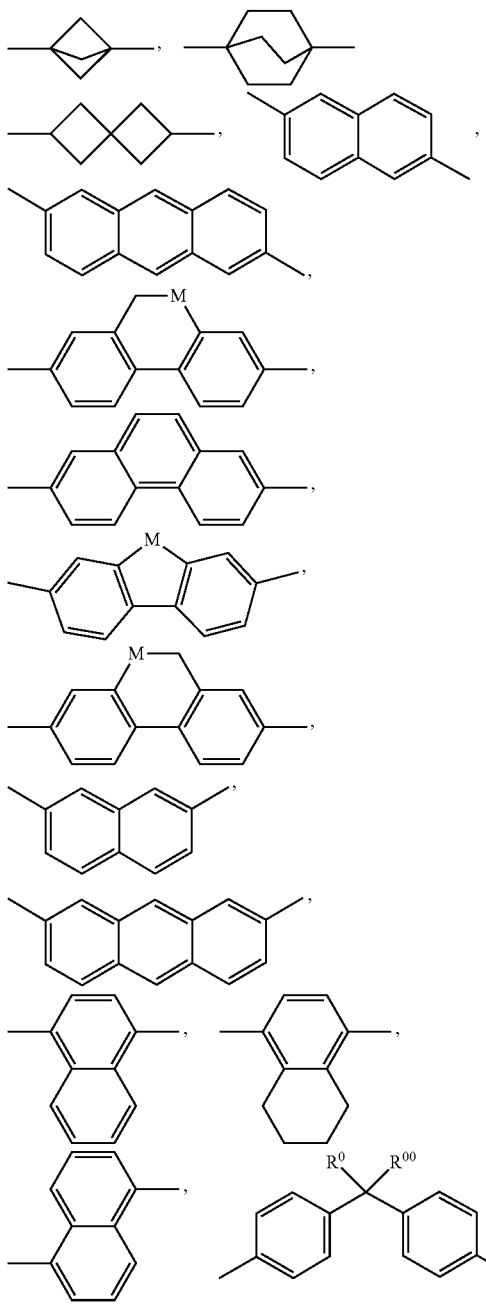

where, in addition, one or more H atoms in these radicals may be replaced by L, and/or one or more double bonds may be replaced by single bonds, and/or one or more CH groups may be replaced by N, n2 denotes 0, 1, 2 or 3, $Z^a$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^y$R$^z$)—, —CH$_2$CF$_2$—, —CF$_2$CF$_2$— or a single bond, L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, R$^y$, R$^z$ each, independently of one another, denote H, F or straight-chain or branched alkyl having 1 to 12 C atoms, wherein, in addition, one or more H atoms may be replaced by F, M denotes —O—, —S—, —CH$_2$—, —CHY$^1$— or —CY$^1$Y$^2$—, and Y$^1$ and Y$^2$ each, independently of one another, have one of the meanings indicated above for R$^y$ or denote Cl or CN.

The polymerisable groups P and P$^{a,b}$ are groups that are suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P and P$^{a,b}$ are selected from the group consisting of CH$_2$=CW$^1$—CO—O—, CH$_2$=CW$^1$—CO—,

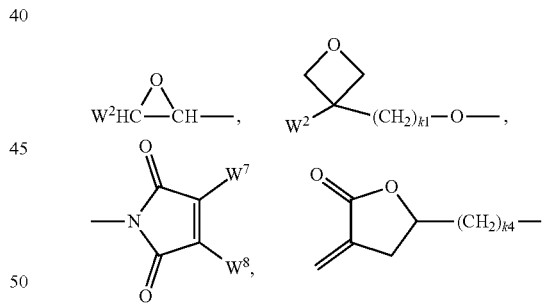

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, wherein W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W[8] each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups P and $P^{a,b}$ are selected from the group consisting of $CH_2$=$CW^1$—CO—O—, in particular $CH_2$=CH—CO—O—, $CH_2$=$C(CH_3)$—CO—O— and $CH_2$=CF—CO—O—, furthermore $CH_2$=CH—O—, $(CH_2$=$CH)_2$CH—O—CO—, $(CH_2$=$CH)_2$CH—O—,

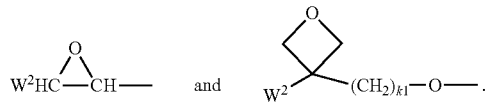

Very particularly preferred groups P and $P^{a,b}$ are selected from the group consisting of acrylate, methacrylate, fluoroacrylate, furthermore vinyloxy, chloroacrylate, oxetane and epoxide groups, and of these preferably an acrylate or methacrylate group.

Preferred spacer groups Sp and $Sp^{a,b}$ are selected from the formula Sp"-X", so that the radicals P-Sp- and $P^{a/b}$-$Sp^{a/b}$- conforms to the formulae P-Sp"-X"— and $P^{a/b}$-Sp"-X"—, respectively, wherein Sp" denotes alkylene having 1 to 20, preferably 1 to 12, C atoms, which is optionally mono- or polysubstituted by F, Cl, Br, I or CN and wherein, in addition, one or more non-adjacent $CH_2$ groups may each be replaced, independently of one another, by —O—, —S—, —NH—, —N($R^0$)—, —Si($R^{00}R^{000}$)—, —CO—, —CO—O—, —O—CO—, —O—CO—O—, —S—CO—, —CO—S—, —N($R^{00}$)—CO—O—, —O—CO—N($R^{00}$)—, —N($R^{00}$)—CO—N($R^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N($R^{00}$)—, —N($R^{00}$)—CO—, —N($R^{00}$)—CO—N($R^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^3$=CY$^4$—, —C≡C—, —CH=CH—CO—O—, —O—CO—CH=CH— or a single bond, $R^0$, $R^{00}$ and $R^{000}$ each, independently of one another, denote H or alkyl having 1 to 12 C atoms, and $Y^3$ and $Y^4$ each, identically or differently, denote H, F, Cl or CN.

X" is preferably —O—, —S—, —CO—, —C(O)O—, —OC(O)—, —O—C(O)O—, —CO—NR$^0$—, —NR$^0$—CO—, —NR$^0$—CO—NR$^0$— or a single bond.

Typical spacer groups Sp" are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, wherein p1 is an integer from 1 to 12, q1 is an integer from 1 to 3, and $R^{00}$ and $R^{000}$ have the meanings indicated above.

Particularly preferred groups -Sp"-X"— are —(CH$_2$)$_{p1}$—, —(CH$_2$)$_{p1}$—O, —(CH$_2$)$_{p1}$—O—CO—, —(CH$_2$)$_{p1}$—O—CO—O—, wherein p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

The compounds of formula I are preferably selected from compounds of the sub-formulae I-1 to I-8.

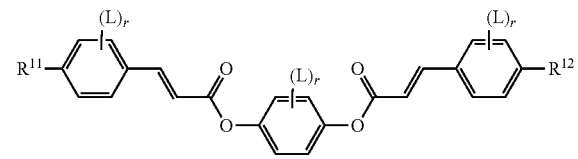

I-1

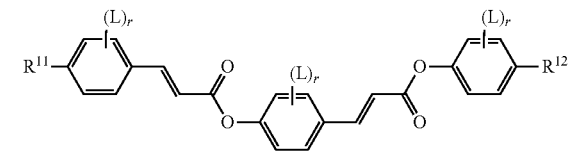

I-2

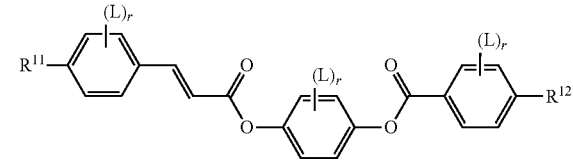

I-3

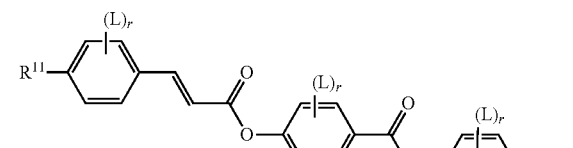

I-4

I-5

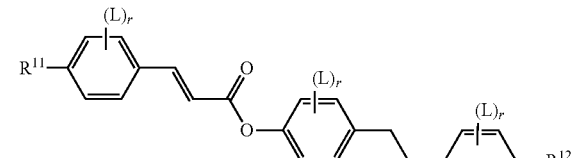

I-6

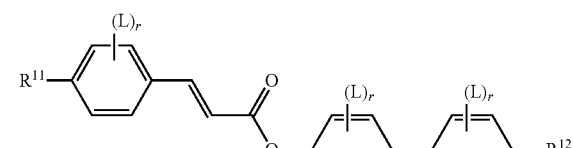

-continued

I-7

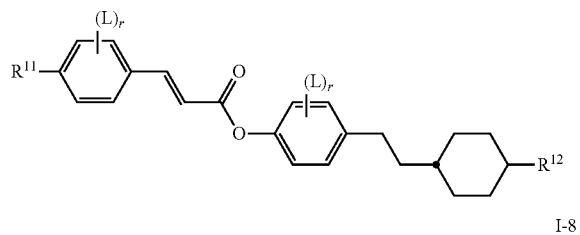

I-8

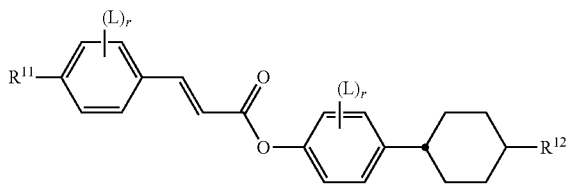

wherein $R^{11}$ and $R^{12}$ and L are defined as indicated above and r, on each occurrence, identically or differently, is 0, 1 or 2.

The group

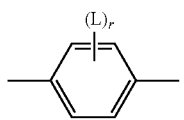

preferably denotes

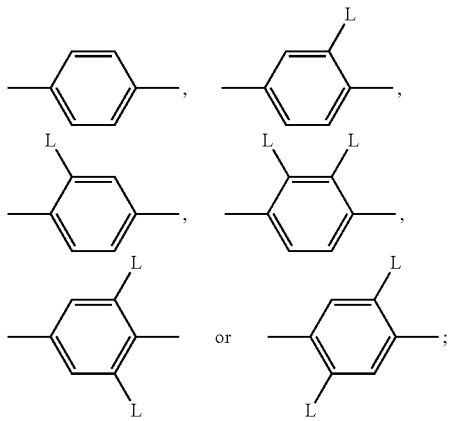

particularly preferably

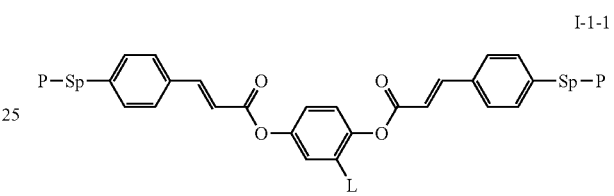

wherein L has the meaning indicated above and preferably denotes alkyl or alkoxy having 1 to 8 C atoms, halogen or CN.

Particularly preferred compounds of formula I are selected from sub-formulae I-1-1, I-3-1 and I-3-2

I-1-1

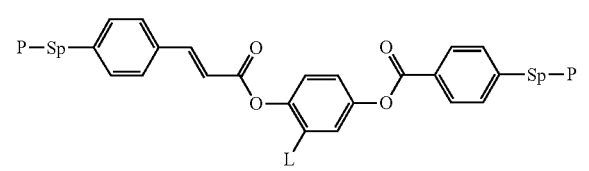

I-3-1

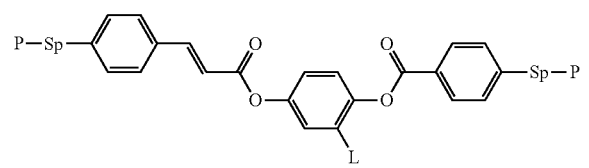

I-3-2

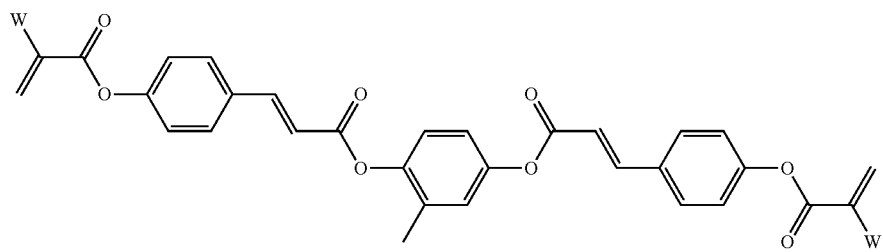

wherein the groups occurring have the meanings indicated above and preferably
L denotes alkyl or alkoxy having 1 to 6 C atoms, Cl, or F, particularly preferably $CH_3$ or $C_2H_5$,
P denotes, identically or differently, acrylate or methacrylate,
Sp denotes, identically or differently, $(CH_2)_t$, $-O(CH_2)_t$, or a single bond, and
t is an integer from 2 to 12, preferably from 2 to 8.

Preferred compounds of formulae I-1-1, I-3-1 and I-3-2 are compounds of the following sub-formulae:

I-1-1a

-continued
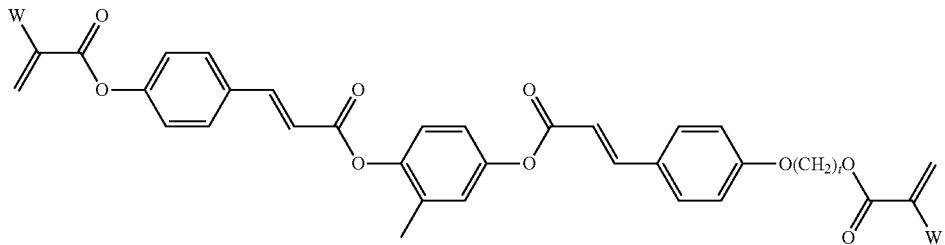
I-1-1b
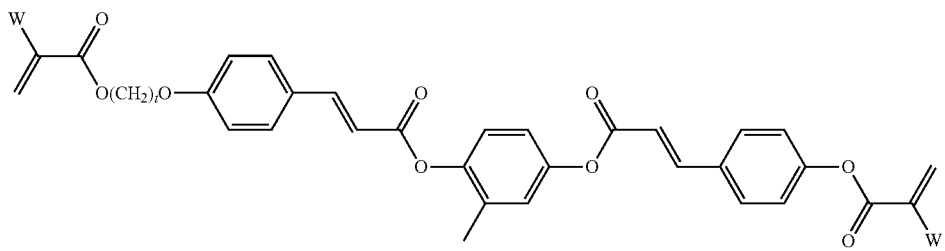
I-1-1c
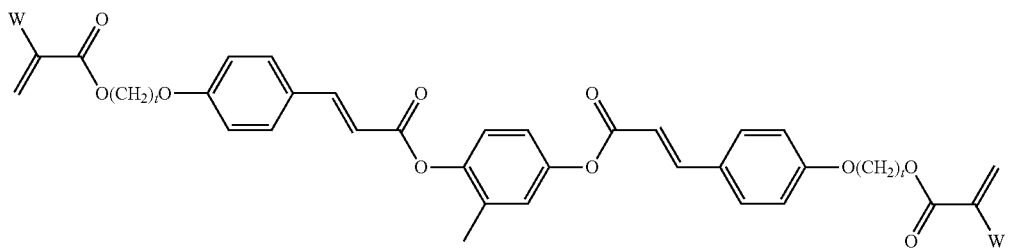
I-1-1d
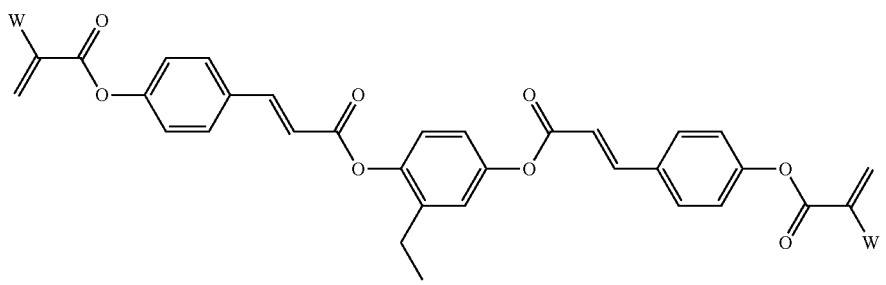
I-1-1a
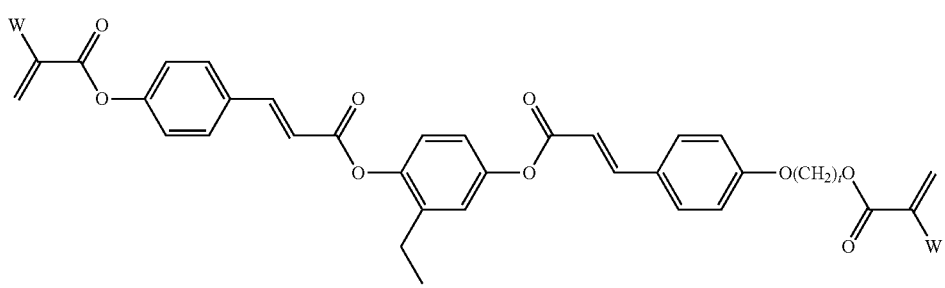
I-1-1f
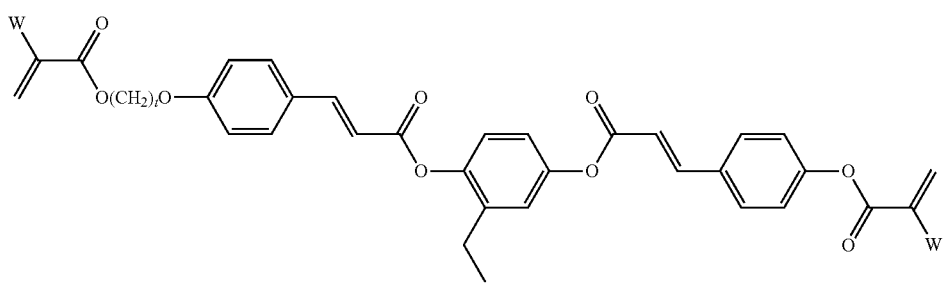
I-1-1g -continued
I-1-1h
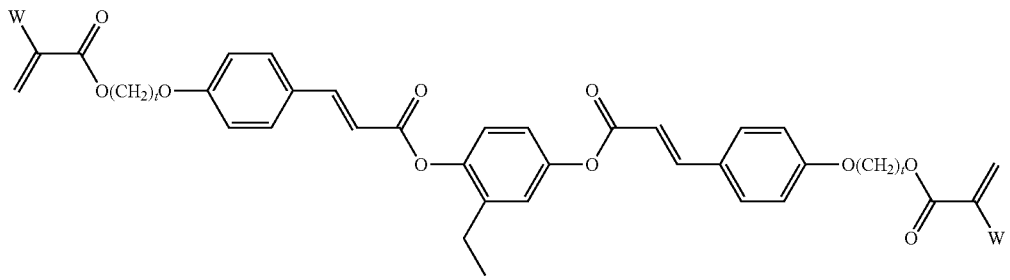
I-3-1a
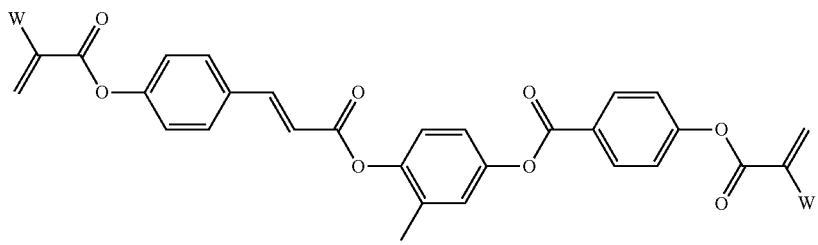
I-3-1b
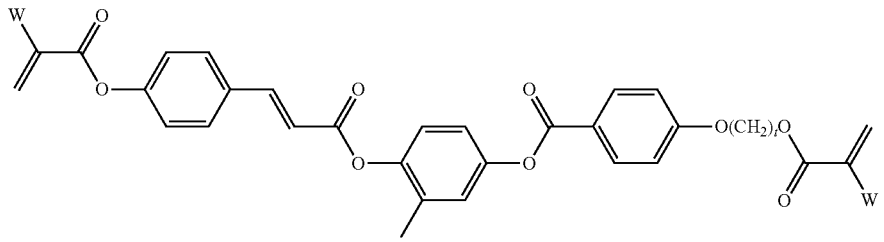
I-3-1c
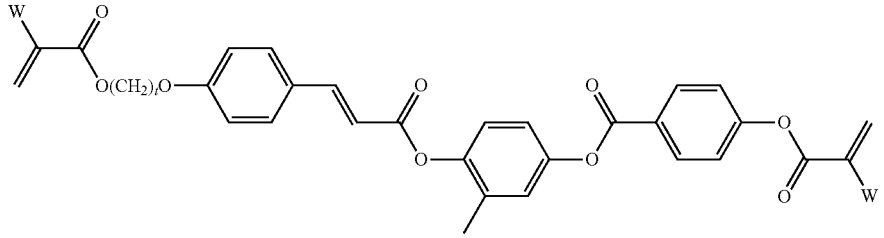
I-3-1d
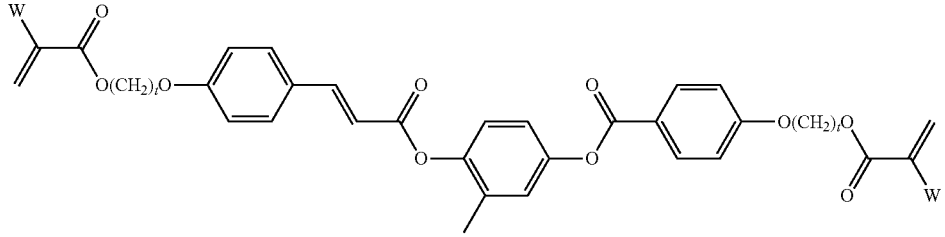
I-3-1a
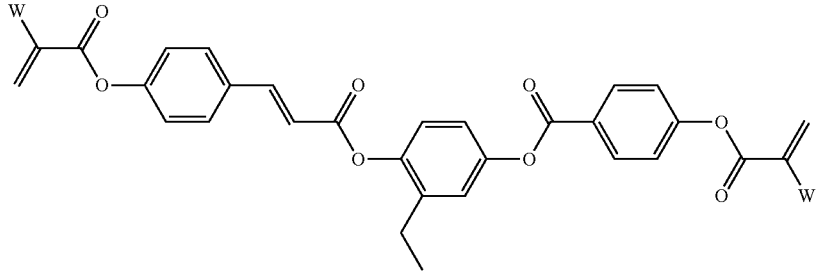

-continued
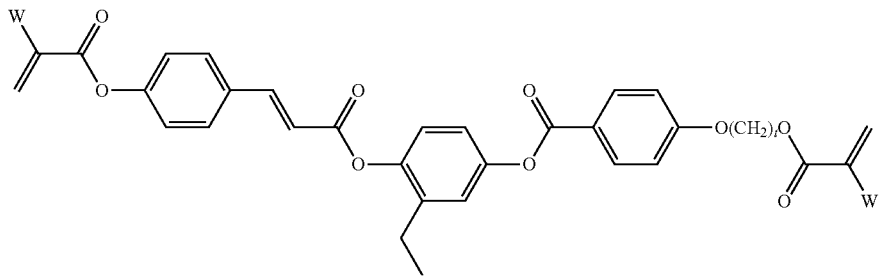
I-3-1b
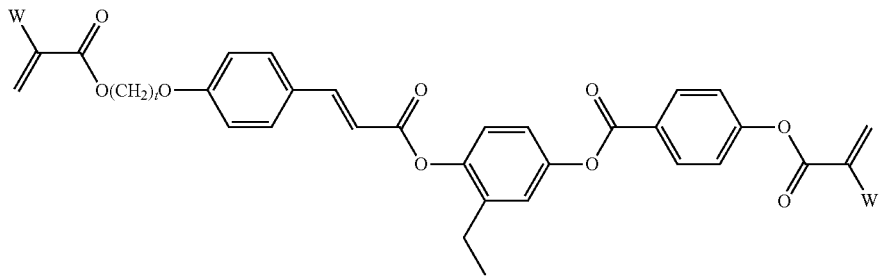
I-3-1c
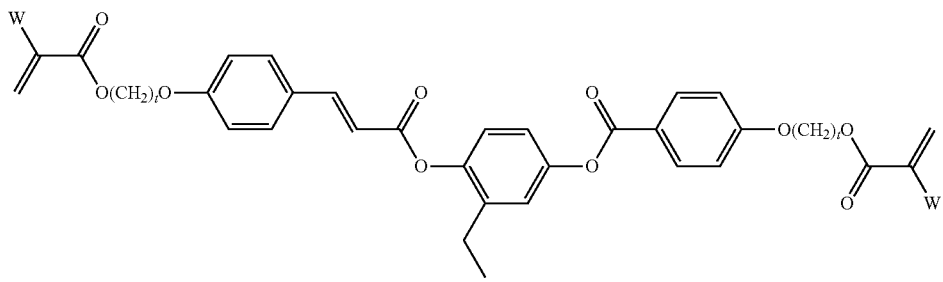
I-3-1d
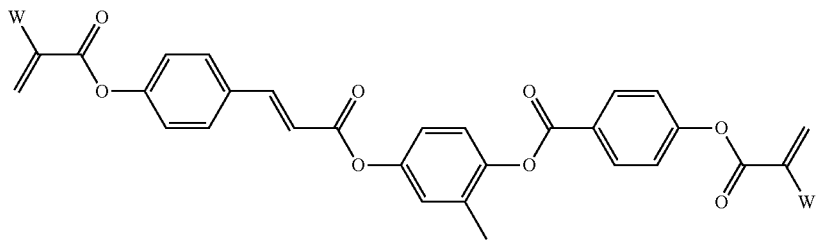
I-3-1a
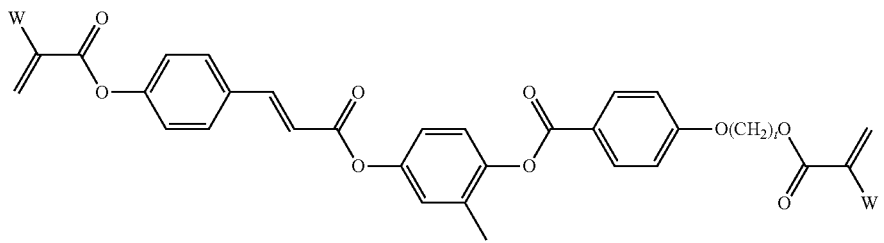
I-3-1b
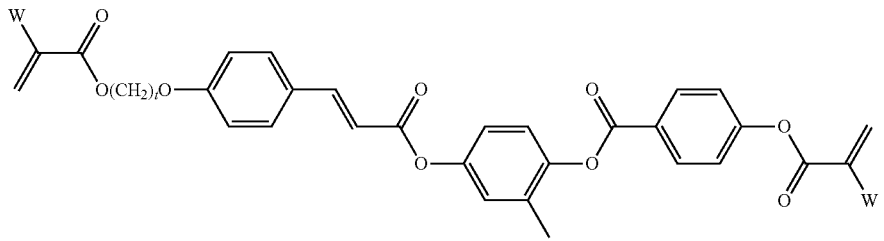
I-3-1c -continued
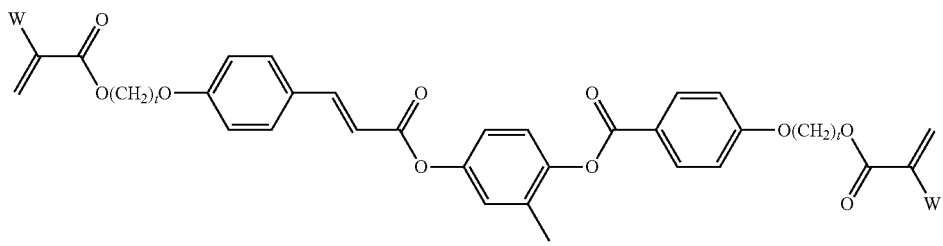
I-3-1d
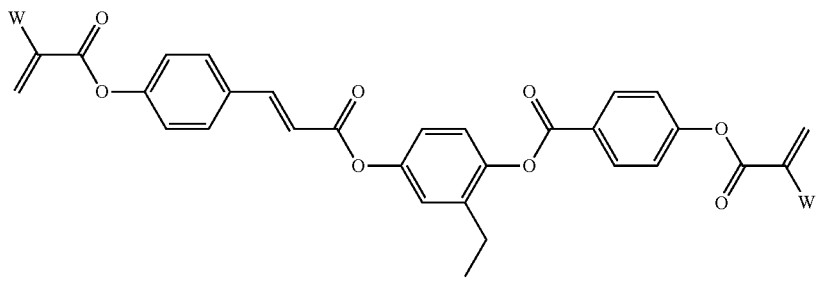
I-3-1a
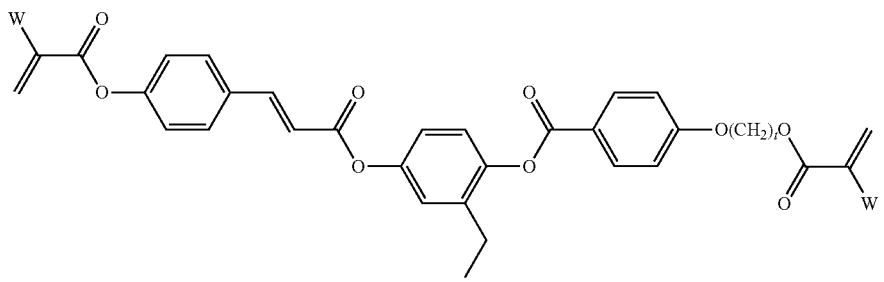
I-3-1b
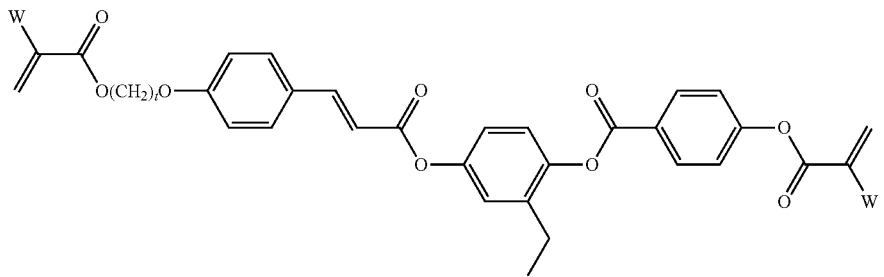
I-3-1c
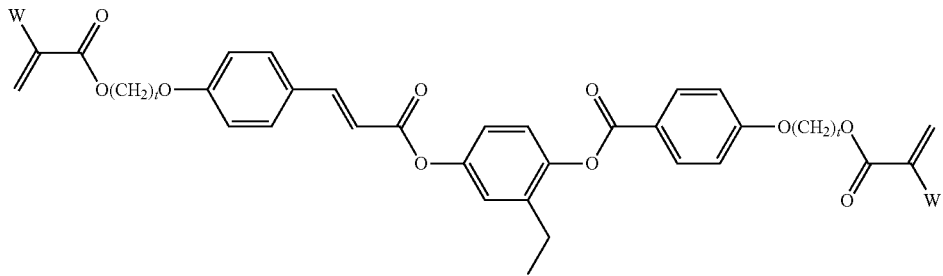
I-3-1d
wherein W denotes H or $CH_3$ and t is an integer from 2 to 8.

Particularly preferred monomers of formula P are the following:
P1
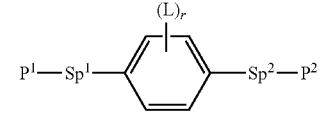
P2
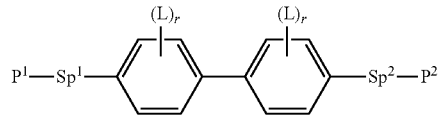
P3
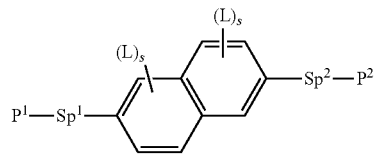
P4
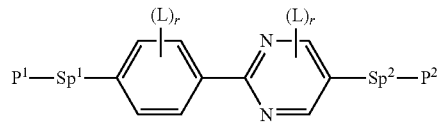
P5
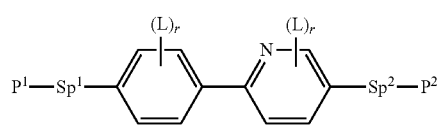
P6
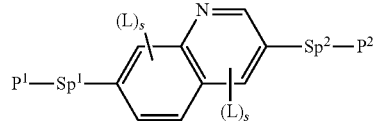
P7
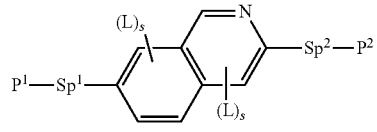
P8
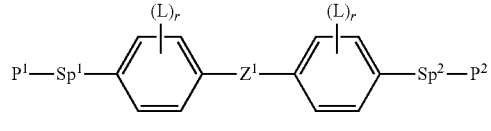
P9
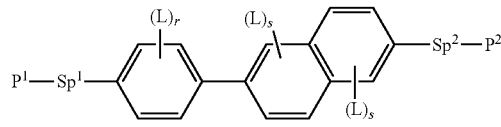
P10
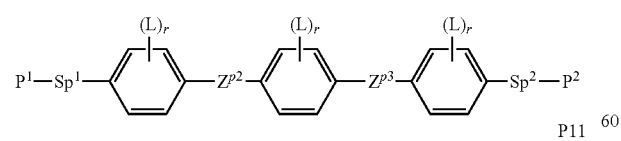
P11
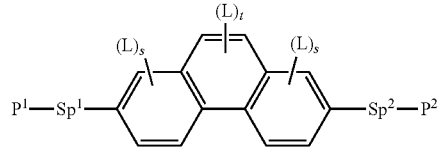
P12
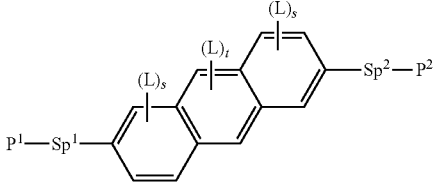
P13
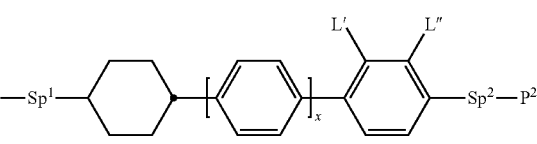
P14
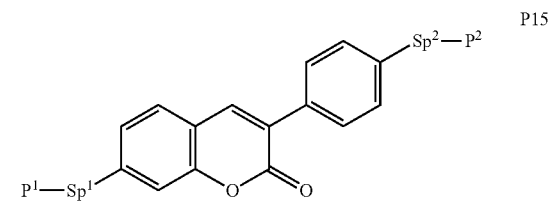
P15
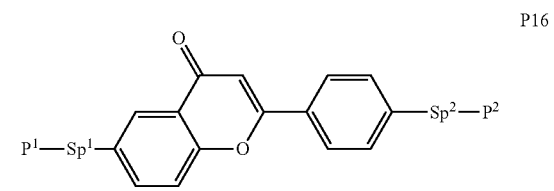
P16
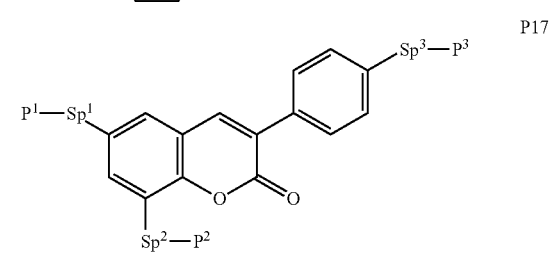
P17
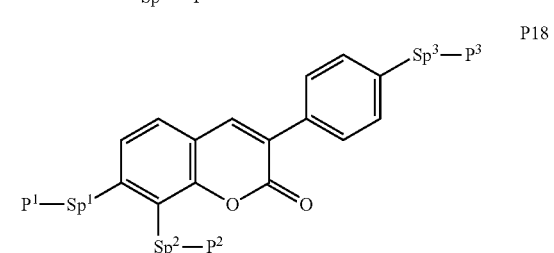
P18
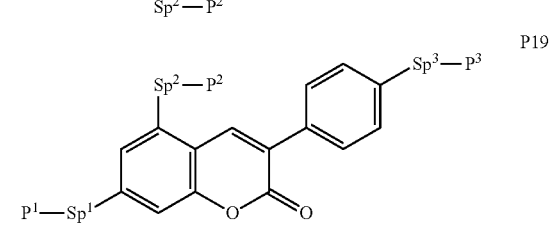
P19

-continued

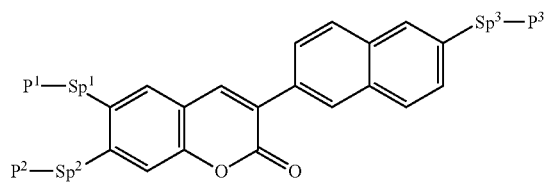
P20

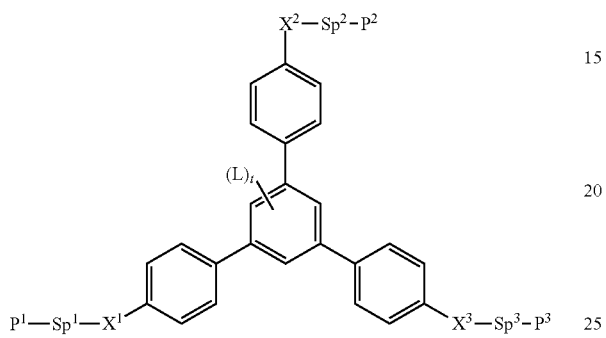
P21

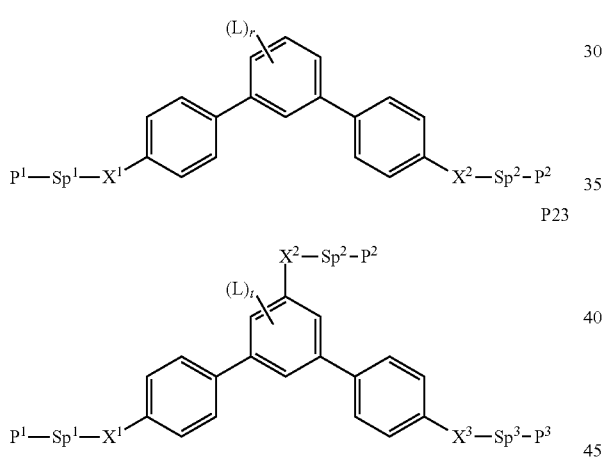
P22
P23

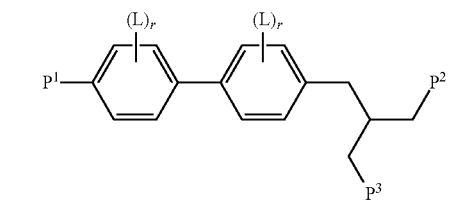
P24

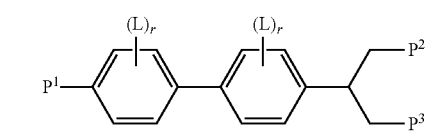
P25

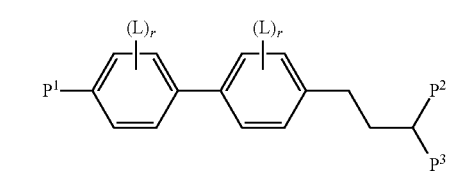
P26

-continued

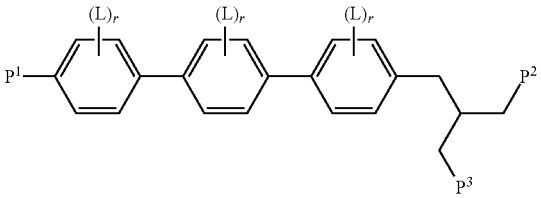
P27

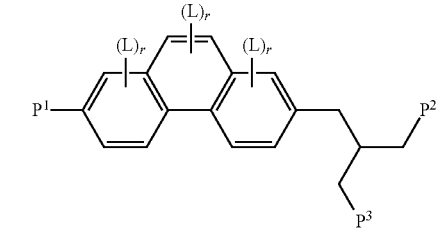
P28

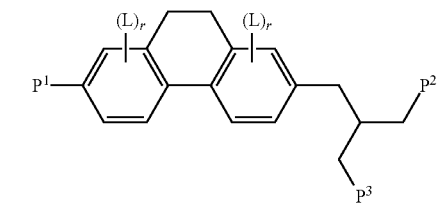
P29

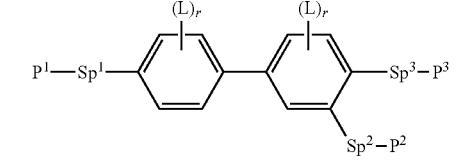
P30

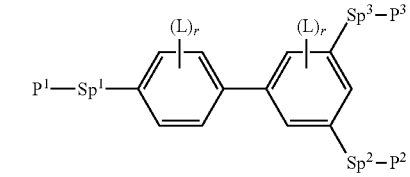
P31 wherein the individual radicals have the following meanings:

$P^1$ to $P^3$ each, independently of one another, denote a polymerisable group as defined for formula P, preferably an acrylate, methacrylate, fluoroacrylate, oxetane, vinyloxy or epoxide group, $Sp^1$ to $Sp^3$ each, independently of one another, denote a single bond or a spacer group, preferably having one of the meanings indicated above and below for $Sp^a$, and particularly preferably —$(CH_2)_{p1}$—, —$(CH_2)_{p1}$—O—, —$(CH_2)_{p1}$—CO—O— or —$(CH_2)_{p1}$—O—CO—O—, wherein p1 is an integer from 1 to 12, and where the linking to the adjacent ring in the last-mentioned groups takes place via the O atom, where, in addition, one or more of the radicals $P^1$-$Sp^1$-, $P^2$—$Sp^2$- and $P^3$—$Sp^3$- may denote a radical $R^{aa}$, with the proviso that at least one of the radicals $P^1$-$Sp^1$-, $P^2$—$Sp^2$- and $P^3$—$Sp^3$- present does not denote $R^{aa}$, $R^{aa}$ denotes H, F, Cl, CN or straight-chain or branched alkyl having 1 to 25 C atoms, wherein, in addition, one or more non-adjacent $CH_2$ groups may each be replaced, independently of one another, by $C(R^0)$=$C(R^{00})$—, —C≡C—, —N($R^0$)—, —O—, —S—, —CO—, —CO—O—, —OCO—, —O—CO—O— in such a way that O and/or S atoms are not linked directly to one another, and wherein, in addition, one or more H atoms may be replaced by F, Cl, CN or $P^1$—$Sp^1$-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), $R^0$, $R^{00}$ each, independently of one another, denote H or alkyl having 1 to 12 C atoms, $R^y$ and $R^z$ each, independently of one another, denote H, F, $CH_3$ or $CF_3$, $Z^{p1}$ denotes —O—, —CO—, —C($R^yR^z$)— or —$CF_2CF_2$—, $Z^{p2}$ and $Z^{p3}$ each, independently of one another, denote —CO—, —O—CO—, —$CH_2O$—, —$OCH_2$—, —$CF_2O$—, —$OCF_2$— or —$(CH_2)_{n3}$—, where n3 is 2, 3 or 4, L on each occurrence, identically or differently, denotes F, Cl, CN, SCN, $SF_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, and x denotes 0 or 1.

In a particularly preferred embodiment of the present invention the LC mixture, or component C), comprises one or more compounds of formula P10-1.

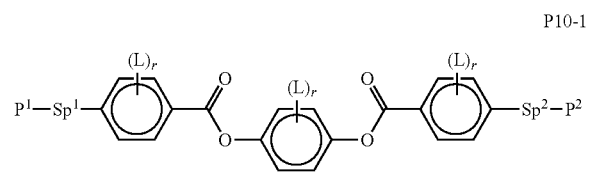

P10-1 wherein the parameters are defined as described above and $P^1$ and $P^2$ preferably denote acrylate or methacrylate.

Particularly preferred compounds of formula P10-1 are selected from the group of the following subformulae The polymerisable compounds of formulae I and P are also suitable for polymerisation without an initiator, which is associated with considerable advantages, such as, for example, lower material costs and, in particular, reduced contamination of the LC medium by possible residual amounts of the initiator or degradation products thereof. The polymerisation can thus also be carried out without addition of an initiator. The LC medium thus, in a preferred embodiment, comprises no polymerisation initiator.

The polymerisable component C) or the LC medium as a whole may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (BASF SE), such as, for example, Irganox® 1076. If stabilisers are employed, their proportion, based on the total amount of the RMs or the polymerisable component, is preferably 10-10,000 ppm, particularly preferably 50-1000 ppm.

In a preferred embodiment, the LC-host mixture (component B) according to the present invention comprises one or more, preferably two or more, low-molecular-weight (i.e. monomeric or unpolymerised) compounds. The latter are stable or unreactive with respect to a polymerisation reaction or photoalignment under the conditions used for the polymerisation of the polymerisable compounds or photoalignment of the photoreactive mesogen of formula I.

In principle, a suitable host mixture is any dielectrically negative or positive LC mixture which is suitable for use in conventional VA, IPS or FFS displays.

Suitable LC mixtures are known to the person skilled in the art and are described in the literature. LC media for VA displays having negative dielectric anisotropy are described in for example EP 1 378 557 A1.

Suitable LC mixtures having positive dielectric anisotropy which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851, WO 96/28 521 and WO2012/079676.

Preferred embodiments of the liquid-crystalline medium having negative or positive dielectric anisotropy according

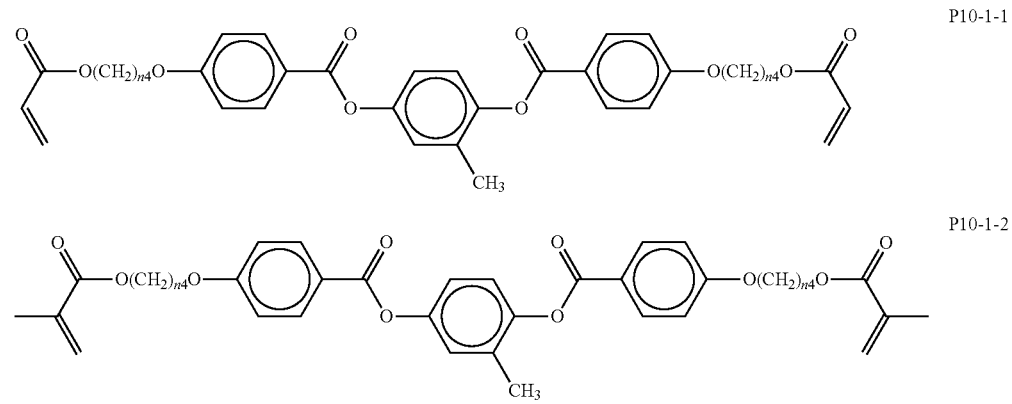

wherein each n4 denote independently of each other an integer between 2 and 10, preferably 3, 4, 5 or 6.

to the invention are indicated below and explained in more detail by means of the working examples.

The LC host mixture is preferably a nematic LC mixture, and preferably does not have a chiral LC phase.

In a preferred embodiment of the present invention the LC medium contains an LC host mixture with negative dielectric anisotropy. Preferred embodiments of such an LC medium, and the corresponding LC host mixture, are those of sections a)-z) below:

a) LC medium which comprises one or more compounds of the formulae CY and/or PY:

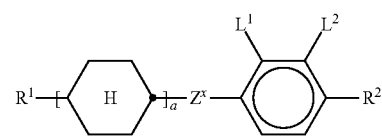

CY

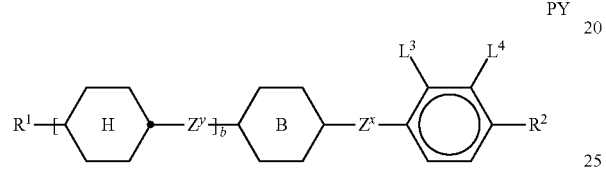

PY wherein
a denotes 1 or 2,
b denotes 0 or 1,

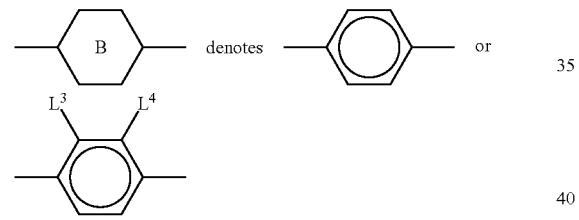

R$^1$ and R$^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms, Z$^x$ and Z$^y$ each, independently of one another,
denote —CH$_2$CH$_2$—, —CH=CH—, —CF$_2$O—, —OCF$_2$—, —CH$_2$O—, —O CH$_2$—, —CO—O—, —O—CO—, —C$_2$F$_4$—, —CF=CF—, —CH=CH—CH$_2$O— or a single bond, preferably a single bond, L$^{1-4}$ each, independently of one another, denote F, Cl, OCF$_3$, CF$_3$, CH$_3$, CH$_2$F, CHF$_2$.

Preferably, both L$^1$ and L$^2$ denote F or one of L$^1$ and L$^2$ denotes F and the other denotes Cl, or both L$^3$ and L$^4$ denote F or one of L$^3$ and L$^4$ denotes F and the other denotes Cl.

The compounds of the formula CY are preferably selected from the group consisting of the following sub-formulae:

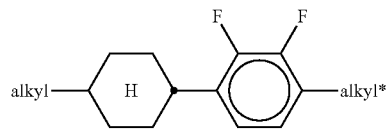

CY1

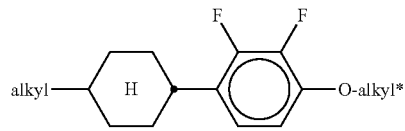

CY2

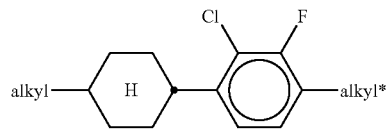

CY3

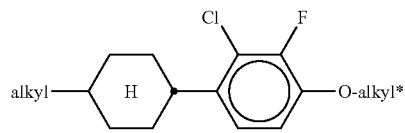

CY4

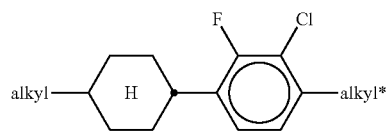

CY5

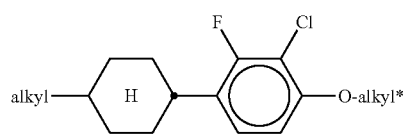

CY6

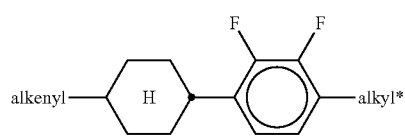

CY7

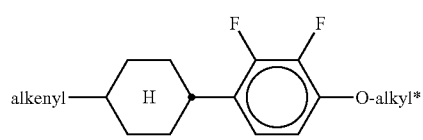

CY8

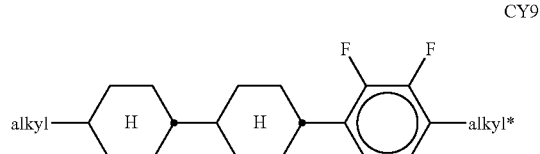

CY9

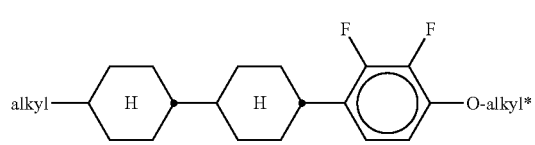

CY10

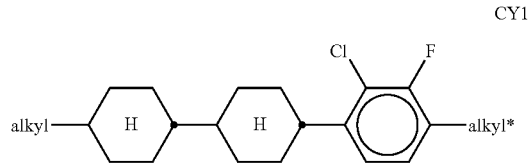

CY11

CY12
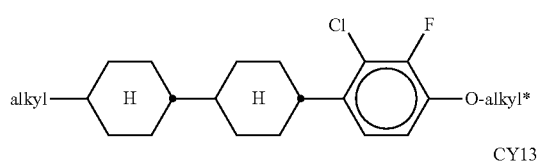
CY13
CY14
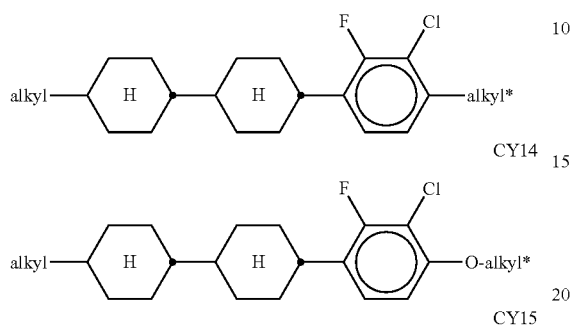
CY15
CY16
CY17
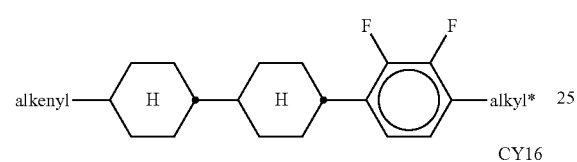
CY18
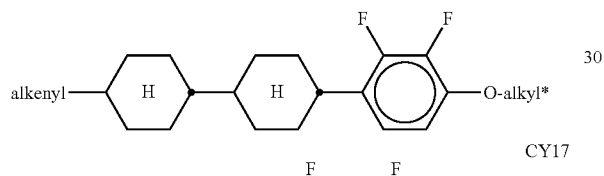
CY19
CY20
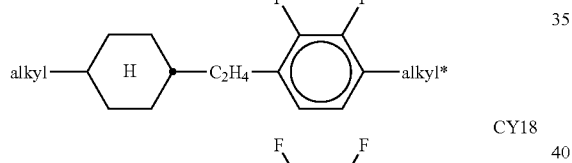
CY21
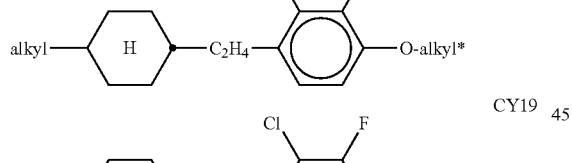
CY22
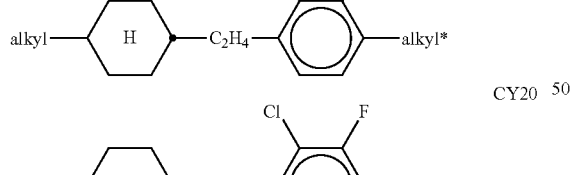
CY23
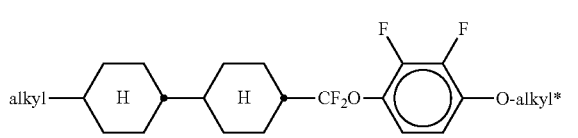
CY24
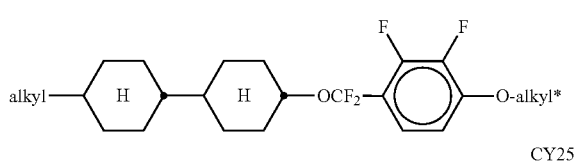
CY25
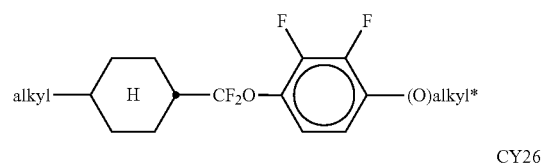
CY26
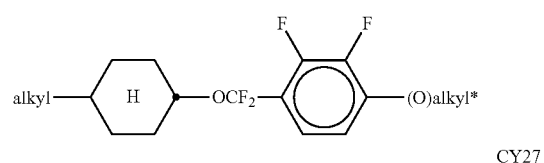
CY27
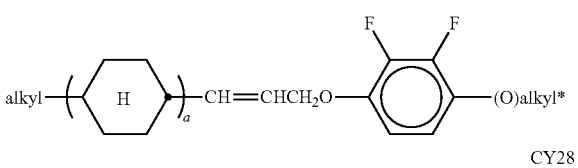
CY28
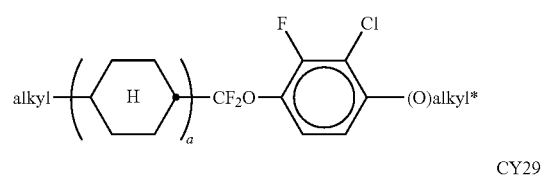
CY29
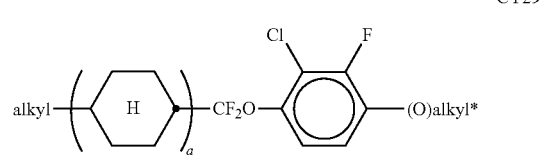
CY30
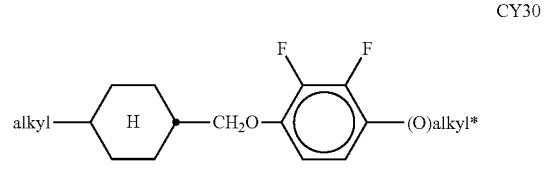
CY31
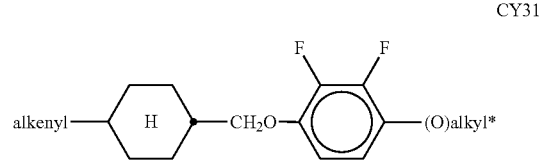
CY32
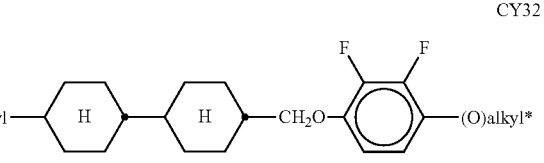

CY33

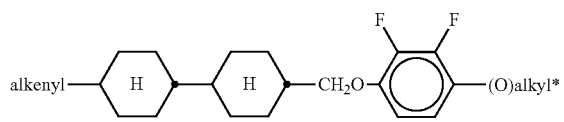

wherein a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The compounds of the formula PY are preferably selected from the group consisting of the following sub-formulae:

PY1
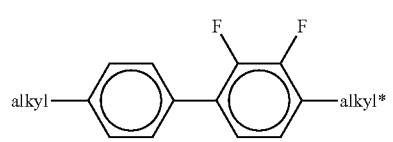

PY2
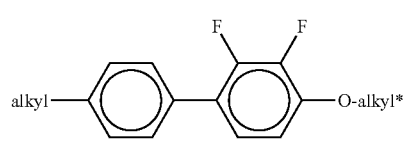

PY3
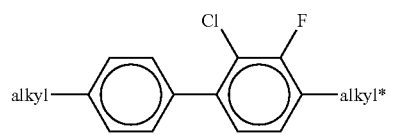

PY4
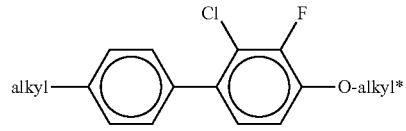

PY5
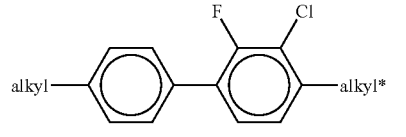

PY6
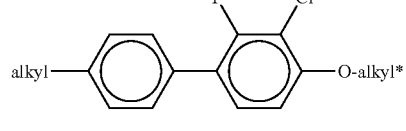

PY7
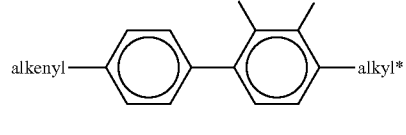

PY8
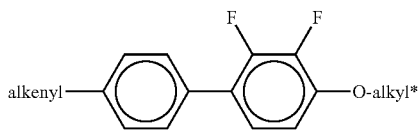

PY9
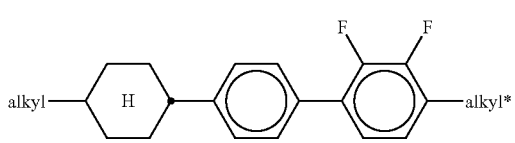

PY10
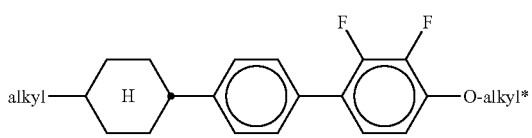

PY11
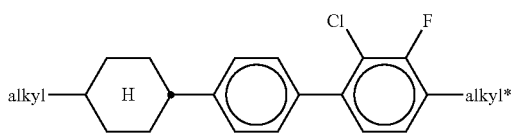

PY12
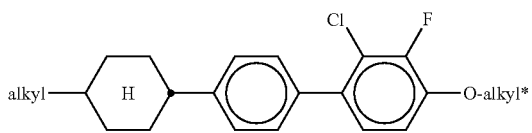

PY13
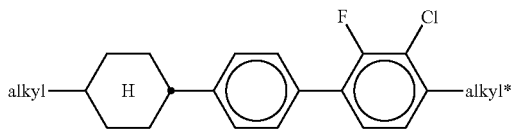

PY14
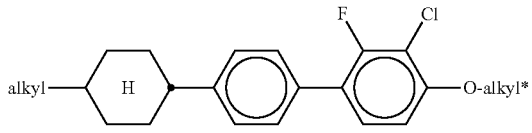

PY15
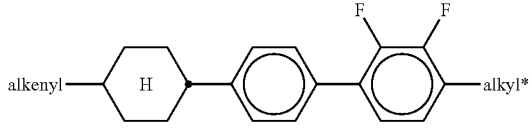

PY16
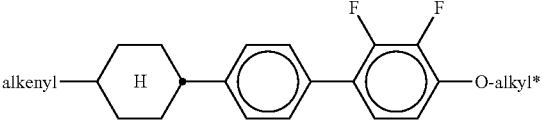

PY17
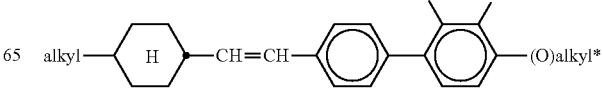

-continued

PY18
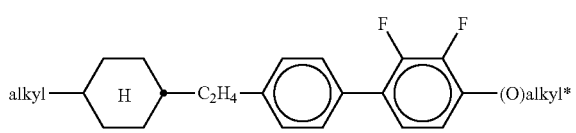

PY19
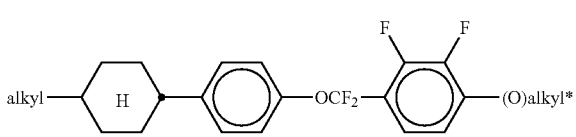

PY20
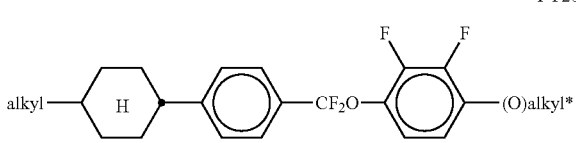

wherein alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

b) LC medium which additionally comprises one or more compounds of the following formula:

ZK
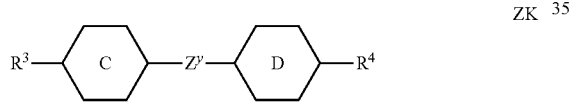

in which the individual radicals have the following meanings:

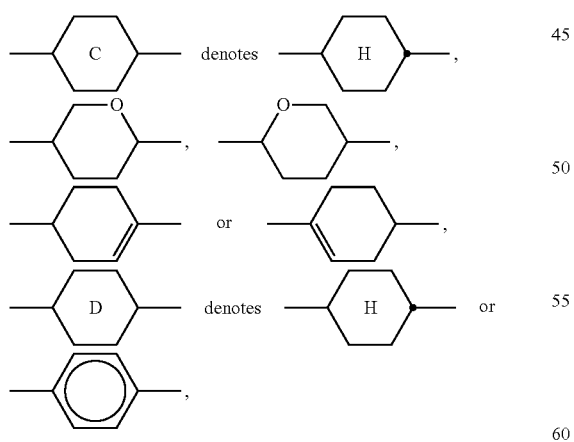

$R^3$ and $R^4$ each, independently of one another, denote alkyl having 1 to 12 C atoms, in which, in addition, one or two non-adjacent $CH_2$ groups may be replaced by $-O-$, $-CH=CH-$, $-CO-$, $-O-CO-$ or $-CO-O-$ in such a way that O atoms are not linked directly to one another, $Z^y$ denotes $-CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-CH_2O-$ or a single bond, preferably a single bond.

The compounds of the formula ZK are preferably selected from the group consisting of the following sub-formulae:

ZK1
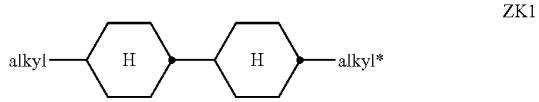

ZK2
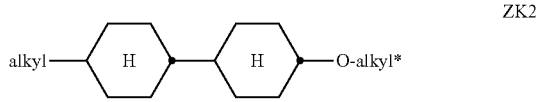

ZK3
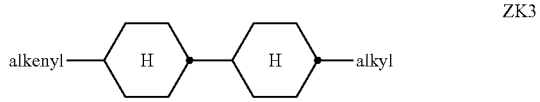

ZK4
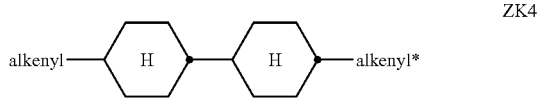

ZK5
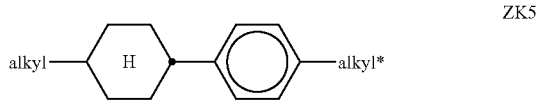

ZK6

ZK7

ZK8
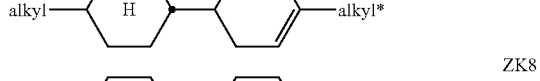

ZK9
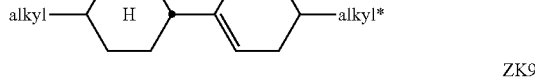

ZK10
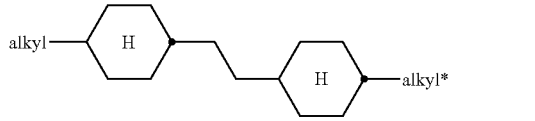

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds of formula ZK1 and ZK3.

Particularly preferred compounds of formula ZK are selected from the following sub-formulae:

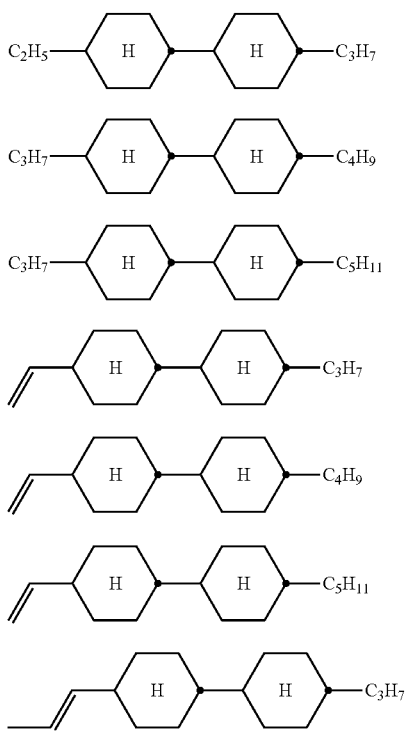

wherein the propyl, butyl and pentyl groups are straight-chain groups.

Most preferred are compounds of formula ZK1a and ZK3a.

c) LC medium which additionally comprises one or more compounds of the following formula:

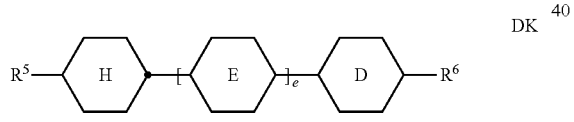

in which the individual radicals on each occurrence, identically or differently, have the following meanings:

$R^5$ and $R^6$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms,

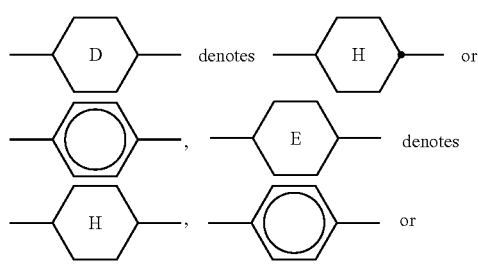

$e$ denotes 1 or 2.

The compounds of the formula DK are preferably selected from the group consisting of the following sub-formulae:

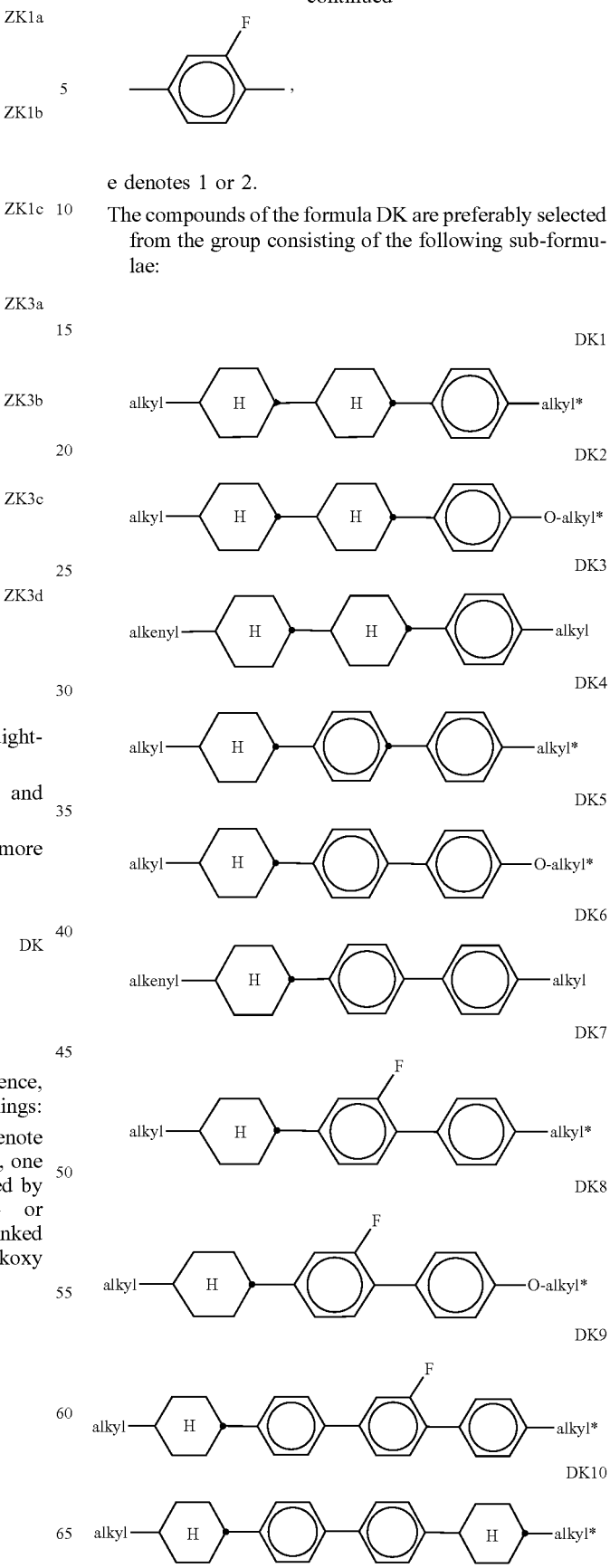

-continued

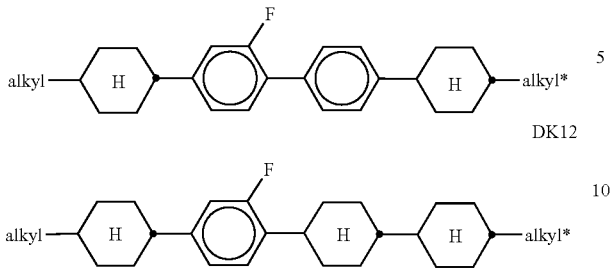

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

d) LC medium which additionally comprises one or more compounds of the following formula:

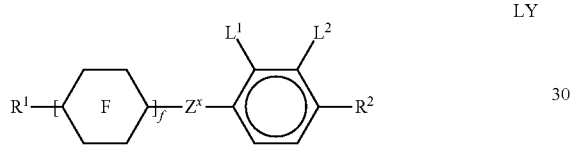

LY in which the individual radicals have the following meanings:

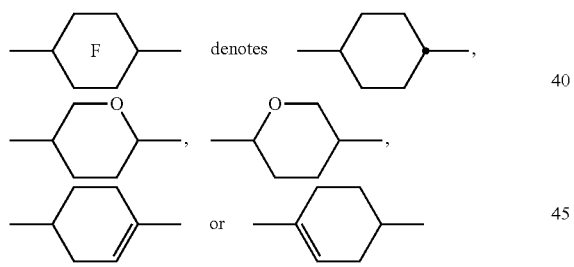

with at least one ring F being different from cyclohexylene, f denotes 1 or 2, $R^1$ and $R^2$ each, independently of one another, denote alkyl having 1 to 12 C atoms, where, in addition, one or two non-adjacent $CH_2$ groups may be replaced by $-O-$, $-CH=CH-$, $-CO-$, $-OCO-$ or $-COO-$ in such a way that O atoms are not linked directly to one another, $Z^x$
denotes $-CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-CH_2O-$ or a single bond, preferably a single bond, $L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

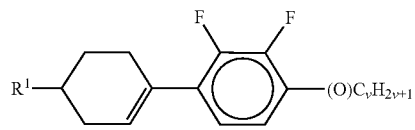
LY1

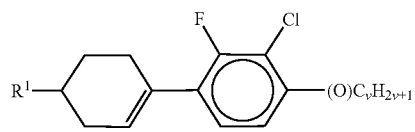
LY2

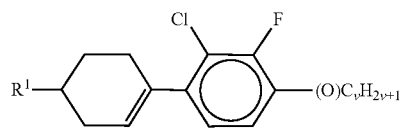
LY3

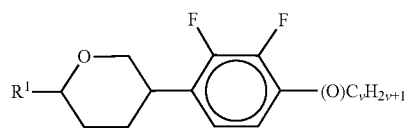
LY4

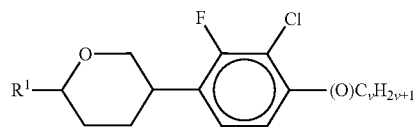
LY5

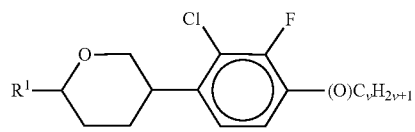
LY6

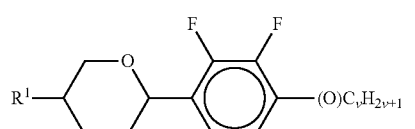
LY7

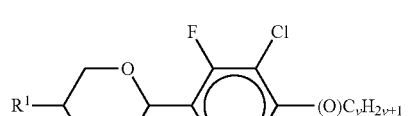
LY8

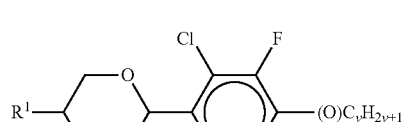
LY9

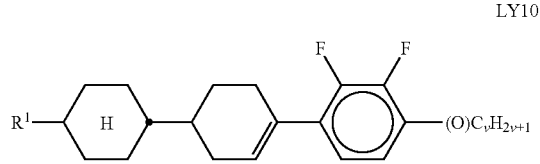
LY10

LY11
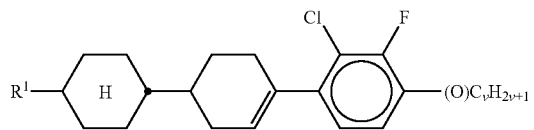

LY12
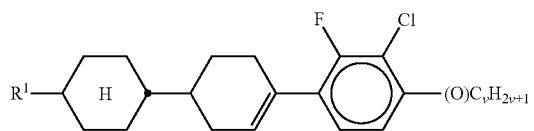

LY13
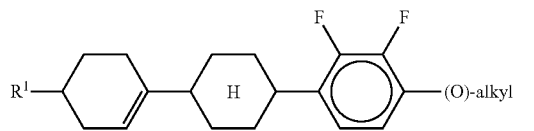

LY14
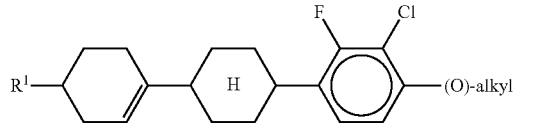

LY15
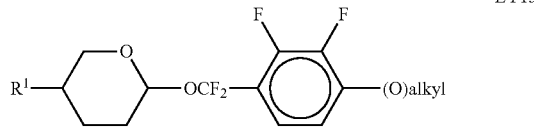

LY16
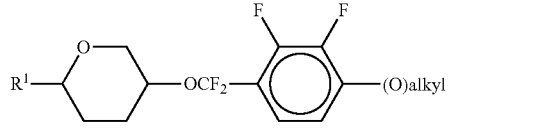

LY17
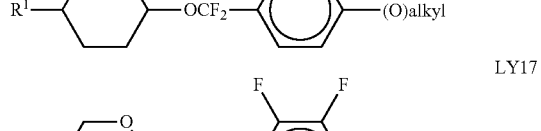

LY18
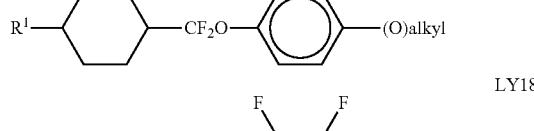

LY19
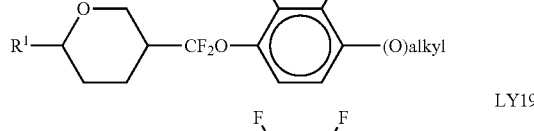

LY20
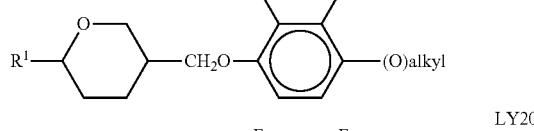

LY21
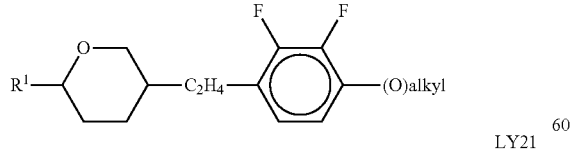

LY22
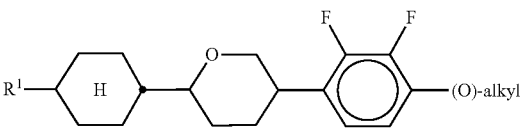

LY23
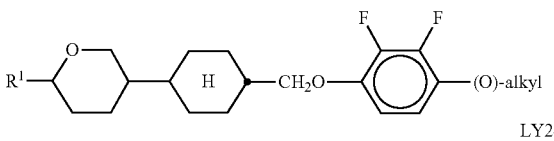

LY24
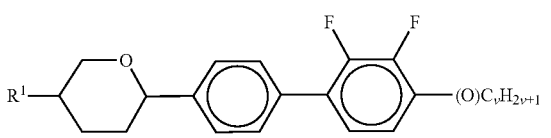

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

e) LC medium which additionally comprises one or more compounds selected from the group consisting of the following formulae:

G1
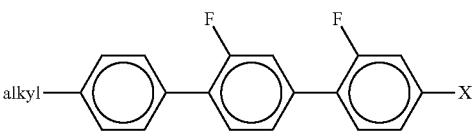

G2
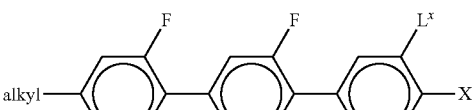

G3
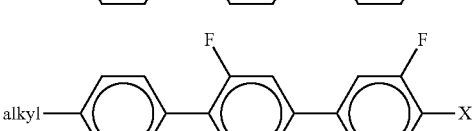

G4
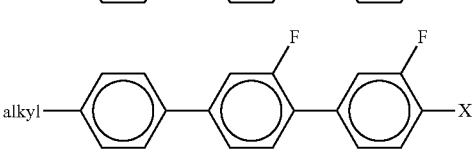

in which alkyl denotes $C_{1-6}$-alkyl, $L^x$ denotes H or F, and X denotes F, Cl, $OCF_3$, $OCHF_2$ or $OCH=CF_2$. Particular preference is given to compounds of the formula G1 in which X denotes F.

f) LC medium which additionally comprises one or more compounds selected from the group consisting of the following formulae:

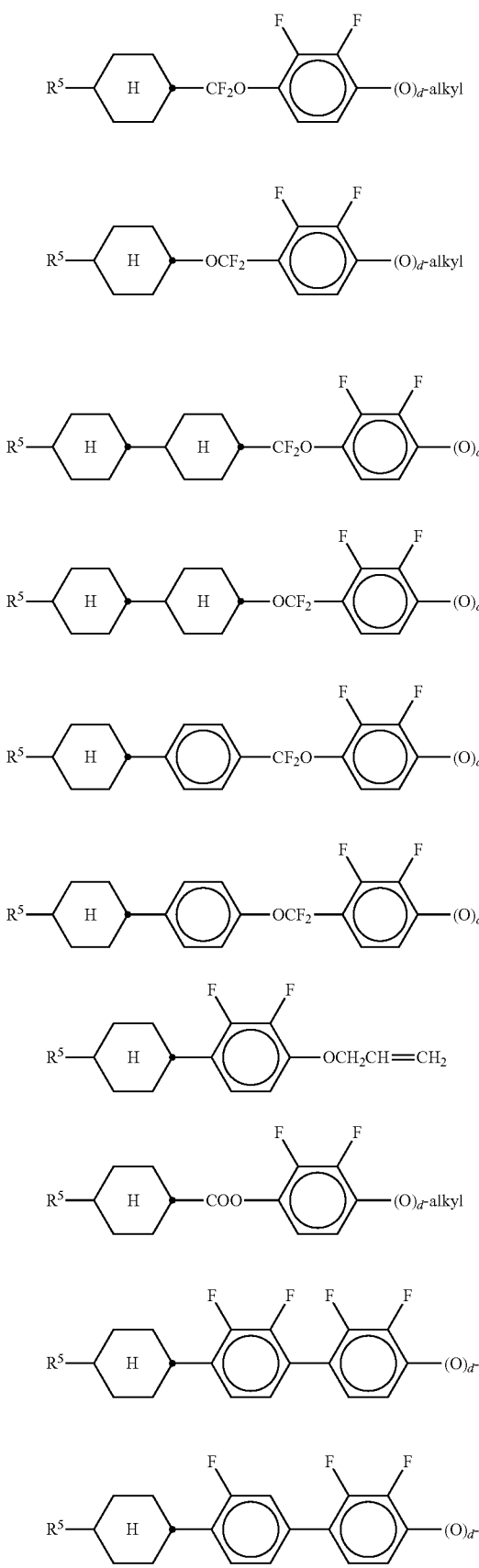

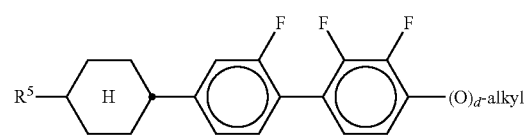

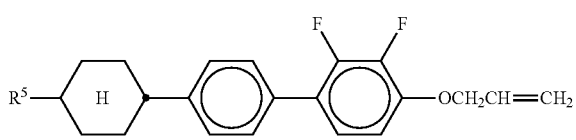

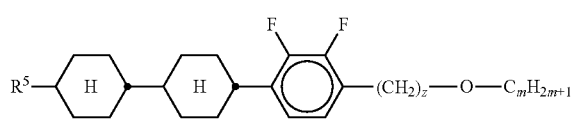

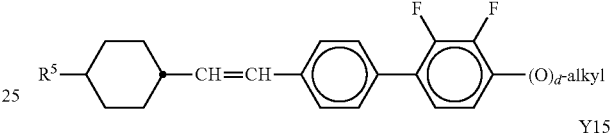

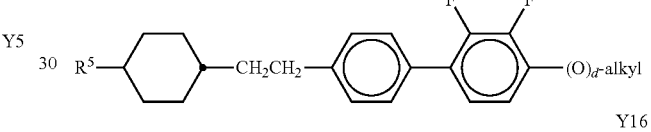

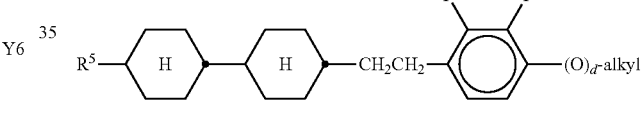

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) LC medium which additionally comprises one or more biphenyl compounds selected from the group consisting of the following formulae:

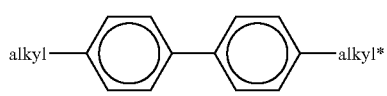

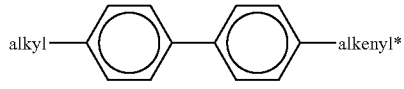

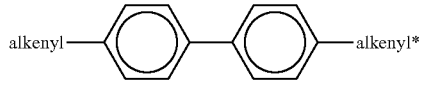

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

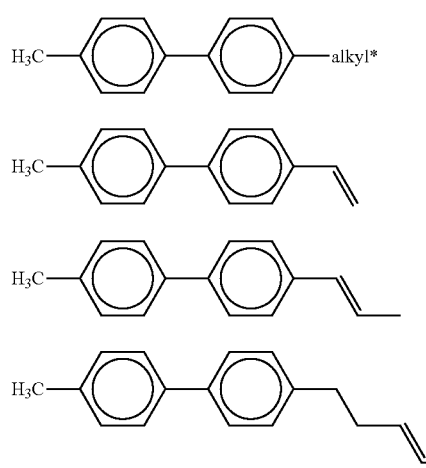

in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

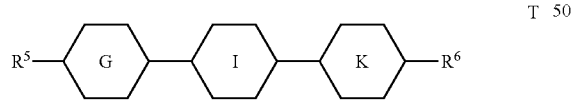

in which R$^5$ and R$^6$ each, independently of one another, have one of the meanings indicated above, and

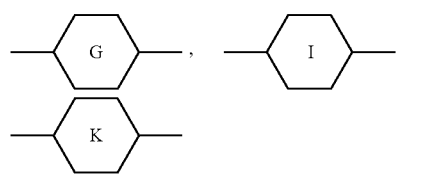

each, independently of one another, denote

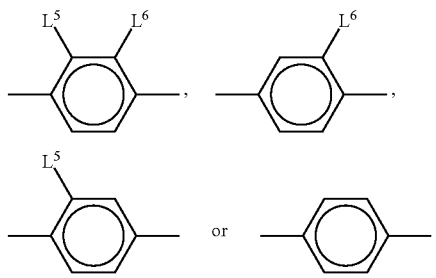

in which L$^5$ denotes F or Cl, preferably F, and L$^6$ denotes F, Cl, OCF$_3$, CF$_3$, CH$_3$, CH$_2$F or CHF$_2$, preferably F.

The compounds of the formula T are preferably selected from the group consisting of the following sub-formulae:

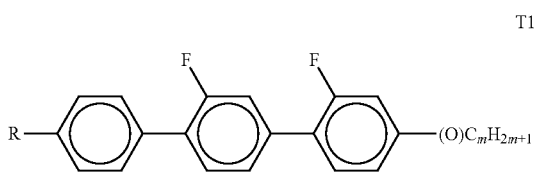

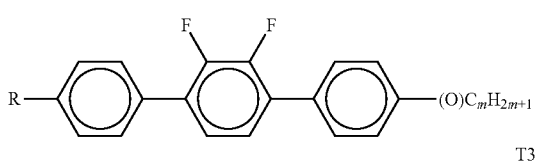

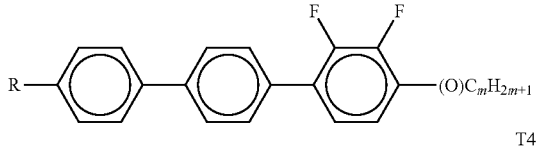

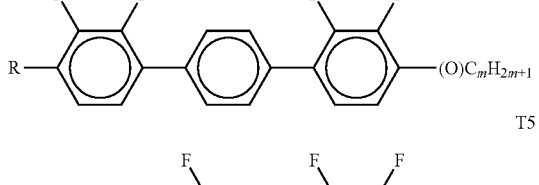

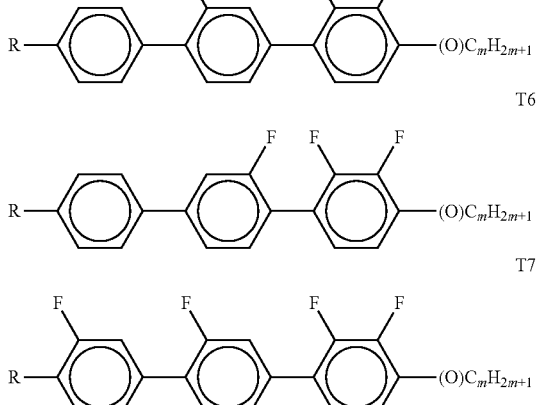

-continued
T8
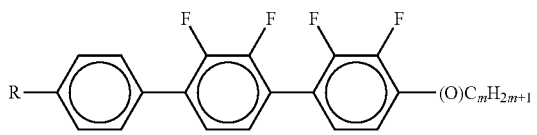
T9
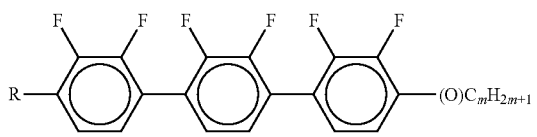
T10
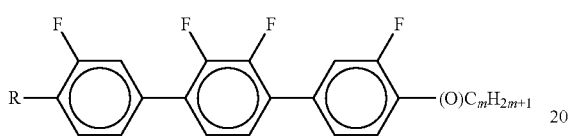
T11
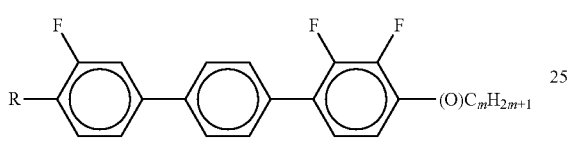
T12
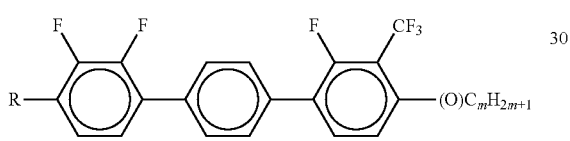
T13
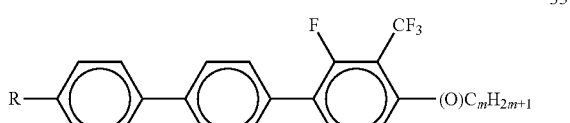
T14
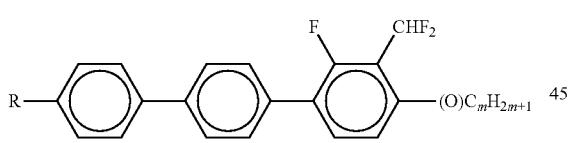
T15
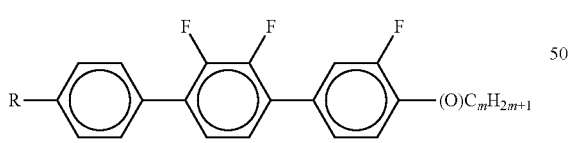
T16
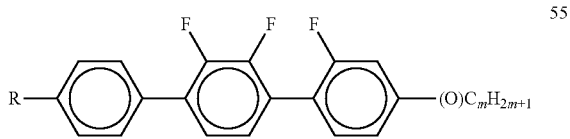
T17
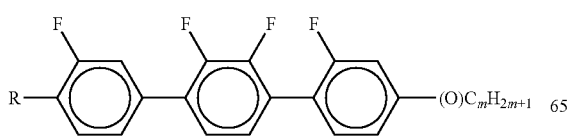
-continued
T18
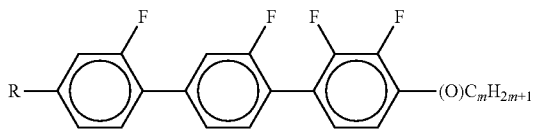
T19
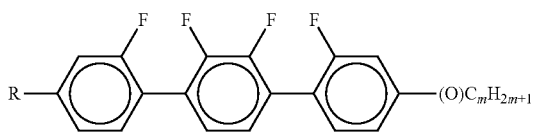
T20
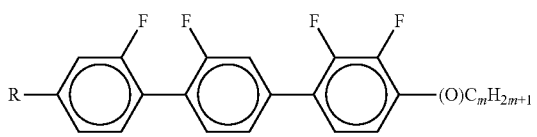
T21
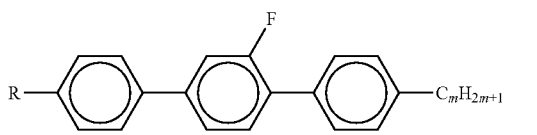
T22
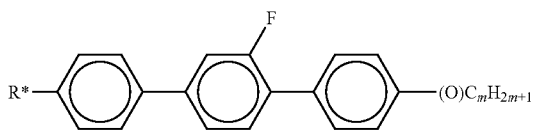
T23
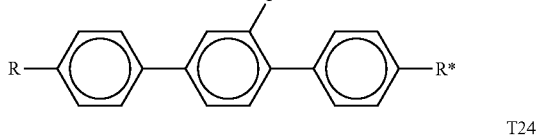
T24
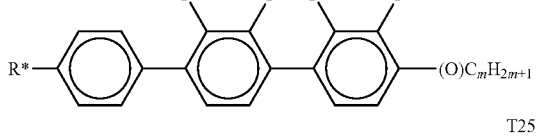
T25
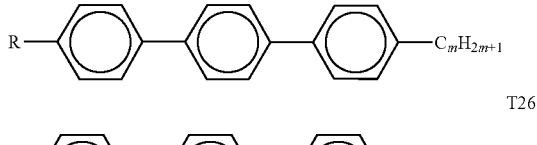
T26
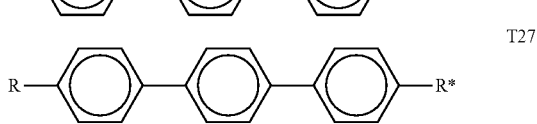
T27
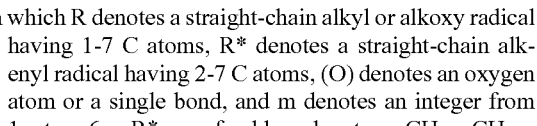
in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-$ CH$_2$—CH═CH—, CH$_3$—(CH$_2$)$_2$—CH═CH—, CH$_3$—(CH$_2$)$_3$—CH═CH— or CH$_3$—CH═CH—(CH$_2$)$_2$—.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≥0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

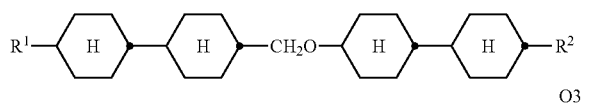
O1

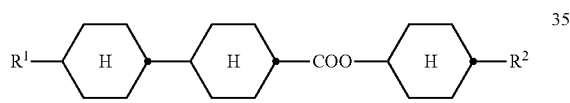
O2

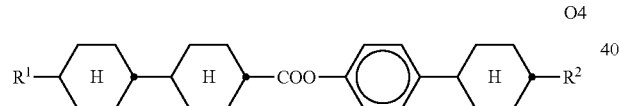
O3

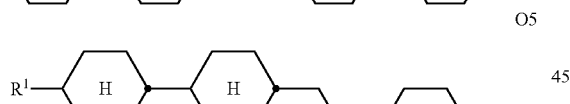
O4

O5

O6

O7

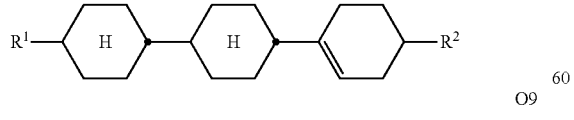
O8

O9

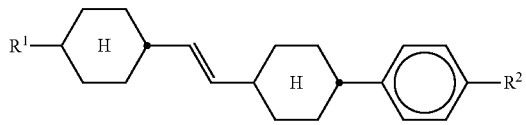
O10

O11 in which R$^1$ and R$^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

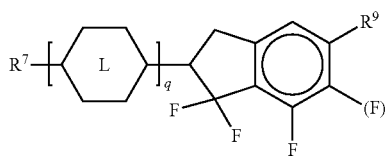
FI in which

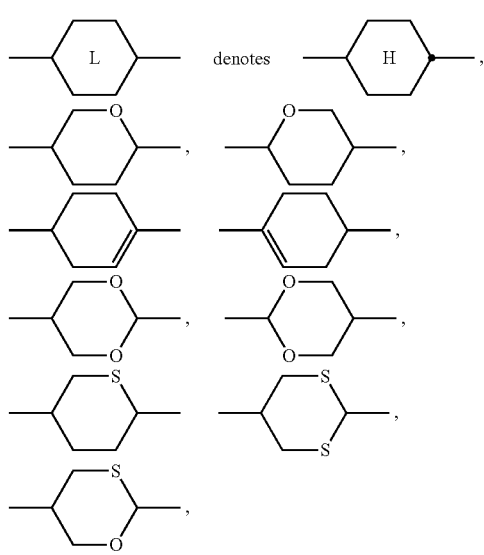

R$^9$ denotes H, CH$_3$, C$_2$H$_5$ or n-C$_3$H$_7$, (F) denotes an optional fluorine substituent, and q denotes 1, 2 or 3, and R$^7$ has one of the meanings indicated for R$^1$, preferably in amounts of >3% by weight, in particular ≥5% by weight and very particularly preferably 5-30% by weight.

Particularly preferred compounds of the formula FI are selected from the group consisting of the following sub-formulae:

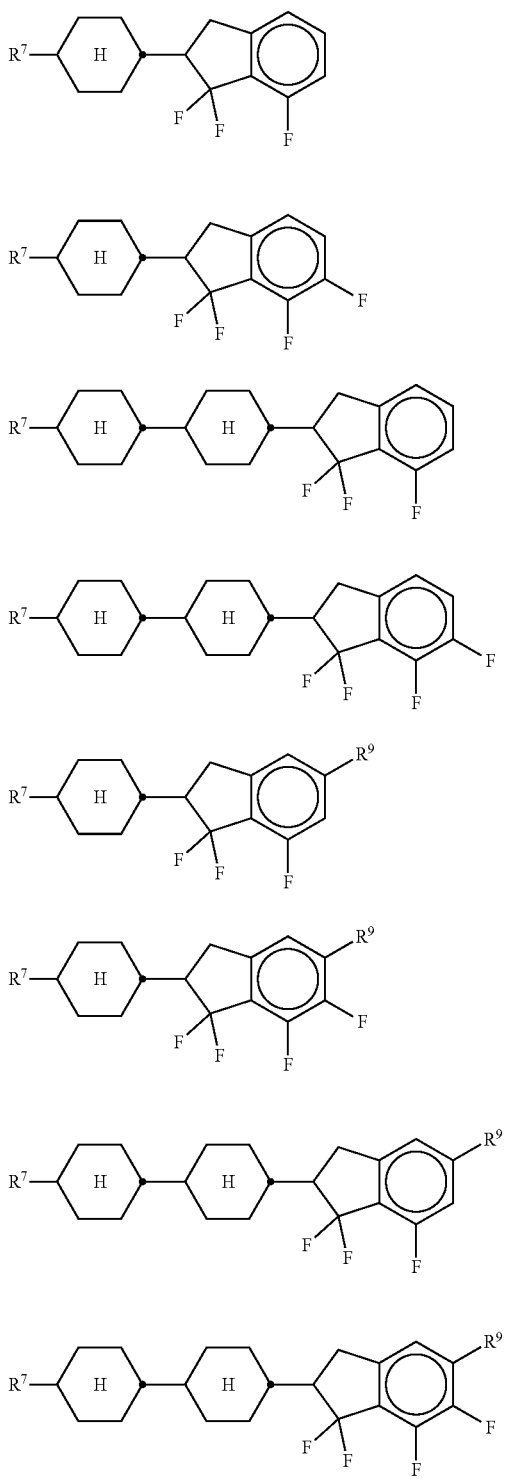

in which $R^7$ preferably denotes straight-chain alkyl, and $R^9$ denotes $CH_3$, $C_2H_5$ or $n-C_3H_7$. Particular preference is given to the compounds of the formulae FI1, FI2 and FI3.

l) LC medium which additionally comprises one or more compounds selected from the group consisting of the following formulae:

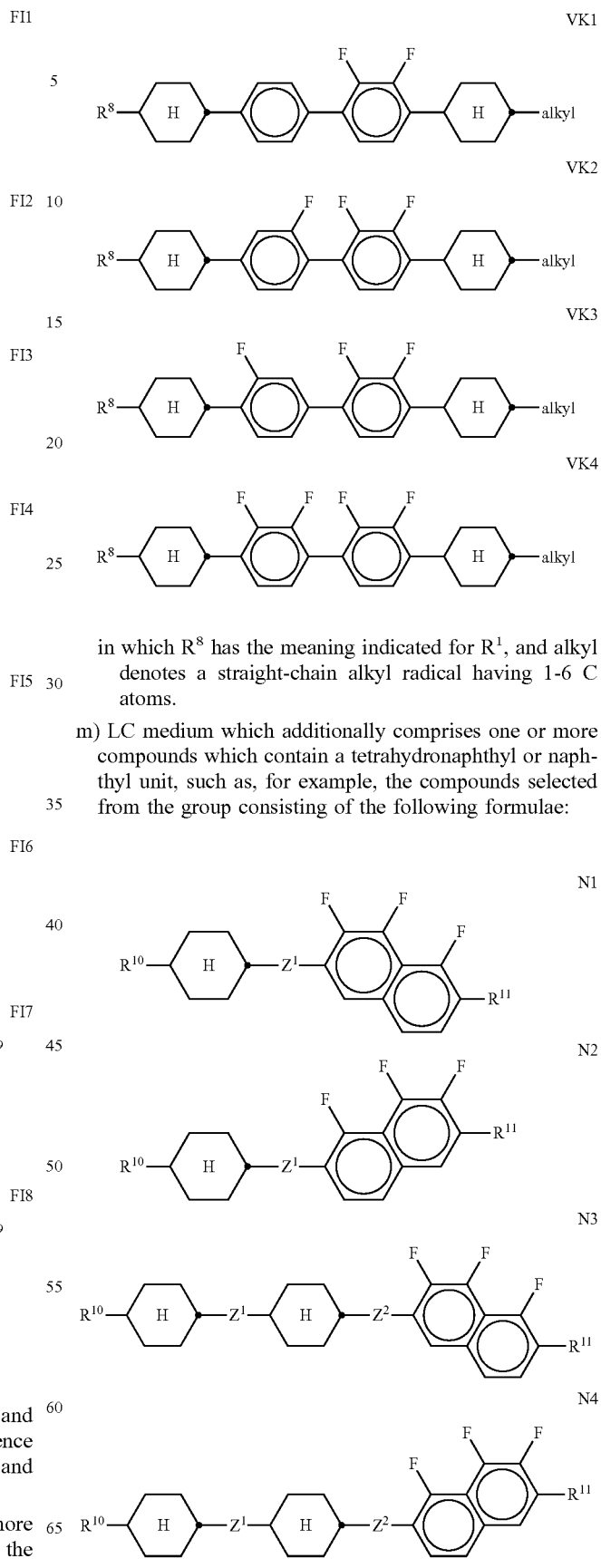

in which $R^8$ has the meaning indicated for $R^1$, and alkyl denotes a straight-chain alkyl radical having 1-6 C atoms.

m) LC medium which additionally comprises one or more compounds which contain a tetrahydronaphthyl or naphthyl unit, such as, for example, the compounds selected from the group consisting of the following formulae:

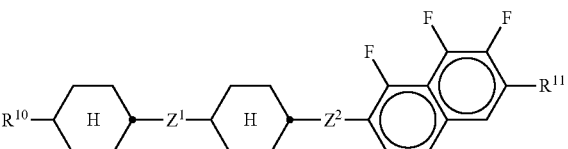

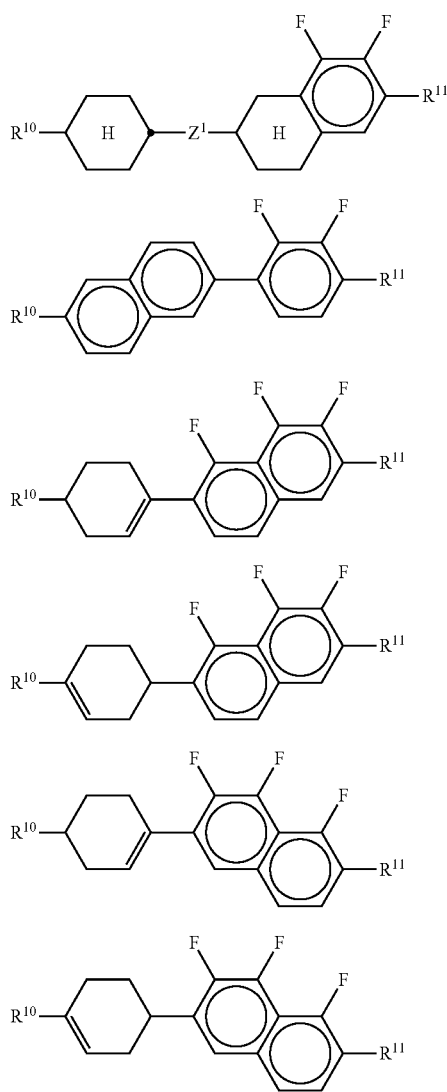

in which
- R¹⁰ and R¹¹ each, independently of one another, denote alkyl having 1 to 12 C atoms, where, in addition, one or two non-adjacent CH₂ groups may be replaced by —O—, —CH=CH—, —CO—, —OCO— or —COO— in such a way that O atoms are not linked directly to one another, preferably alkyl or alkoxy having 1 to 6 C atoms,
- and R¹⁰ and R¹¹ preferably denote straight-chain alkyl or alkoxy having 1 to 6 C atoms or straight-chain alkenyl having 2 to 6 C atoms, and
- Z¹ and Z² each, independently of one another,
  denote —C₂H₄—, —CH=CH—, —(CH₂)₄—, —(CH₂)₃O—, —O(CH₂)₃—, —CH=CH—CH₂CH₂—, —CH₂CH₂CH=CH—, —CH₂O—, —OCH₂—, —CO—O—, —O—CO—, —C₂F₄—, —CF=CF—, —CF=CH—, —CH=CF—, —CH₂— or a single bond.

n) LC medium which additionally comprises one or more difluoro-dibenzochromans and/or chromans of the following formulae:

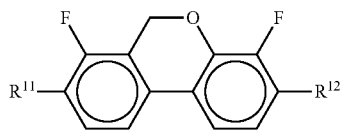

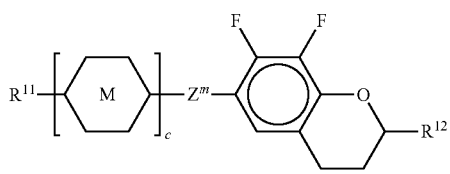

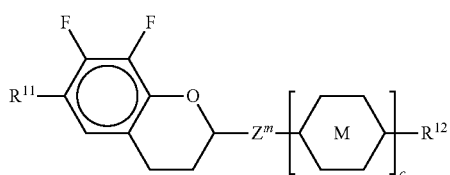

in which
- R¹¹ and R¹² each, independently of one another, have one of the meanings indicated above for R¹¹,
- ring M is trans-1,4-cyclohexylene or 1,4-phenylene,
- Zᵐ —C₂H₄—, —CH₂O—, —OCH₂—, —CO—O— or —O—CO—,
- c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:

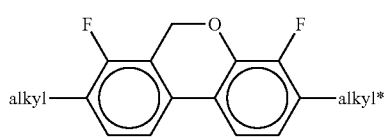

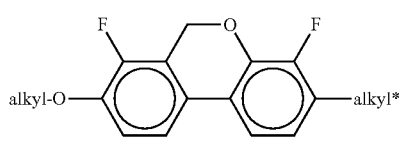

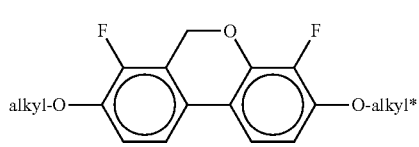

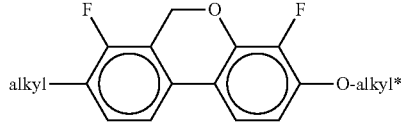

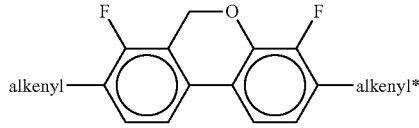

BC6
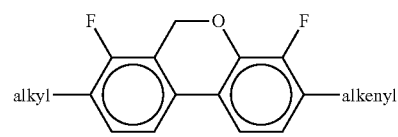

BC7
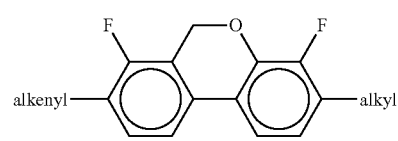

CR1
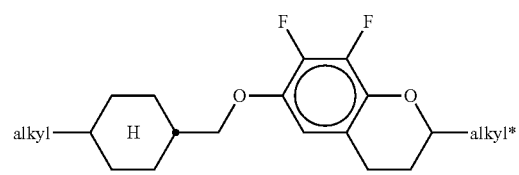

CR2
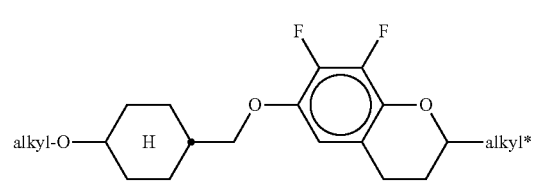

CR3
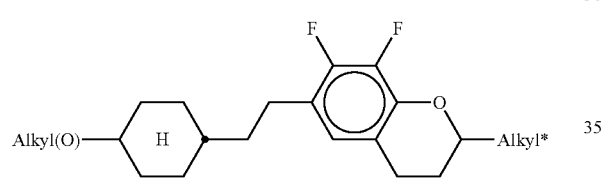

CR4
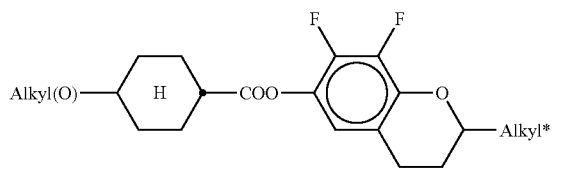

CR5
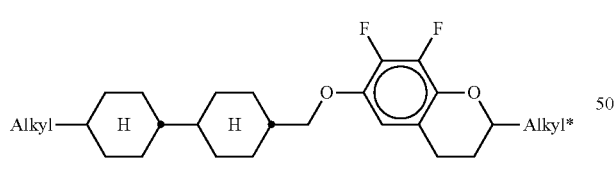

CR6
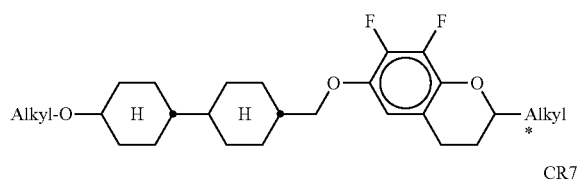

CR7
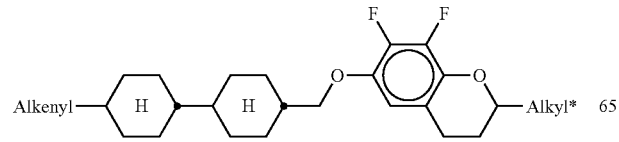

CR8
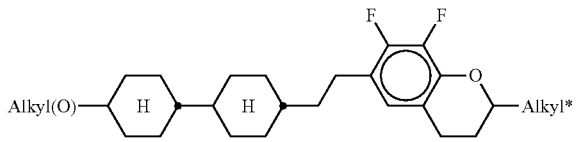

CR9
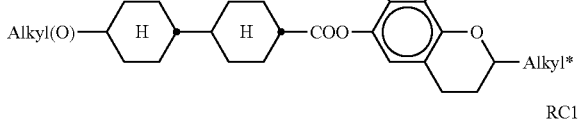

RC1
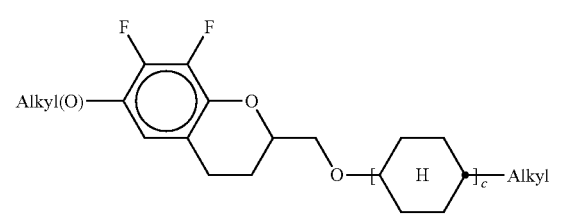

RC2
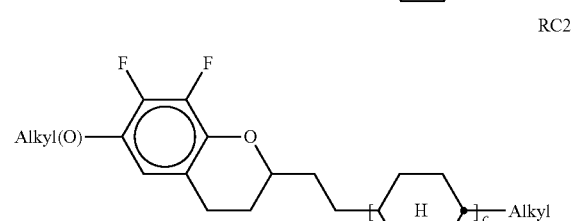

RC3
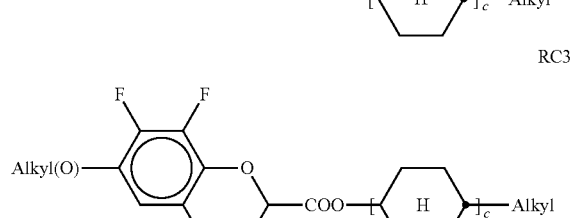

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC-2.

o) LC medium which additionally comprises one or more fluorinated phenanthrenes and/or dibenzofurans of the following formulae:

PH
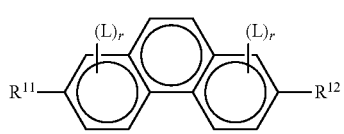

-continued

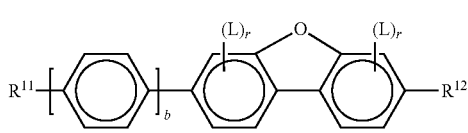
BF in which $R^{11}$ and $R^{12}$ each, independently of one another, have one of the meanings indicated above for $R^{11}$, b denotes 0 or 1, L denotes F, and r denotes 1, 2 or 3.

Particularly preferred compounds of the formulae PH and BF are selected from the group consisting of the following sub-formulae:

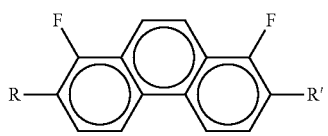
PH1

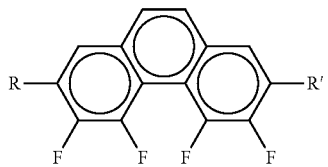
PH2

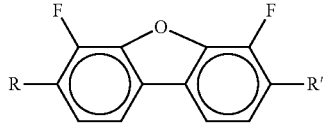
BF1

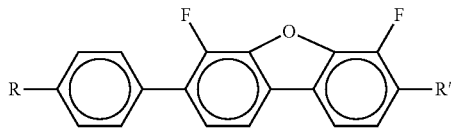
BF2 in which R and R' each, independently of one another, denote a straight-chain alkyl or alkoxy radical having 1-7 C atoms.

p) LC medium which additionally comprises one or more monocyclic compounds of the following formula

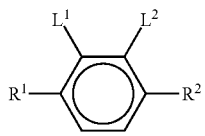
Y wherein
$R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms,
$L^1$ and $L^2$ each, independently of one another, denote F, Cl, $OCF_3$, $CF_3$, $CH_3$, $CH_2F$, $CHF_2$.
Preferably, both $L^1$ and $L^2$ denote F or one of $L^1$ and $L^2$ denotes F and the other denotes Cl, The compounds of the formula Y are preferably selected from the group consisting of the following sub-formulae:

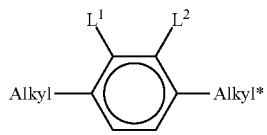
Y1

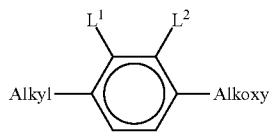
Y2

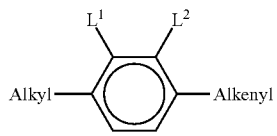
Y3

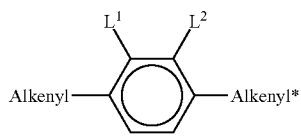
Y4

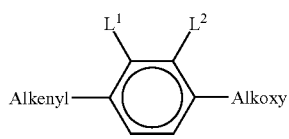
Y5

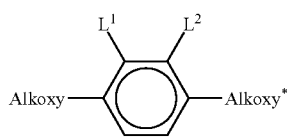
Y6

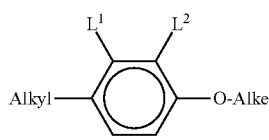
Y7

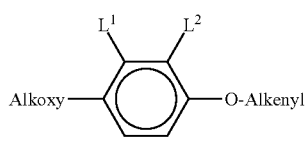
Y8

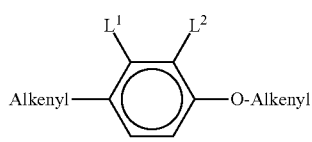
Y9

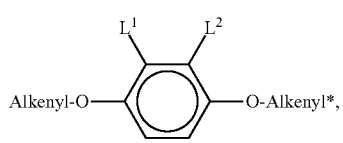
Y10 in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—.

Particularly preferred compounds of the formula Y are selected from the group consisting of the following sub-formulae:

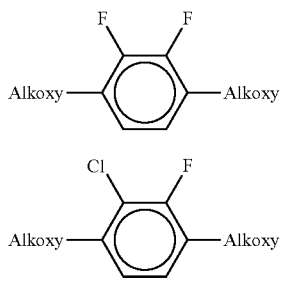

wherein Alkoxy preferably denotes straight-chain alkoxy with 3, 4, or 5 C atoms.

q) LC medium which, apart from the stabilisers according to the invention, in particular of the formula I or sub-formulae thereof and the comonomers, comprises no compounds which contain a terminal vinyloxy group (—O—CH=CH₂).

r) LC medium which comprises 1 to 5, preferably 1, 2 or 3, stabilisers, preferably selected from stabilisers according to the invention, in particular of the formula I or sub-formulae thereof.

s) LC medium in which the proportion of stabilisers, in particular of the formula I or sub-formulae thereof, in the mixture as a whole is 1 to 1500 ppm, preferably 100 to 1000 ppm.

t) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

u) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

v) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

w) LC medium in which the proportion of compounds of the formulae CY, PY and ZK in the mixture as a whole is greater than 70%, preferably greater than 80%.

x) LC medium in which the LC host mixture contains one or more compounds containing an alkenyl group, preferably selected from the group consisting of formula CY, PY and LY, wherein one or both of $R^1$ and $R^2$ denote straight-chain alkenyl having 2-6 C atoms, formula ZK and DK, wherein one or both of $R^3$ and $R^4$ or one or both of $R^5$ and $R^6$ denote straight-chain alkenyl having 2-6 C atoms, and formula B2 and B3, very preferably selected from formulae CY15, CY16, CY24, CY32, PY15, PY16, ZK3, ZK4, DK3, DK6, B2 and B3, most preferably selected from formulae ZK3, ZK4, B2 and B3. The concentration of these compounds in the LC host mixture is preferably from 2 to 70%, very preferably from 3 to 55%.

y) LC medium which contains one or more, preferably 1 to 5, compounds selected of formula PY1-PY8, very preferably of formula PY2. The proportion of these compounds in the mixture as a whole is preferably 1 to 30%, particularly preferably 2 to 20%. The content of these individual compounds is preferably in each case 1 to 20%.

z) LC medium which contains one or more, preferably 1, 2 or 3, compounds of formula T2. The content of these compounds in the mixture as a whole is preferably 1 to 20%.

In another preferred embodiment of the present invention the LC medium contains an LC host mixture with positive dielectric anisotropy. Preferred embodiments of such an LC medium, and the corresponding LC host mixture, are those of sections aa)-mmm) below:

aa) LC-medium, characterised in that it comprises one or more compounds selected from the group of compounds of the formulae II and III

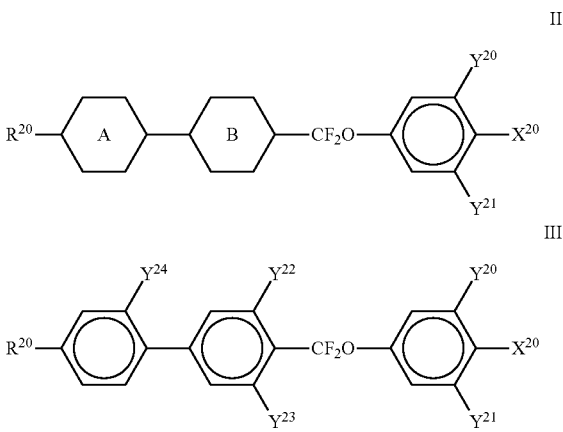

wherein $R^{20}$ each, identically or differently, denote a halogenated or unsubstituted alkyl or alkoxy radical having 1 to 15 C atoms, where, in addition, one or more CH₂ groups in these radicals may each be replaced, independently of one another, by —C≡C—, —CF₂O—, —CH=CH—,

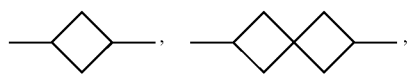

—O—, —CO—O— or —O—CO— in such a way that O atoms are not linked directly to one another, $X^{20}$ each, identically or differently, denote F, Cl, CN, SF₅, SCN, NCS, a halogenated alkyl radical, a halogenated alkenyl radical, a halogenated alkoxy radical or a halogenated alkenyloxy radical, each having up to 6 C atoms, and $Y^{20-24}$ each, identically or differently, denote H or F;

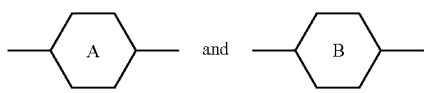

A and B each, independently of one another, denote

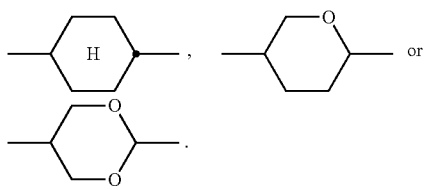

The compounds of the formula II are preferably selected from the following formulae:

IIa
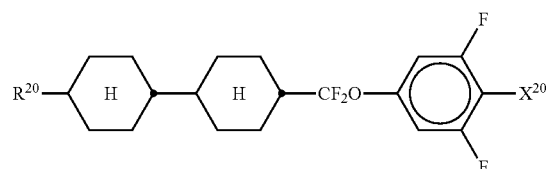

IIb
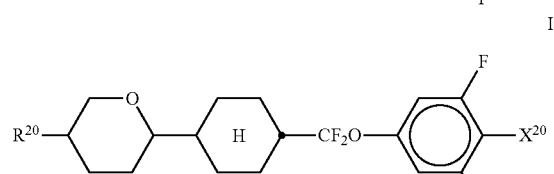

IIc
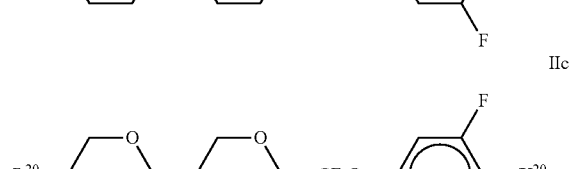

IId
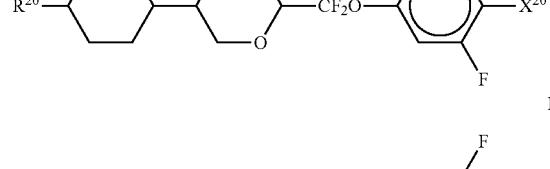

IIe
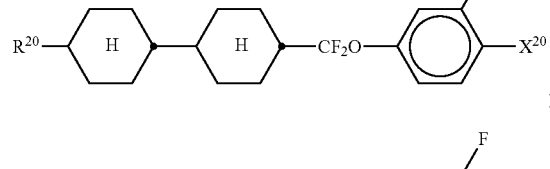

IIf
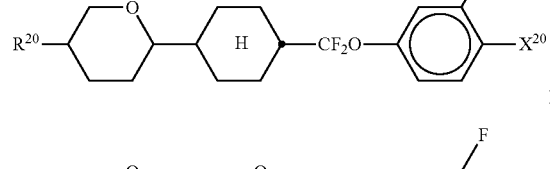

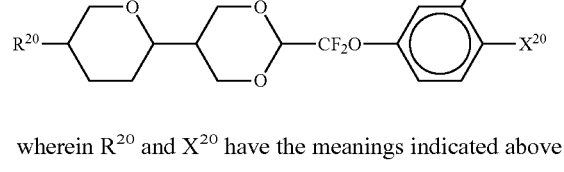

wherein $R^{20}$ and $X^{20}$ have the meanings indicated above.

$R^{20}$ preferably denotes alkyl having 1 to 6 C atoms. $X^{20}$ preferably denotes F. Particular preference is given to compounds of the formulae IIa and IIb, in particular compounds of the formulae IIa and IIb wherein X denotes F.

The compounds of the formula III are preferably selected from the following formulae:

IIIa
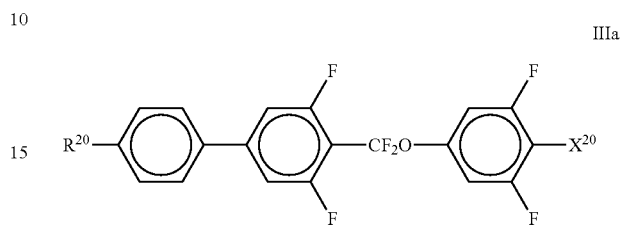

IIIb

IIIc
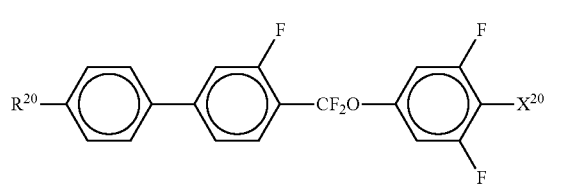

IIId
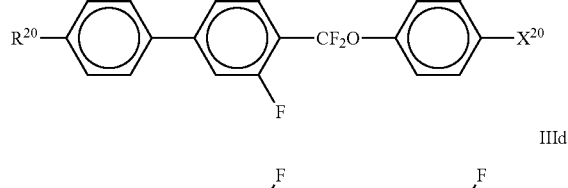

IIIe
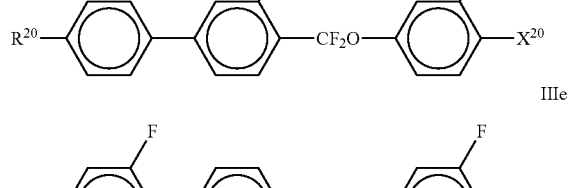

wherein $R^{20}$ and $X^{20}$ have the meanings indicated above.

$R^{20}$ preferably denotes alkyl having 1 to 6 C atoms. $X^{20}$ preferably denotes F. Particular preference is given to compounds of the formulae IIIa and IIIe, in particular compounds of the formula IIIa;

bb) LC-medium additionally comprising one or more compounds selected from the following formulae:

IV

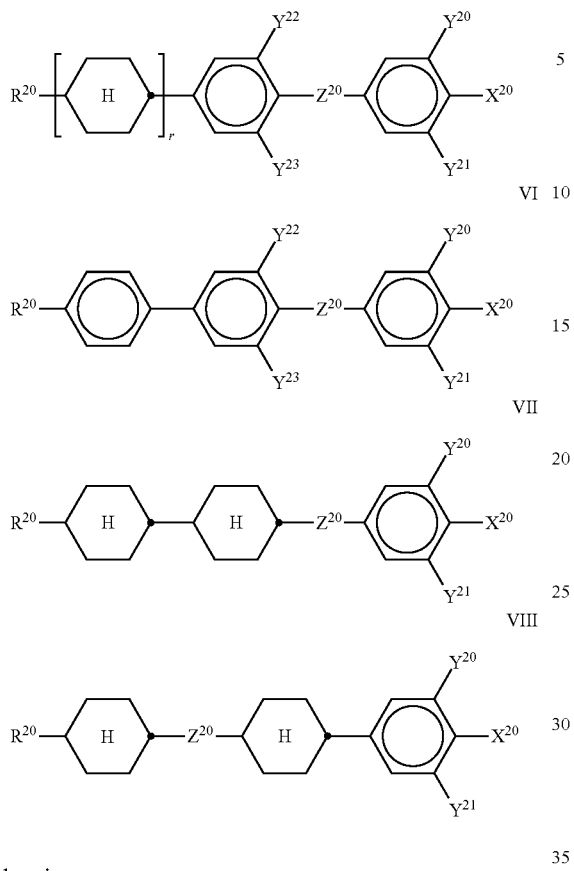

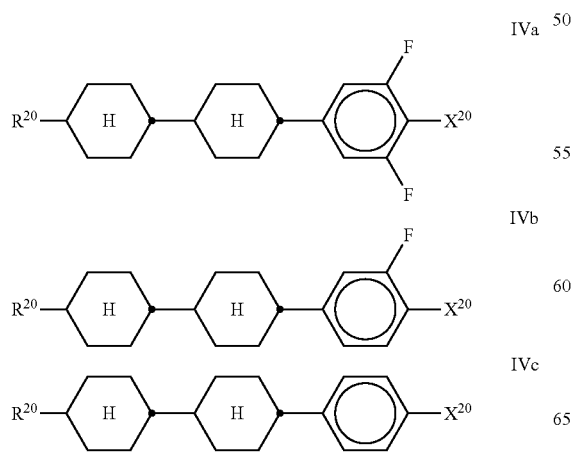

wherein

R²⁰, X²⁰ and Y²⁰⁻²³ have the meanings indicated above, and

Z²⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO— or —OCF₂—, in formulae V and VI also a single bond, in formulae V and VIII also —CF₂O—, r denotes 0 or 1, and s denotes 0 or 1;

The compounds of the formula IV are preferably selected from the following formulae:

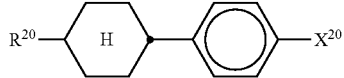

wherein R²⁰ and X²⁰ have the meanings indicated above.

R²⁰ preferably denotes alkyl having 1 to 6 C atoms. X²⁰ preferably denotes F or OCF₃, furthermore OCF=CF₂ or Cl;

The compounds of the formula V are preferably selected from the following formulae:

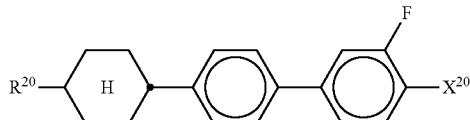

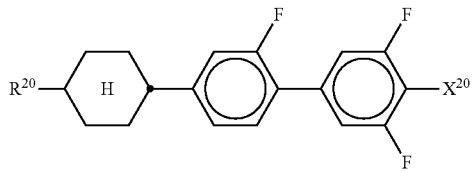

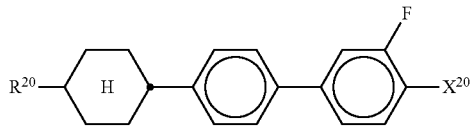

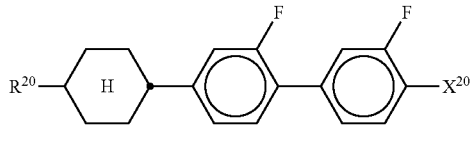

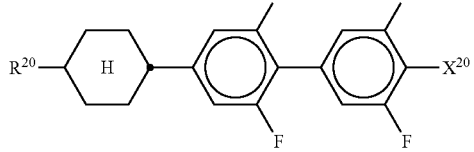

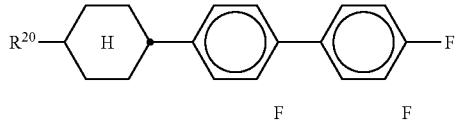

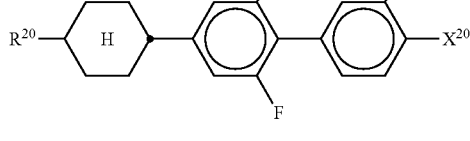

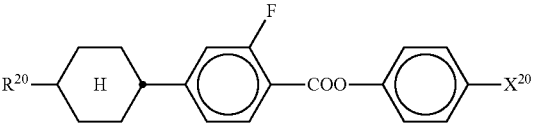

wherein R²⁰ and X²⁰ have the meanings indicated above.

$R^{20}$ preferably denotes alkyl having 1 to 6 C atoms. $X^{20}$ preferably denotes F and $OCF_3$, furthermore $OCHF_2$, $CF_3$, $OCF=CF_2$ and $OCH=CF_2$;

The compounds of the formula VI are preferably selected from the following formulae:

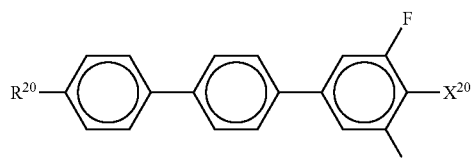
VIa

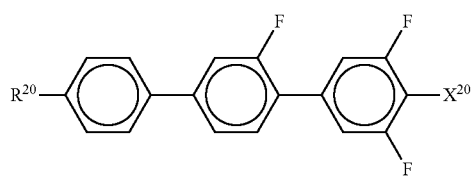
VIb

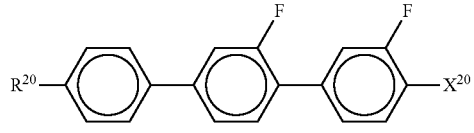
VIc

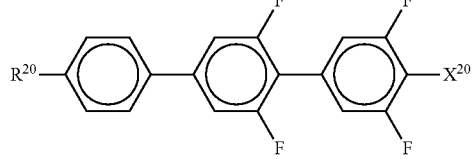
VId wherein $R^{20}$ and $X^{20}$ have the meanings indicated above. $R^{20}$ preferably denotes alkyl having 1 to 6 C atoms. $X^{20}$ preferably denotes F, furthermore $OCF_3$, $CF_3$, $CF=CF_2$, $OCHF_2$ and $OCH=CF_2$;

The compounds of the formula VII are preferably selected from the following formulae:

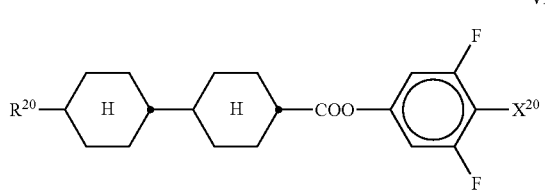
VIIa

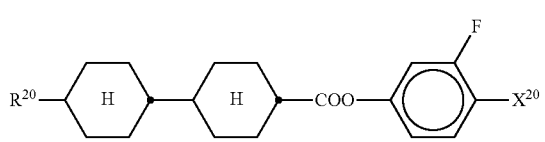
VIIb wherein $R^{20}$ and $X^{20}$ have the meanings indicated above. $R^{20}$ preferably denotes alkyl having 1 to 6 C atoms. $X^{20}$ preferably denotes F, furthermore $OCF_3$, $OCHF_2$ and $OCH=CF_2$.

cc) The medium additionally comprises one or more compounds selected from the formulae ZK1 to ZK10 given above. Especially preferred are compounds of formula ZK1 and ZK3. Particularly preferred compounds of formula ZK are selected from the sub-formulae ZK1a, ZK1b, ZK1c, ZK3a, ZK3b, ZK3c and ZK3d.

dd) The medium additionally comprises one or more compounds selected from the formulae DK1 to DK12 given above. Especially preferred compounds are DK3.

ee) The medium additionally comprises one or more compounds selected from the following formulae:

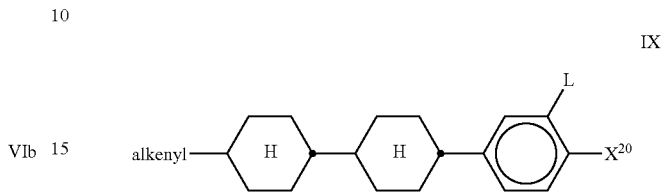
IX wherein $X^{20}$ has the meanings indicated above, and

L denotes H or F,

"alkenyl" denotes $C_{2-6}$-alkenyl.

ff) The compounds of the formulae DK-3a and IX are preferably selected from the following formulae:

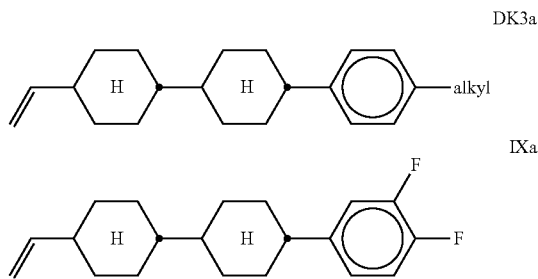
DK3a

IXa wherein "alkyl" denotes $C_{1-6}$-alkyl, preferably n-$C_3H_7$, n-$C_4H_9$ or n-$C_5H_{11}$, in particular n-$C_3H_7$.

gg) The medium additionally comprises one or more compounds selected from the formulae B1, B2 and B3 given above, preferably from the formula B2. The compounds of the formulae B1 to B3 are particularly preferably selected from the formulae B1a, B2a, B2b and B2c.

hh) The medium additionally comprises one or more compounds selected from the following formula:

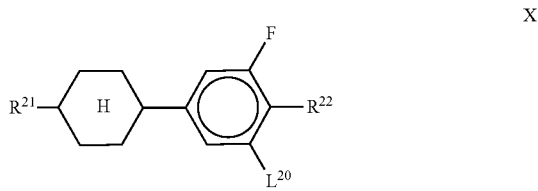
X wherein $L^{20}$ denotes H or F, and $R^{21}$ and $R^{22}$ each, identically or differently, denote n-alkyl, alkoxy, oxaalkyl, fluoroalkyl or alkenyl, each having up to 6 C atoms, and preferably each, identically or differently, denote alkyl having 1 to 6 C atoms.

ii) The medium comprises one or more compounds of the following formulae:

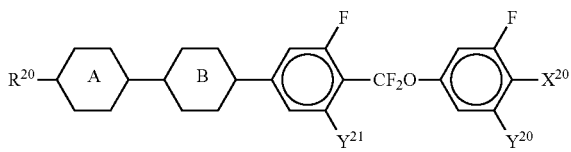  XI
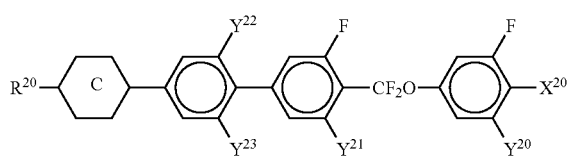  XII
wherein $R^{20}$, $X^{20}$ and $Y^{20-23}$ have the meanings indicated in formula III, and
 and 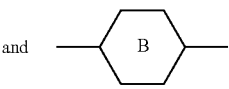
each, independently of one another, denote
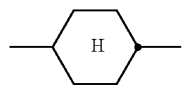, 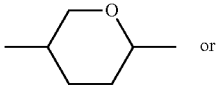 or
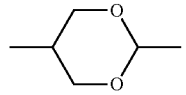 and 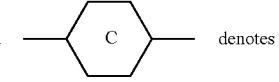 denotes
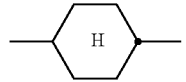, 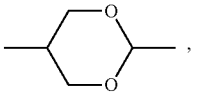,
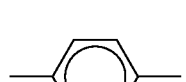, 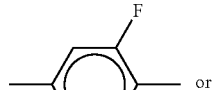 or
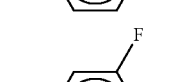
The compounds of the formulae XI and XII are preferably selected from the following formulae:
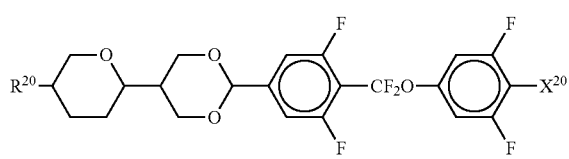  XIa
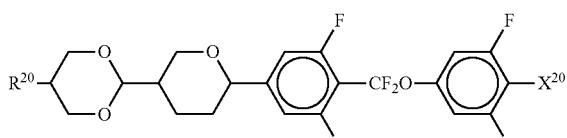  XIb
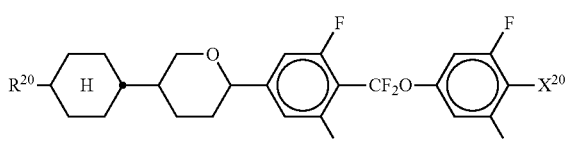  XIc
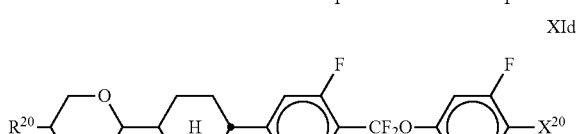  XId
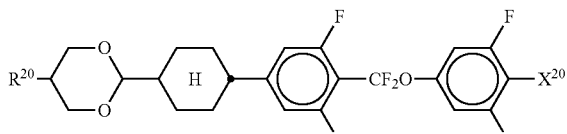  XIe
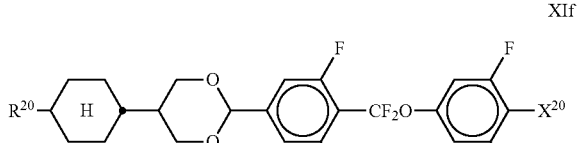  XIf
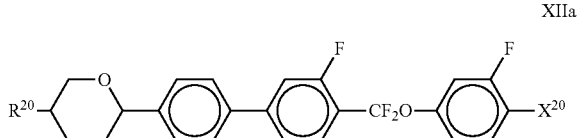  XIIa
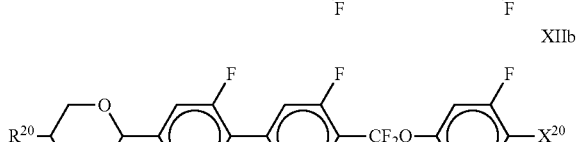  XIIb
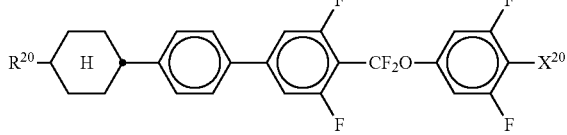  XIIc
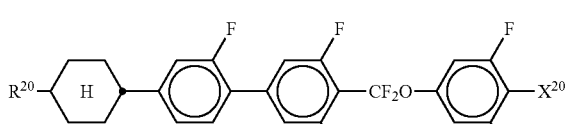  XIId
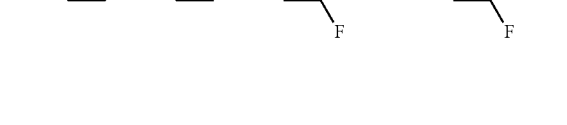

-continued

XIIe

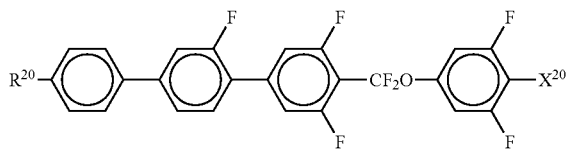

XIIf

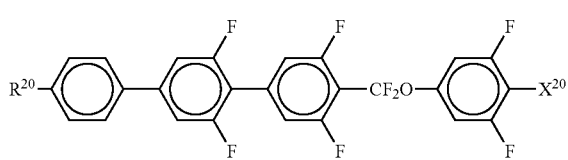

wherein $R^{20}$ and $X^{20}$ have the meaning indicated above and preferably $R^{20}$ denotes alkyl having 1 to 6 C atoms and $X^{20}$ denotes F.

The mixture according to the invention particularly preferably comprises at least one compound of the formula XIIa and/or XIIe.

jj) The medium comprises one or more compounds of formula T given above, preferably selected from the group of compounds of the formulae T21 to T23 and T25 to T27.

Particular preference is given to the compounds of the formulae T21 to T23. Very particular preference is given to the compounds of the formulae

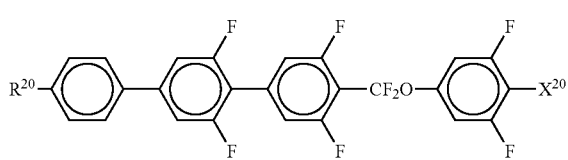

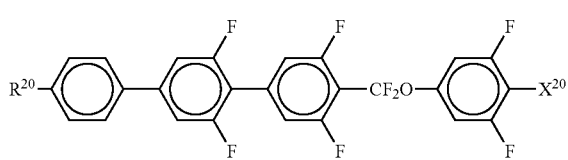

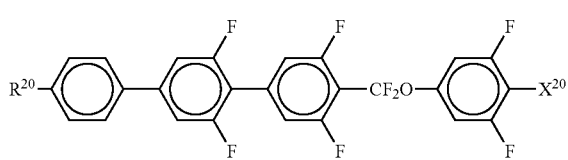

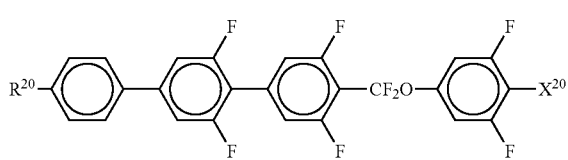

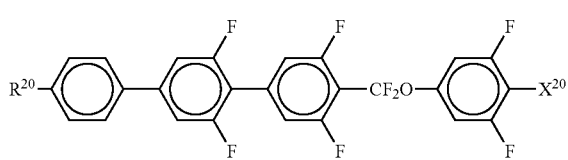

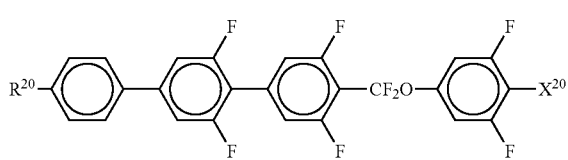

kk) The medium comprises one or more compounds selected from the group of formulae DK9, DK10 and DK11 given above.

ll) The medium additionally comprises one or more compounds selected from the following formulae:

XIII

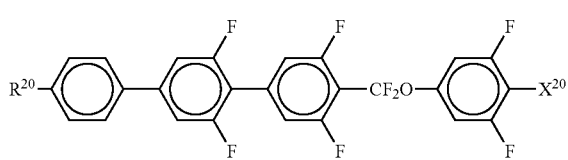

XIV

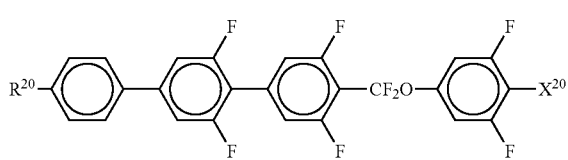

XV

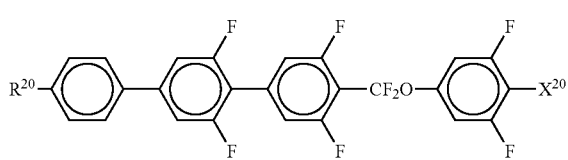

XVI

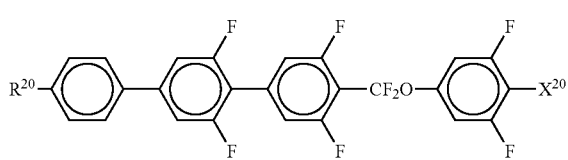

XVII

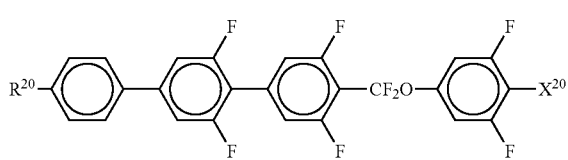

XVIII

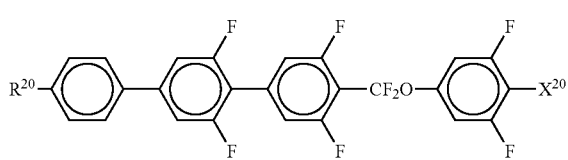

wherein $R^{20}$ and $X^{20}$ each, independently of one another, have one of the meanings indicated above, and $Y^{20\text{-}23}$ each, independently of one another, denote H or F. $X^{20}$ is preferably F, Cl, $CF_3$, $OCF_3$ or $OCHF_2$. $R^{20}$ preferably denotes alkyl, alkoxy, oxaalkyl, fluoroalkyl or alkenyl, each having up to 6 C atoms.

The mixture according to the invention particularly preferably comprises one or more compounds of the formula XVIII-a,

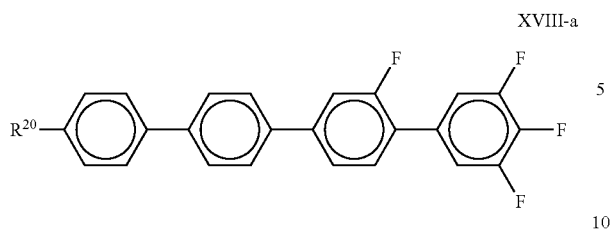

XVIII-a wherein $R^{20}$ has the meanings indicated above. $R^{20}$ preferably denotes straight-chain alkyl, in particular ethyl, n-propyl, n-butyl and n-pentyl and very particularly preferably n-propyl. The compound(s) of the formula XVIII, in particular of the formula XVIII-a, is (are) preferably employed in the mixtures according to the invention in amounts of 0.5-20% by weight, particularly preferably 1-15% by weight.

mm) The medium additionally comprises one or more compounds of the formula XIX,

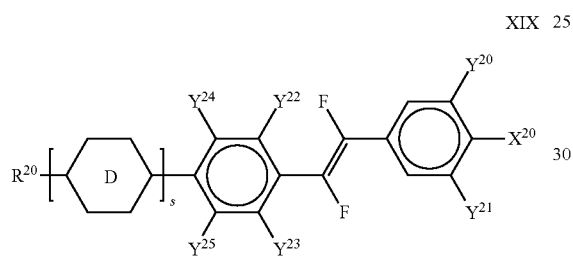

XIX wherein $R^{20}$, $X^{20}$ and $Y^{20-25}$ have the meanings indicated in formula I, s denotes 0 or 1, and

denotes

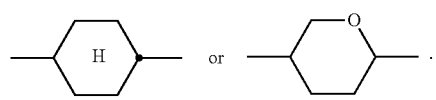

In the formula XIX, $X^{20}$ may also denote an alkyl radical having 1-6 C atoms or an alkoxy radical having 1-6 C atoms. The alkyl or alkoxy radical is preferably straight-chain.

$R^{20}$ preferably denotes alkyl having 1 to 6 C atoms. $X^{20}$ preferably denotes F;

The compounds of the formula XIX are preferably selected from the following formulae:

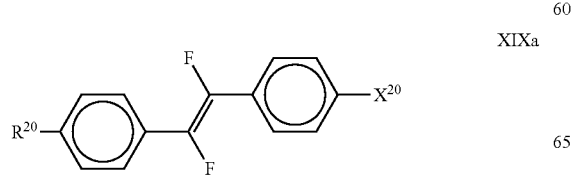

XIXa

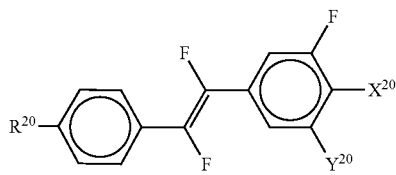

XIXb

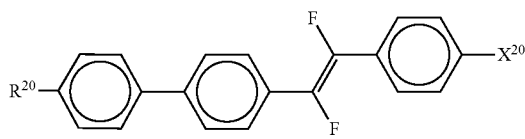

XIXc

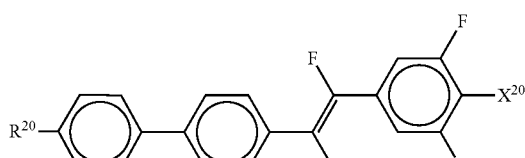

XIXd

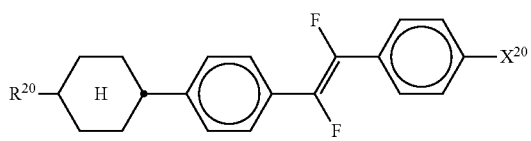

XIXe

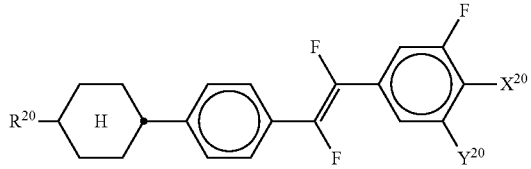

XIXf

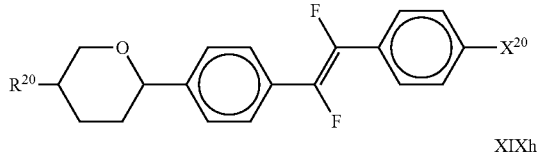

XIXg

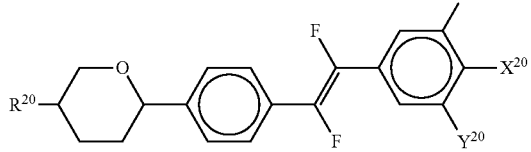

XIXh wherein $R^{20}$, $X^{20}$ and $Y^{20}$ have the meanings indicated above. $R^{20}$ preferably denotes alkyl having 1 to 6 C atoms. $X^{20}$ preferably denotes F, and $Y^{20}$ is preferably F;

$X^{20}$ is preferably F,

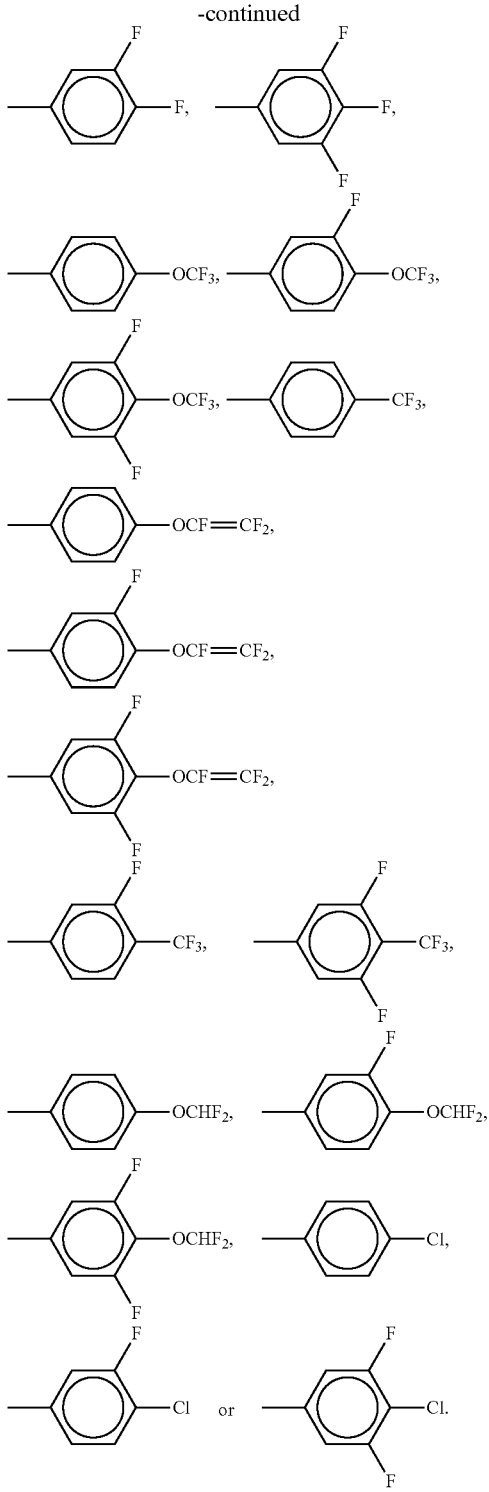

R$^{20}$ is straight-chain alkyl or alkenyl having 2 to 6 C atoms;

nn) The medium comprises one or more compounds of the formulae G1 to G4 given above, preferably selected from G1 and G2 wherein alkyl denotes C$_{1-6}$-alkyl, L$^x$ denotes H and X denotes F or Cl. In G2, X particularly preferably denotes Cl.

oo) The medium comprises one or more compounds of the following formulae:

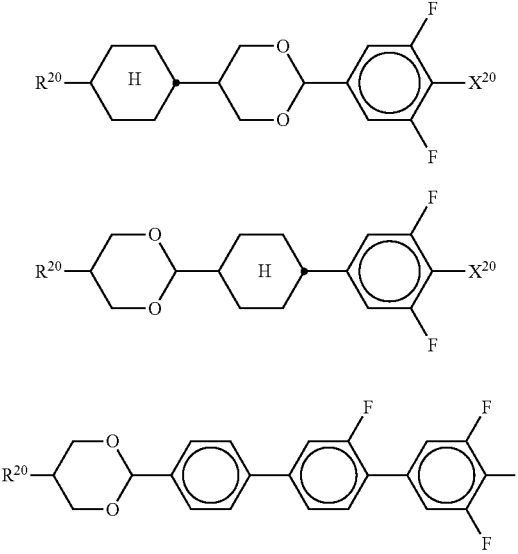

wherein R$^{20}$ and X$^{20}$ have the meanings indicated above. R$^{20}$ preferably denotes alkyl having 1 to 6 C atoms. X$^{20}$ preferably denotes F. The medium according to the invention particularly preferably comprises one or more compounds of the formula XXII wherein X$^{20}$ preferably denotes F. The compound(s) of the formulae XX-XXII is (are) preferably employed in the mixtures according to the invention in amounts of 1-20% by weight, particularly preferably 1-15% by weight. Particularly preferred mixtures comprise at least one compound of the formula XXII.

pp) The medium comprises one or more compounds of the following pyrimidine or pyridine compounds of the formulae

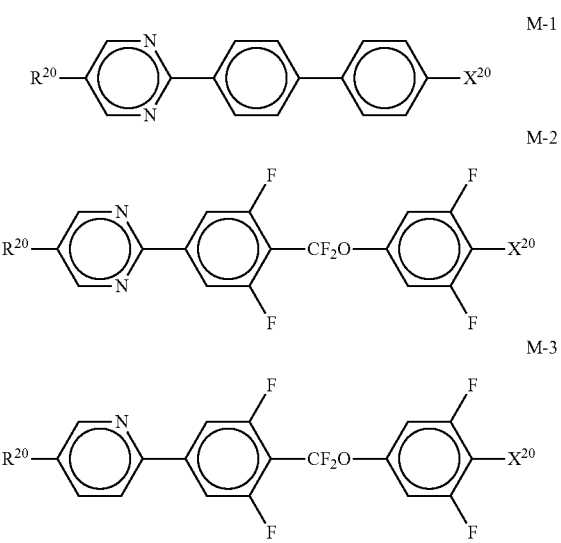

wherein R$^{20}$ and X$^{20}$ have the meanings indicated above. R$^{20}$ preferably denotes alkyl having 1 to 6 C atoms. X$^{20}$ preferably denotes F. The medium according to the invention particularly preferably comprises one or more compounds of the formula M-1, wherein X$^{20}$ preferably denotes F. The compound(s) of the formulae M-1-M-3 is (are) preferably employed in the mixtures according to the invention in amounts of 1-20% by weight, particularly preferably 1-15% by weight.

Further preferred embodiments are indicated below:

qq) The medium comprises two or more compounds of the formula XII, in particular of the formula XIIe;

rr) The medium comprises 2-30% by weight, preferably 3-20% by weight, particularly preferably 3-15% by weight, of compounds of the formula XII;

ss) Besides the compounds of the formulae XII, the medium comprises further compounds selected from the group of the compounds of the formulae II, III, IX-XIII, XVII and XVIII;

tt) The proportion of compounds of the formulae II, III, IX-XI, XIII, XVII and XVIII in the mixture as a whole is 40 to 95% by weight;

uu) The medium comprises 10-50% by weight, particularly preferably 12-40% by weight, of compounds of the formulae II and/or III;

vv) The medium comprises 20-70% by weight, particularly preferably 25-65% by weight, of compounds of the formulae IX-XIII;

ww) The medium comprises 4-30% by weight, particularly preferably 5-20% by weight, of compounds of the formula XVII;

xx) The medium comprises 1-20% by weight, particularly preferably 2-15% by weight, of compounds of the formula XVIII;

yy) The medium comprises at least two compounds of the formulae

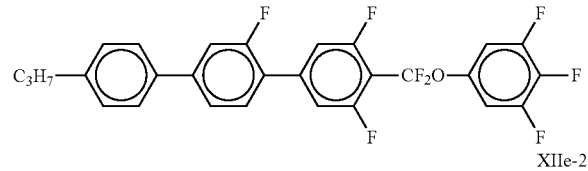

XIIe-1

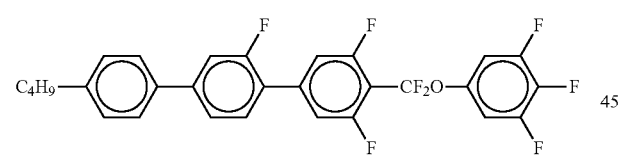

XIIe-2

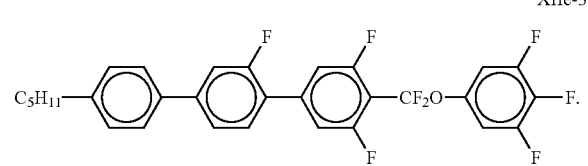

XIIe-3 zz) The medium comprises at least two compounds of the formulae

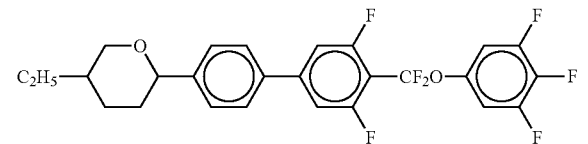

XIIa-1

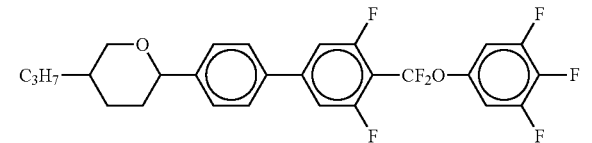

XIIa-2

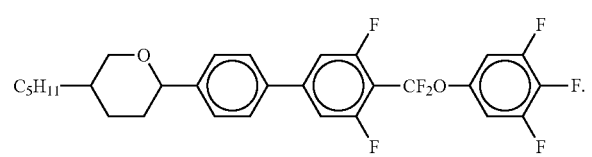

XIIa-3 aaa) The medium comprises at least two compounds of the formula XIIa and at least two compounds of the formula XIIe.

bbb) The medium comprises at least one compound of the formula XIIa and at least one compound of the formula XIIe and at least one compound of the formula IIIa.

ccc) The medium comprises at least two compounds of the formula XIIa and at least two compounds of the formula XIIe and at least one compound of the formula IIIa.

ddd) The medium comprises in total ≥25% by weight, preferably ≥30% by weight, of one or more compounds of the formula XII.

eee) The medium comprises ≥20% by weight, preferably ≥24% by weight, preferably 25-60% by weight, of compounds of the formula ZK3, in particular the compound of the formula ZK3a,

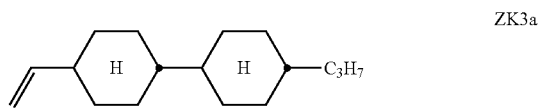

ZK3a fff) The medium comprises at least one compound selected from the group of compounds ZK3a, ZK3b and ZK3c, preferably ZK3a, in combination with compound ZK3d

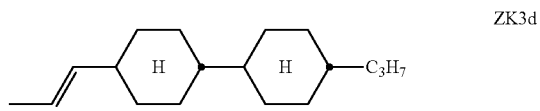

ZK3d ggg) The medium comprises at least one compound of the formula DPGU-n-F.

hhh) The medium comprises at least one compound of the formula CDUQU-n-F.

iii) The medium comprises at least one compound of the formula CPU-n-OXF.

jjj) The medium comprises at least one compound of the formula CPGU-3-OT.

kkk) The medium comprises at least one compound of the formula PPGU-n-F.

lll) The medium comprises at least one compound of the formula PGP-n-m, preferably two or three compounds.

mmm) The medium comprises at least one compound of the formula PGP-2-2V having the structure

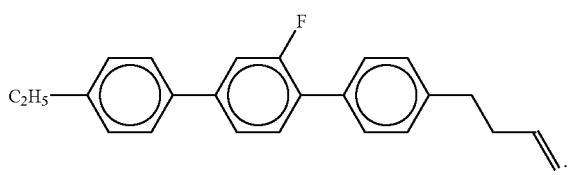

The media according to the invention preferably comprise from 0.01 to 10%, particularly preferably from 0.05 to 5% and most preferably from 0.1 to 3% of component A) comprising compounds of formula I according to the invention. The media preferably comprise one, two or three, more preferably one or two and most preferably one compound of the formula I according to the invention.

In a preferred embodiment component A) consists of compounds of formula I.

The media according to the invention preferably comprise from 0.01 to 10%, particularly preferably from 0.05 to 7.5% and most preferably from 2 to 5% of the compounds of component C) comprising compounds of formula P according to the invention. The media preferably comprise one, two or three, more preferably one or two and most preferably one compound of the formula P according to the invention.

The compounds used in the present invention are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

The compounds of formula I are preferably synthesised according to or in analogy to the procedure described in GB 2 306 470 A.

The compounds of formula I are more preferably synthesised according to the process depicted in schemes 1 and 2. In scheme 2, a preferred synthesis of compounds of formula I without spacer groups is shown. In scheme 1, "Spacer[1]" or "Spacer[2]" denotes a group "Sp" as indicated above. Pg denotes a protecting group. Suitable protecting groups are known to the skilled person from the literature, as for example from P.G.M. Wuts, Th.W. Greene, Greene's Protective Groups in Organic Synthesis, Fourth Edition, 2007 John Wiley & Sons, Inc. Examples are 2-tetrahydropyranyl, benzyl, trimethylsilyl, tertbutyldimethylsilyl, triisopropylsilyl, methoxymethyl, and the like.

Scheme 1.

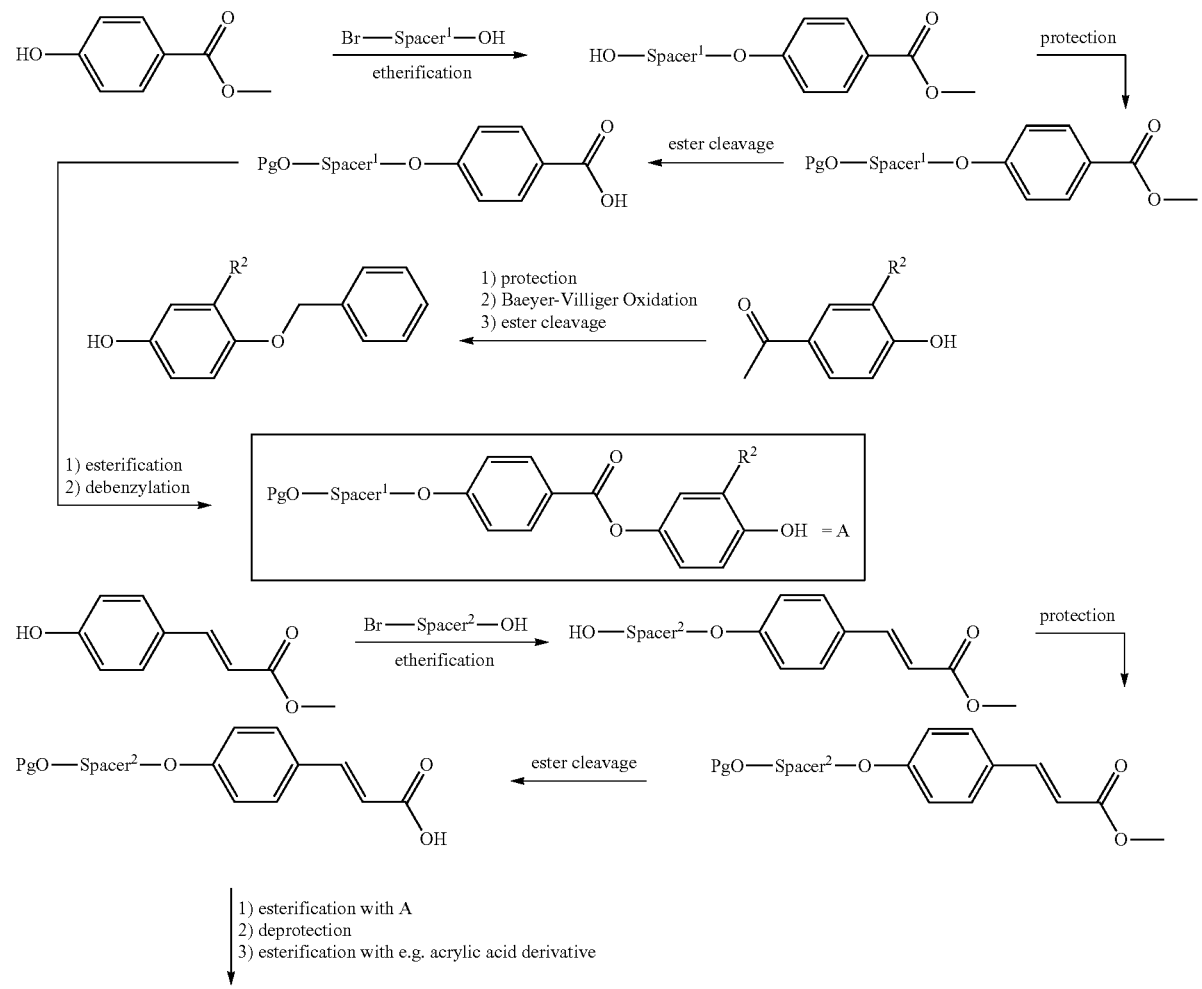

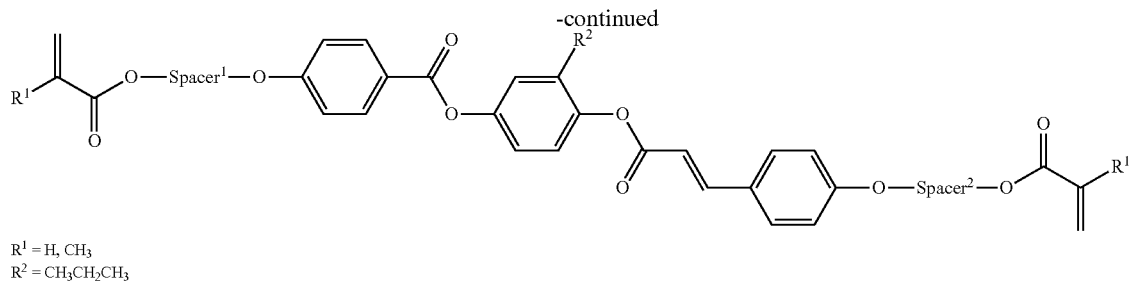

$R^1 = H, CH_3$
$R^2 = CH_3CH_2CH_3$

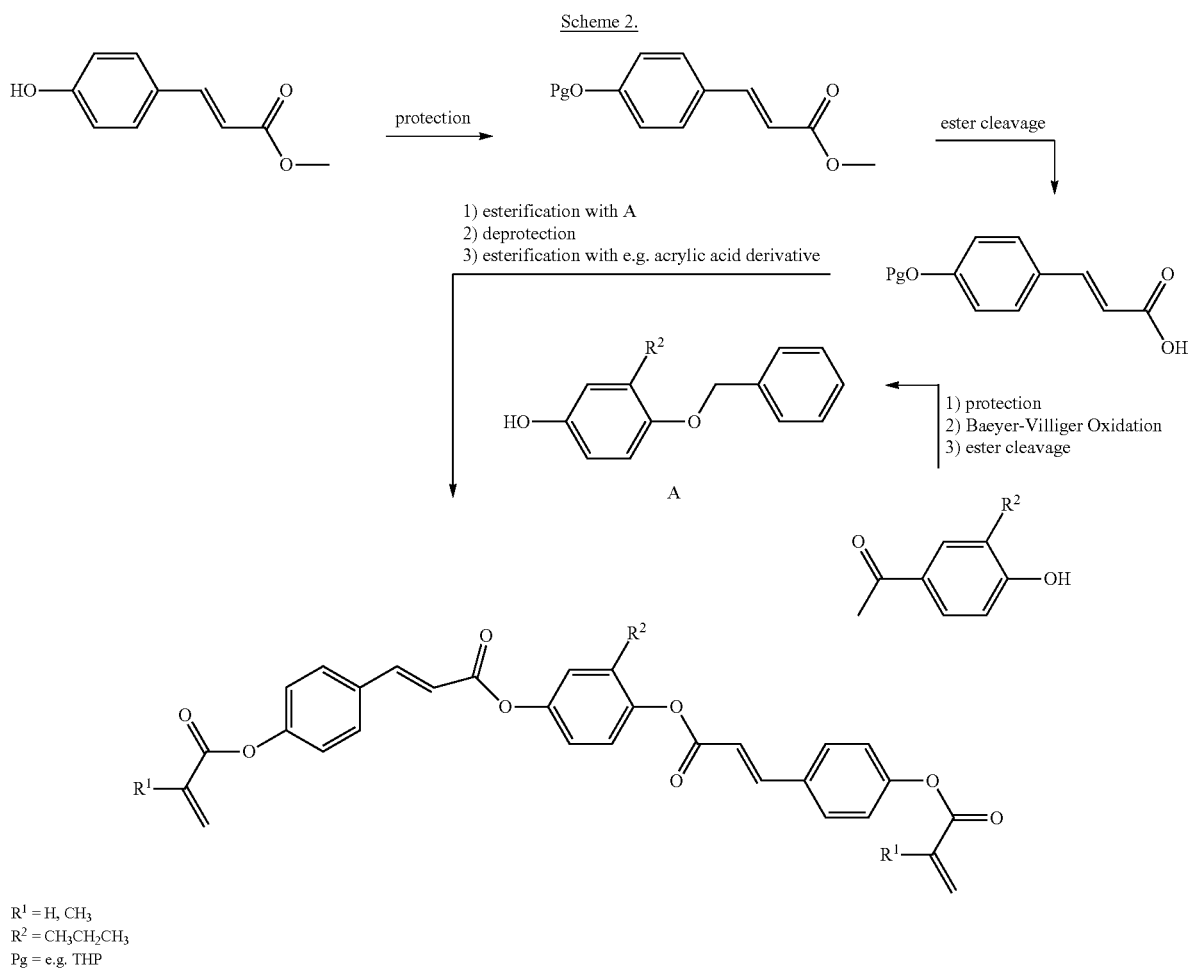

$R^1 = H, CH_3$
$R^2 = CH_3CH_2CH_3$
Pg = e.g. THP

In the following, the production process according to the present invention is described in greater detail.

The first substrate includes a pixel electrode and a common electrode for generating an electric field substantially parallel to a surface of the first substrate in the pixel region. Different kinds of displays having at least two electrodes on one substrate are known to the skilled person wherein the most important difference is that either both the pixel electrode and the common electrode are structured, as it is typical for IPS displays, or only the pixel electrode is structured and the common electrode is unstructured, which is the case for FFS displays.

It has to be understood that the present invention refers to any kind of electrode configurations mentioned above, i.e. IPS as well as FFS displays.

The process according to the present invention is independent of the kind of substrate or material of the surface which is in contact with the liquid crystal mixture according to the invention, during and after this process.

Examples of materials used for the substrates or surfaces are organic polymers including polyimide, indium tin oxide (ITO), indium zinc oxide (IZO), silicon nitride ($SiN_x$) and silicon dioxide($SiO_2$). The process is especially suitable for the use in displays containing substrates that do not have a polyimide layer on one or more of the surfaces that are in contact with the liquid crystal.

In case one or more substrates contain a polyimide layer, the polyimide can be rubbed or not rubbed, preferably not rubbed.

Hence, the invention relates to a display produced by the process according to the invention in which the substrates contain a rubbed or unrubbed polyimide layer, preferably an unrubbed polyimide layer.

The invention further relates to a display produced by the process according to the invention in which none or only one of the top and bottom substrates contains a polyimide layer.

In one embodiment of the present invention the liquid crystal composition is injected between the first and second substrates or is filled into the cell by capillary force after combining the first and second substrates. In an alternative embodiment, the liquid crystal composition may be interposed between the first and second substrates by combining the second substrate to the first substrate after loading the liquid crystal composition on the first substrate. Preferably, the liquid crystal is dispensed dropwise onto a first substrate in a process known as "one drop filling" (ODF) process, as disclosed in for example JPS63-179323 and JPH10-239694, or using the Ink Jet Printing (IJP) method.

In a preferred embodiment, the process according to the invention contains a process step where the liquid crystal inside the display panel is allowed to rest for a period of time in order to evenly redistribute the liquid crystal medium inside the panel (herein referred to as "annealing").

For the production of the displays according to the present invention, the photoreactive mesogen of formula I is preferably allowed to redistribute in the panel. After filling and assembly, the display panel is annealed for a time between 1 min and 3 h, preferably between 10 min and 1 h and most preferably between 20 min and 30 min. The annealing is preferably performed at room temperature.

In an alternative embodiment, the annealing is performed at elevated temperature, preferably at above 20° C. and below 140° C., more preferably above 40° C. and below 100° C. and most preferably above 50° C. and below 80° C.

In a preferred embodiment, one or more of the process steps of filling the display, annealing, photoalignment and curing of the polymerisable compound is performed at a temperature above the clearing point of the liquid crystal host mixture.

During the photoalignment of the liquid crystal inside the liquid crystal panel, anisotropy is induced by exposing the display or the liquid crystal layer to linearly polarised light.

In a preferred embodiment of the present invention the photoreactive component A) is photoaligned in a first step using linearly polarised light and in a second step further cured using linearly polarized or unpolarised UV light. In the second step the optional component C) is also further cured.

In another preferred embodiment, the linearly polarised light applied according to the inventive process is ultraviolet light which enables simultaneous photoalignment and photocuring of the photoreactive component A) and, if present, photocuring of the polymerisable component C).

Photoalignment of the photoreactive compounds of formula I and curing of the polymerisable groups of compounds of formula I and the curing of the optional polymerisable compounds of formula P can be performed simultaneously or stepwise. In case the process is split into different steps, the individual steps can be performed at the same temperature or at different temperatures.

After the photoalignment and curing step(s) a so-called "post-curing" step can optionally be performed by irradiation with UV-light and/or visible light (both either linearly or unpolarised) at reduced temperature in order to remove unreacted polymerisable compounds. The post-curing is preferably performed at above 20° C. and below 70° C.° C., more preferably below 60° C. and most preferably above 20° C. and below 40° C.

The polymerisable compounds are optionally polymerised or crosslinked (if a polymerisable compound contains two or more polymerisable groups) with the application of an electrical field. The polymerisation can be carried out in one or more steps.

Suitable and preferred polymerisation methods for component C) are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (BASF SE). If an initiator is employed, its proportion is preferably 0.001 to 5% by weight, particularly preferably 0.001 to 1% by weight.

According to the present invention, an alkyl radical and/or an alkoxy radical may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or -heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl preferably denotes straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

An alkyl radical in which one $CH_2$ group has been replaced by —CH=CH—, may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

An alkyl or alkenyl radical which is at least monosubstituted by halogen is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the w-position.

In the formulae above and below, polar end groups (substituents X) are preferably F, Cl or a mono- or polyfluorinated alkyl or alkoxy radical having 1, 2 or 3 C atoms or a mono- or polyfluorinated alkenyl radical having 2 or 3 C atoms. They are particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$, OCH=CF$_2$ or CH=CF$_2$, very particularly preferably F or OCF$_3$, furthermore CF$_3$, OCF=CF$_2$, OCHF$_2$ or OCH=CF$_2$.

The media according to the invention are prepared in a manner conventional per se. In general, the components are dissolved in one another, preferably at elevated temperature. By means of suitable additives, the liquid-crystalline phases of the present invention can be modified in such a way that they can be used in all types of liquid-crystal display element that have been disclosed hitherto. Additives of this type are known to the person skilled in the art and are described in detail in the literature (H. Kelker/R. Hatz, Handbook of Liquid Crystals, Verlag Chemie, Weinheim, 1980). For example, pleochroic dyes can be added for the production of coloured guest-host systems or substances can be added in order to modify the dielectric anisotropy, the viscosity and/or the alignment of the nematic phases.

The present invention also relates to electro-optical liquid-crystal display elements containing a liquid-crystalline medium according to the invention. In a preferred embodiment the liquid crystal display is of the IPS or FFS mode.

Further combinations of the embodiments and variants of the invention in accordance with the description arise from the claims.

The invention is explained in greater detail below with reference to working examples, but without intending to be restricted thereby. The person skilled in the art will be able to glean from the examples working details that are not given in detail in the general description, generalise them in accordance with general expert knowledge and apply them to a specific problem.

Besides the usual and well-known abbreviations, the following abbreviations are used:

C: crystalline phase; N: nematic phase; Sm: smectic phase; I: isotropic phase. The numbers between these symbols show the transition temperatures of the substance concerned.

Temperature data are in ° C., unless indicated otherwise.

Physical, physicochemical or electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

Above and below, Δn denotes the optical anisotropy (589 nm, 20° C.) and Δε denotes the dielectric anisotropy (1 kHz, 20° C.). The dielectric anisotropy Δε is determined at 20° C. and 1 kHz. The optical anisotropy Δn is determined at 20° C. and a wavelength of 589.3 nm.

The Δε and Δn values and the rotational viscosity ($\gamma_1$) of the compounds according to the invention are obtained by linear extrapolation from liquid-crystalline mixtures consisting of 5 to 10% of the respective compound according to the invention and 90-95% of the commercially available liquid-crystal mixture ZLI-2857 (for Δε) or ZLI-4792 (for Δn, $\gamma_1$) (mixtures, Merck KGaA, Darmstadt).

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

C, P, D, DI, A, AI, G, GI, U, UI, Y, M, MI, N, NI, Np, dH, N3f, N3fI

TABLE A-continued

Ring elements

| | | | |
|---|---|---|---|
| tH | (structure) | tHI | (structure) |
| tH2f | (structure) | tH2fI | (structure) |
| K | (structure) | KI | (structure) |
| L | (structure) | LI | (structure) |
| F | (structure) | Fl | (structure) |
| Nf | (structure) | Nfl | (structure) |

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | T | —C≡C— |

TABLE C

End groups

| Left-hand side | | Right-hand side | |
|---|---|---|---|
| Use alone | | | |
| -n- | C$_n$H$_{2n+1}$— | -n | —C$_n$H$_{2n+1}$ |
| -nO— | C$_n$H$_{2n+1}$—O— | -nO | —O—C$_n$H$_{2n+1}$ |
| —V— | CH$_2$=CH— | —V | —CH=CH$_2$ |
| -nV— | C$_n$H$_{2n+1}$—CH=CH— | -nV | —C$_n$H$_{2n}$—CH=CH$_2$ |
| —Vn- | CH$_2$=CH—C$_n$H$_{2n+1}$— | —Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | CFH$_2$— | —M | —CFH$_2$ |
| —D— | CF$_2$H— | —D | —CF$_2$H |
| —T— | CF$_3$— | —T | —CF$_3$ |
| —MO— | CFH$_2$O— | —OM | —OCFH$_2$ |
| —DO— | CF$_2$HO— | —OD | —OCF$_2$H |
| —TO— | CF$_3$O— | —OT | —OCF$_3$ |
| —FXO— | CF$_2$=CH—O— | —OXF | —O—CH=CF$_2$ |
| —A— | H—C≡C— | —A | —C≡C—H |
| -nA— | C$_n$H$_{2n+1}$—C≡C— | —An | —C≡C—C$_n$H$_{2n+1}$ |
| —NA— | N≡C—C≡C— | —AN | —C≡C—C≡N |
| Use together with one another and with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each denote integers, and the three dots "..." are placeholders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures $C_nH_{2n+1}$—⬡—⬡—$C_mH_{2m+1}$

CC-n-m $C_nH_{2n+1}$—⬡—⬡—O—$C_mH_{2m+1}$

CC-n-Om $C_nH_{2n+1}$—⬡—⬡—CH=CH$_2$

CC-n-V $C_nH_{2n+1}$—⬡—⬡—CH=CH—$C_mH_{2m+1}$

CC-n-Vm $C_nH_{2n+1}$—⬡—⬡—(CH$_2$)$_m$—CH=CH$_2$

CC-n-mV $C_nH_{2n+1}$—⬡—⬡—(CH$_2$)$_m$—CH=CH—$C_lH_{2l+1}$

CC-n-mVl

H$_2$C=CH—⬡—⬡—CH=CH$_2$

CC-V-V

CH$_2$=CH—⬡—⬡—(CH$_2$)$_m$—CH=CH$_2$

CC-V-mV

CH$_2$=CH—⬡—⬡—CH=CH—$C_mH_{2m+1}$

CC-V-Vm

CH$_2$=CH—(CH$_2$)$_n$—⬡—⬡—(CH$_2$)$_m$—CH=CH$_2$

CC-Vn-mV $C_nH_{2n+1}$—CH=CH—⬡—⬡—(CH$_2$)$_m$—CH=CH$_2$

CC-nV-mV

TABLE D-continued

| Illustrative structures |
|---|

$C_nH_{2n+1}$—CH=CH—[Cy]—[Cy]—CH=CH—$C_mH_{2m+1}$

CC-nV-Vm $C_nH_{2n+1}$—[Cy]—[Ph]—$C_mH_{2m+1}$

CP-n-m $C_nH_{2n+1}$O—[Cy]—[Ph]—$C_mH_{2m+1}$

CP-nO-m $C_nH_{2n+1}$—[Cy]—[Ph]—O$C_mH_{2m+1}$

CP-n-Om $CH_2$=CH—[Cy]—[Ph]—$C_mH_{2m+1}$

CP-V-m $CH_2$=CH—$(CH_2)_n$—[Cy]—[Ph]—$C_mH_{2m+1}$

CP-Vn-m $C_nH_{2n+1}$—CH=CH—[Cy]—[Ph]—$C_mH_{2m+1}$

CP-nV-m $H_2C$=CH—[Cy]—[Ph]—CH=$CH_2$

CP-V-V $CH_2$=CH—[Cy]—[Ph]—$(CH_2)_m$—CH=$CH_2$

CP-V-mV $CH_2$=CH—[Cy]—[Ph]—CH=CH—$C_mH_{2m+1}$

CP-V-Vm $CH_2$=CH—$(CH_2)_n$—[Cy]—[Ph]—$(CH_2)_m$—CH=$CH_2$

CP-Vn-mV

TABLE D-continued

Illustrative structures $C_nH_{2n+1}$—CH=CH—⟨cyclohexyl⟩—⟨phenyl⟩—$(CH_2)_m$—CH=CH$_2$ CP-nV-mV $C_nH_{2n+1}$—CH=CH—⟨cyclohexyl⟩—⟨phenyl⟩—CH=CH—$C_mH_{2m+1}$ CP-nV-Vm $C_nH_{2n+1}$—⟨phenyl⟩—⟨phenyl⟩—$C_mH_{2m+1}$ PP-n-m $C_nH_{2n+1}$O—⟨phenyl⟩—⟨phenyl⟩—$C_mH_{2m+1}$ PP-nO-m $C_nH_{2n+1}$—⟨phenyl⟩—⟨phenyl⟩—O$C_mH_{2m+1}$ PP-n-Om $C_nH_{2n+1}$—⟨phenyl⟩—⟨phenyl⟩—CH=CH$_2$ PP-n-V $C_nH_{2n+1}$—⟨phenyl⟩—⟨phenyl⟩—CH=CH—$C_mH_{2m+1}$ PP-n-Vm $C_nH_{2n+1}$—⟨phenyl⟩—⟨phenyl⟩—$(C_mH_{2m})$—CH=CH$_2$ PP-n-mV $C_nH_{2n+1}$—⟨phenyl⟩—⟨phenyl⟩—$(CH_2)_m$—CH=CH—$C_lH_{2l+1}$ PP-n-mVl $C_nH_{2n+1}$—⟨cyclohexyl⟩—⟨cyclohexyl⟩—⟨phenyl⟩—$C_mH_{2m+1}$ CCP-n-m $C_nH_{2n+1}$O—⟨cyclohexyl⟩—⟨cyclohexyl⟩—⟨phenyl⟩—$C_mH_{2m+1}$ CCP-nO-m TABLE D-continued
Illustrative structures
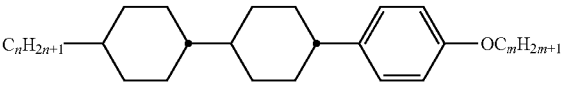
CCP-n-Om
CCP-n-V
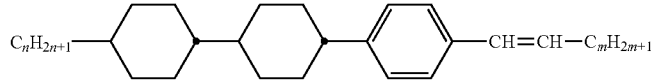
CCP-n-Vm
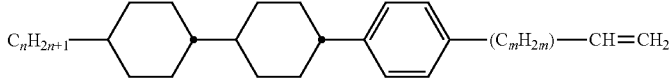
CCP-n-mV
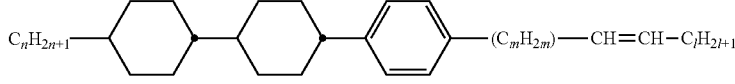
CCP-n-mVl
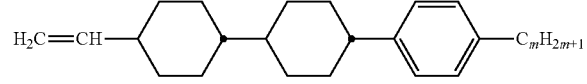
CCP-V-m
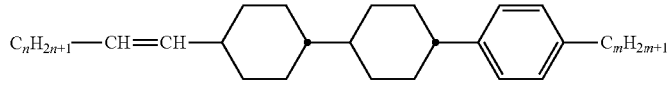
CCP-nV-m
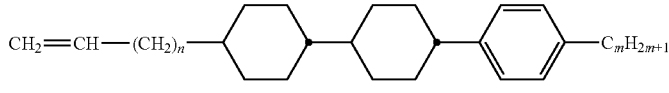
CCP-Vn-m
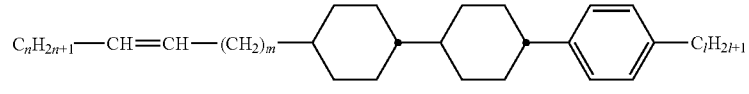
CCP-nVm-l
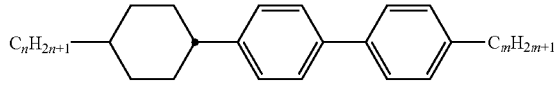
CPP-n-m
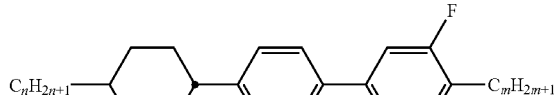
CPG-n-m TABLE D-continued
Illustrative structures
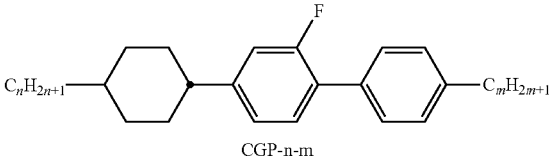
CGP-n-m
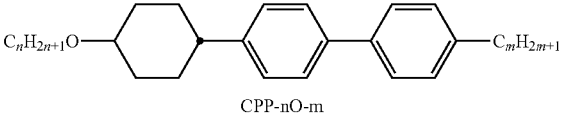
CPP-nO-m
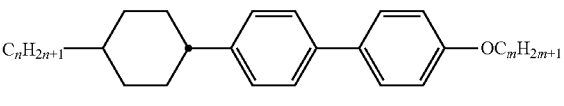
CPP-n-Om
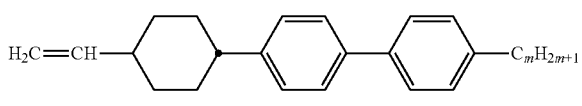
CPP-V-m
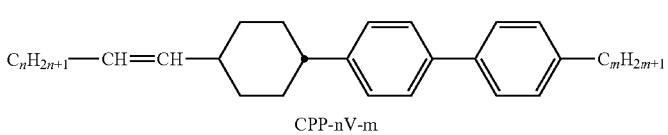
CPP-nV-m
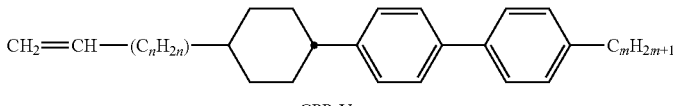
CPP-Vn-m
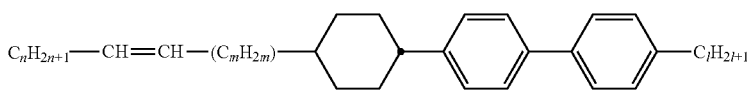
CPP-nVm-l
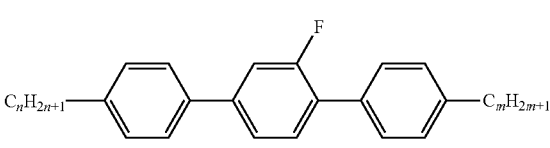
PGP-n-m
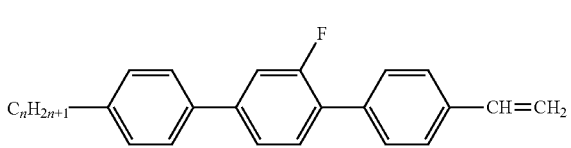
PGP-n-V
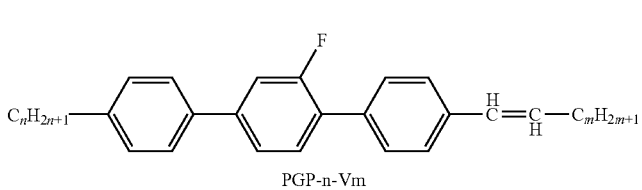
PGP-n-Vm TABLE D-continued
Illustrative structures
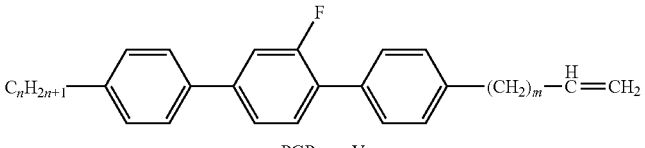
PGP-n-mV
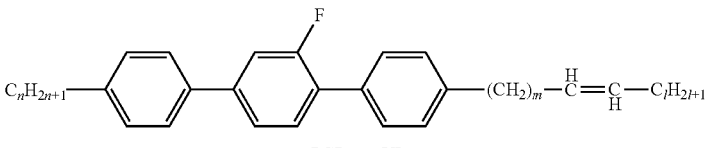
PGP-n-mVI
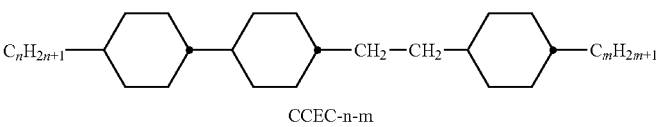
CCEC-n-m
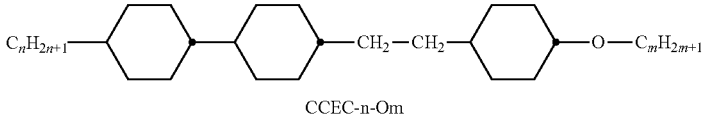
CCEC-n-Om
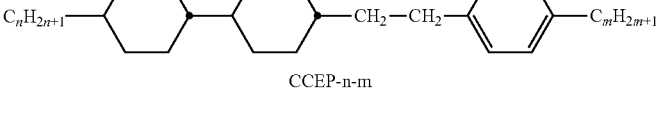
CCEP-n-m
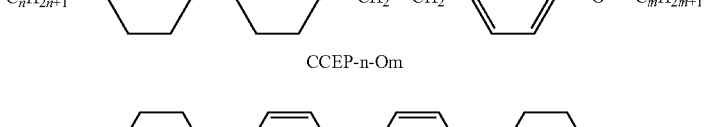
CCEP-n-Om
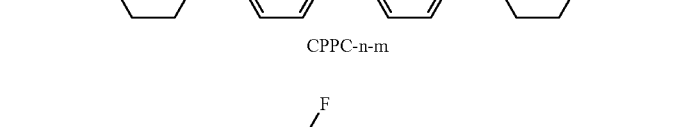
CPPC-n-m
CGPC-n-m
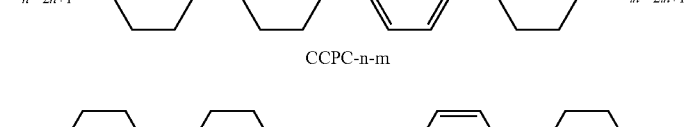
CCPC-n-m
CCZPC-n-m TABLE D-continued
Illustrative structures
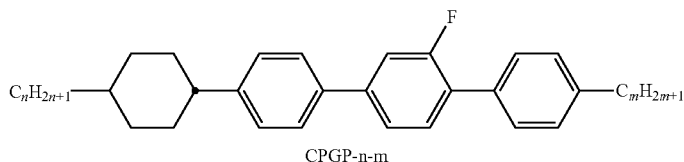
CPGP-n-m
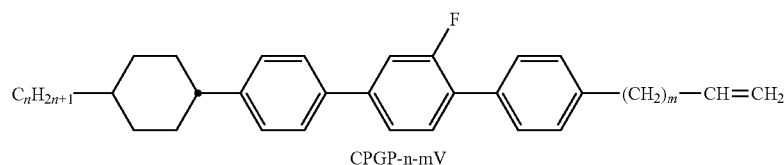
CPGP-n-mV
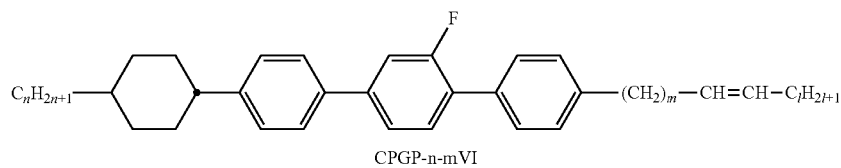
CPGP-n-mVI
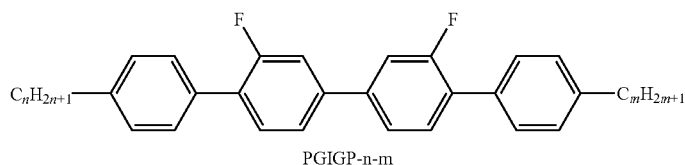
PGIGP-n-m
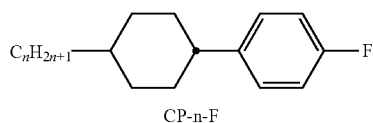
CP-n-F
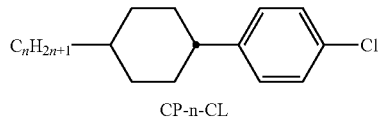
CP-n-CL
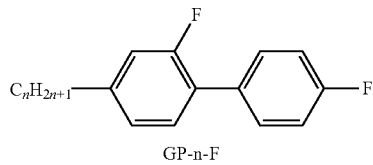
GP-n-F
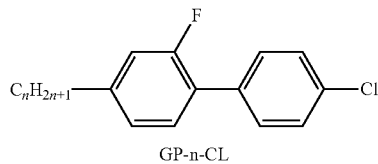
GP-n-CL
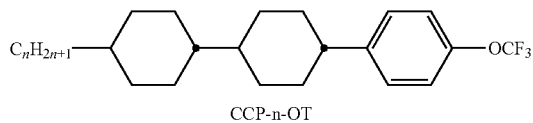
CCP-n-OT TABLE D-continued
Illustrative structures
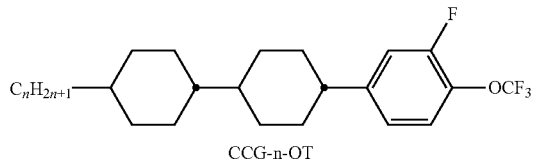
CCG-n-OT
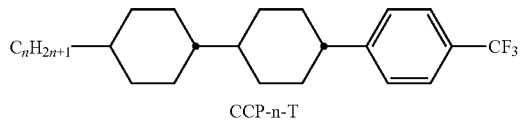
CCP-n-T
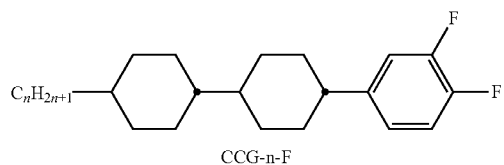
CCG-n-F
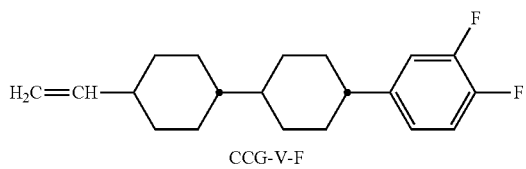
CCG-V-F
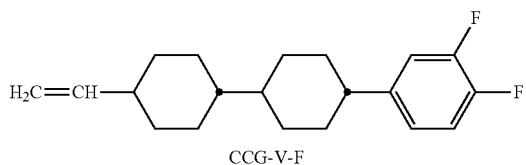
CCG-V-F
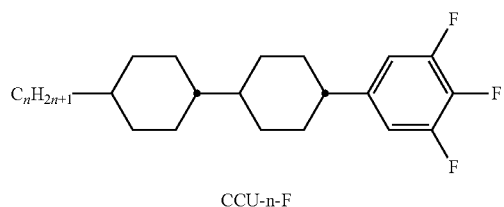
CCU-n-F
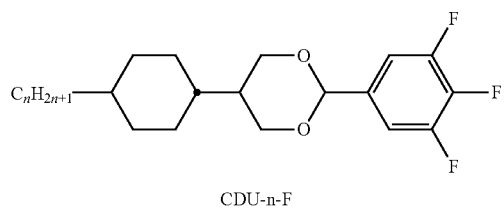
CDU-n-F
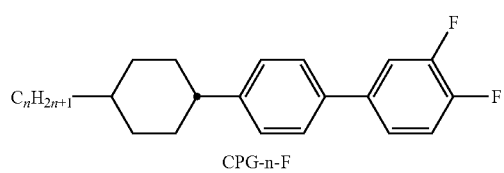
CPG-n-F TABLE D-continued
Illustrative structures
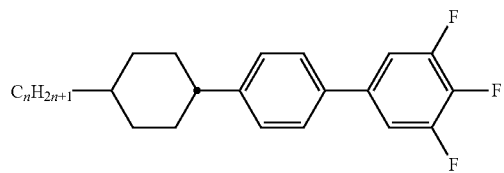
CPU-n-F
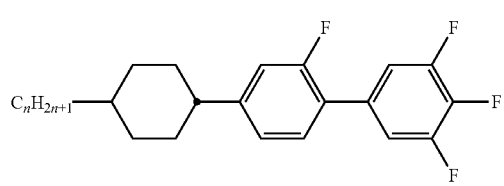
CGU-n-F
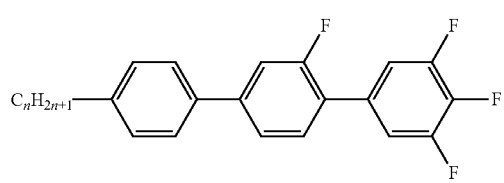
PGU-n-F
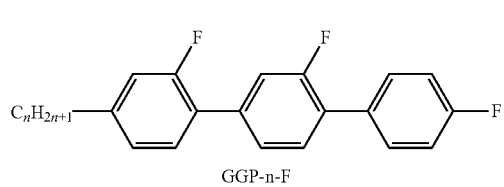
GGP-n-F
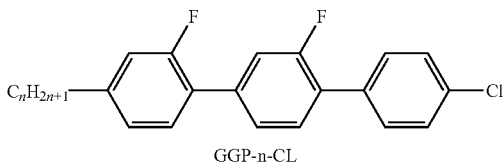
GGP-n-CL
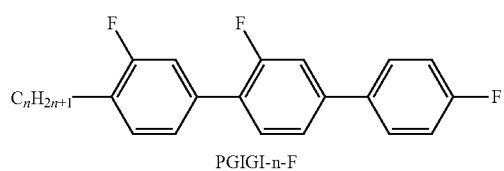
PGIGI-n-F
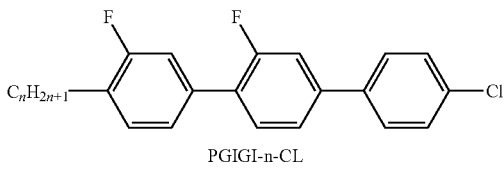
PGIGI-n-CL
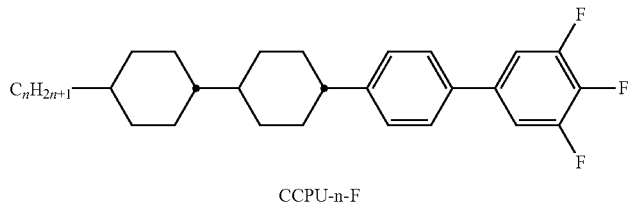
CCPU-n-F TABLE D-continued
Illustrative structures
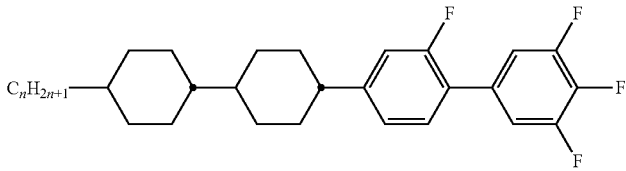
CCGU-n-F
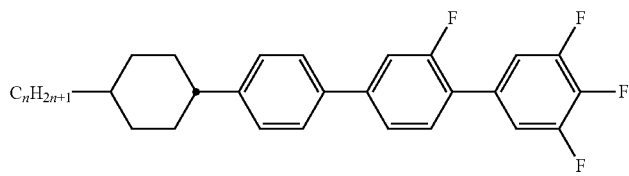
CPGU-n-F
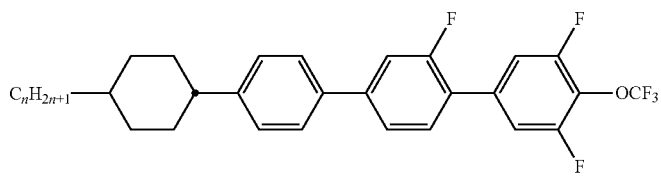
CPGU-n-OT
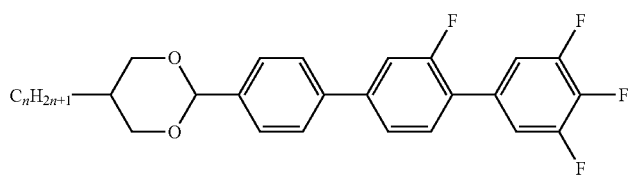
DPGU-n-F
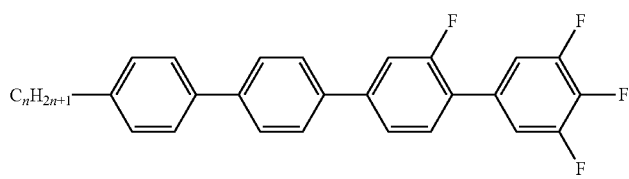
PPGU-n-F
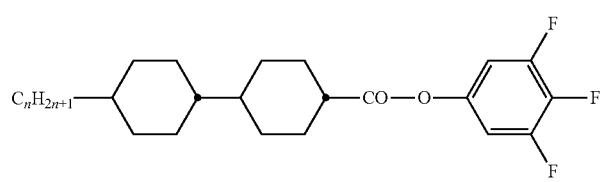
CCZU-n-F
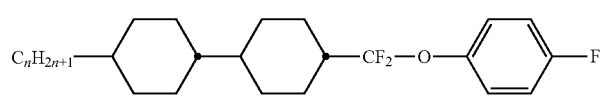
CCQP-n-F TABLE D-continued
Illustrative structures
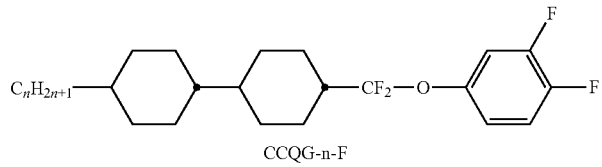
CCQG-n-F
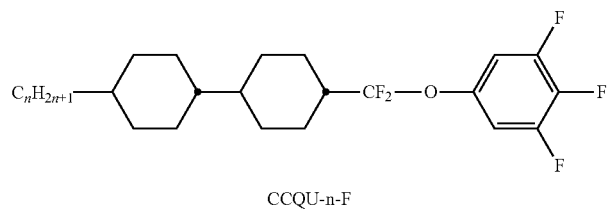
CCQU-n-F
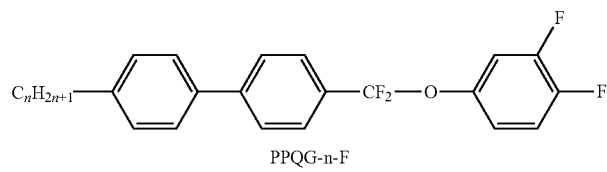
PPQG-n-F
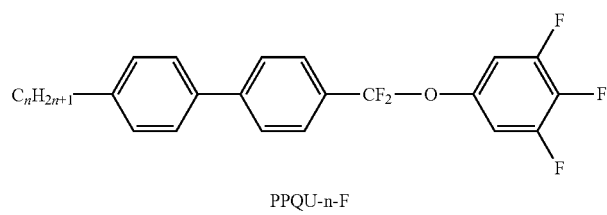
PPQU-n-F
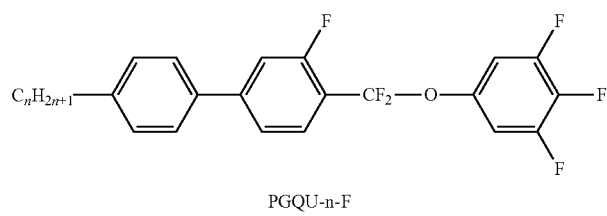
PGQU-n-F
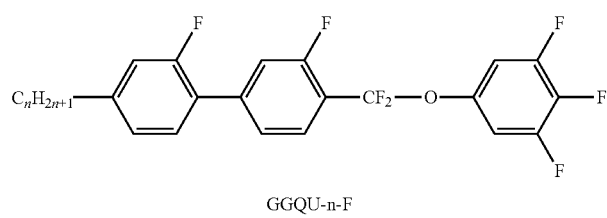
GGQU-n-F
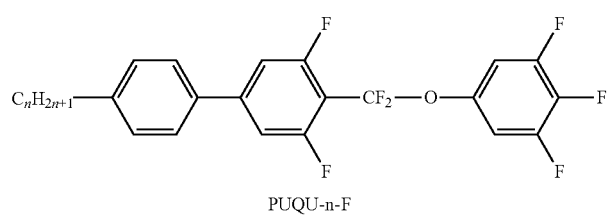
PUQU-n-F TABLE D-continued
Illustrative structures
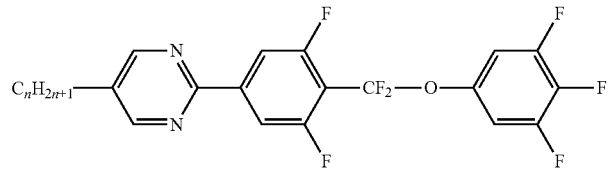
MUQU-n-F
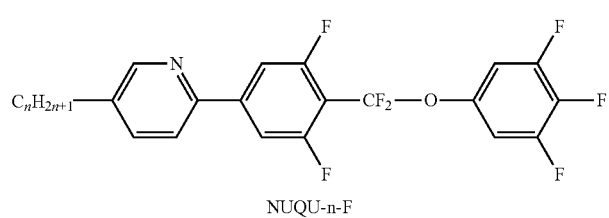
NUQU-n-F
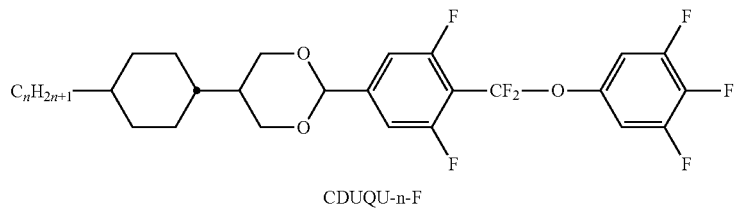
CDUQU-n-F
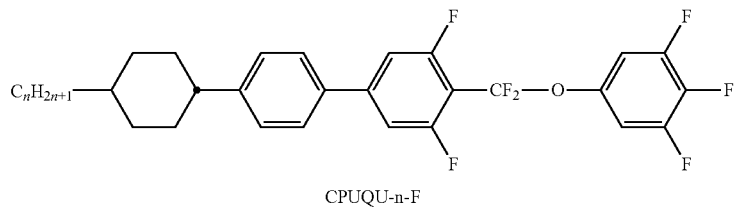
CPUQU-n-F
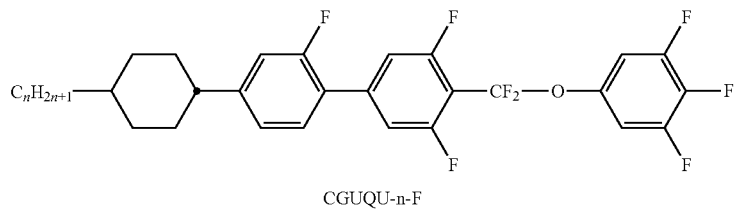
CGUQU-n-F
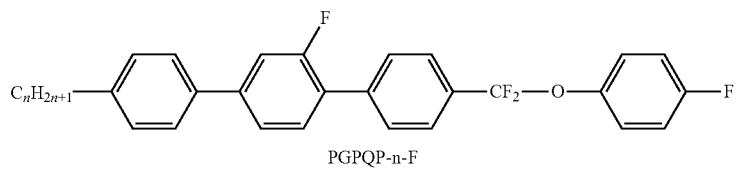
PGPQP-n-F
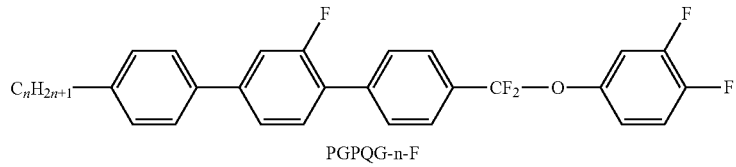
PGPQG-n-F TABLE D-continued
| Illustrative structures |
|---|
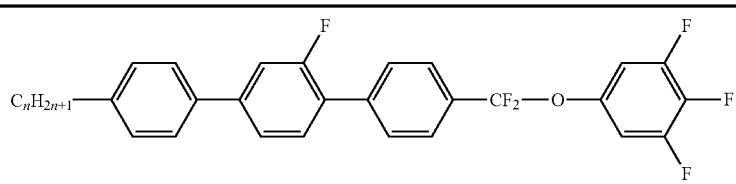
PGPQU-n-F
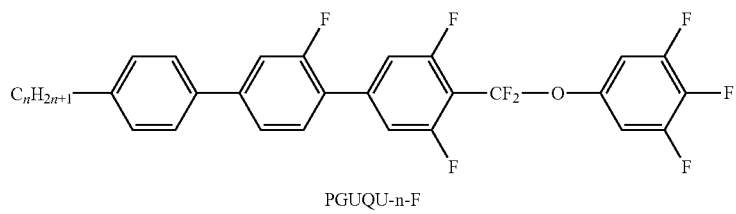
PGUQU-n-F
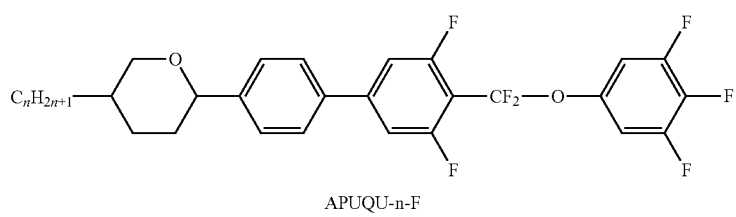
APUQU-n-F
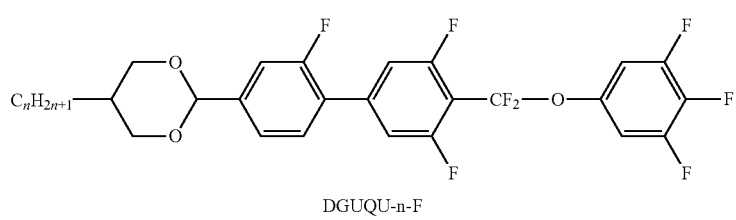
DGUQU-n-F
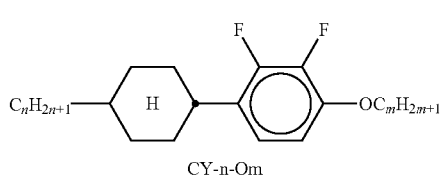
CY-n-Om
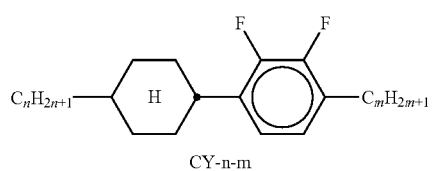
CY-n-m
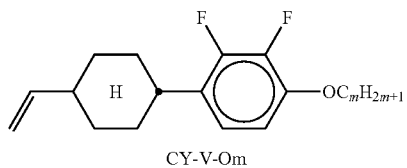
CY-V-Om
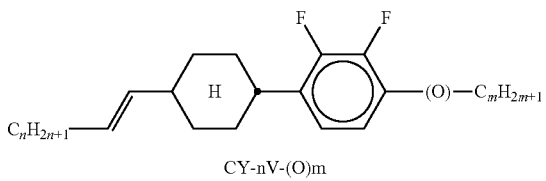
CY-nV-(O)m TABLE D-continued
Illustrative structures
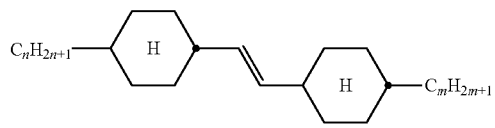
CVC-n-m
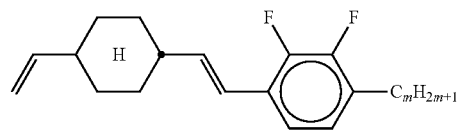
CVY-V-m
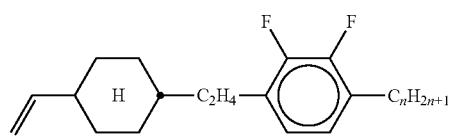
CEY-V-m
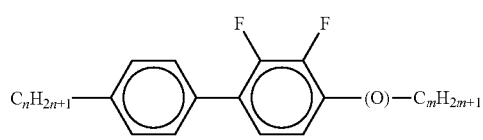
PY-n-(O)m
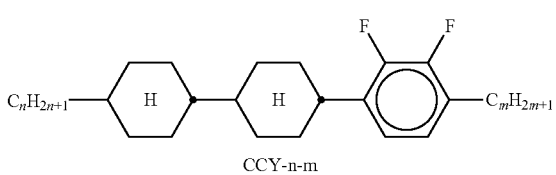
CCY-n-m
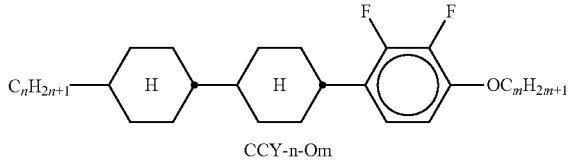
CCY-n-Om
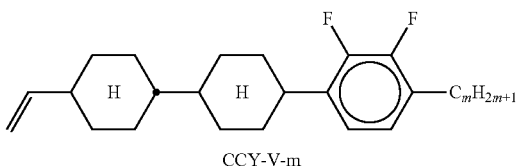
CCY-V-m
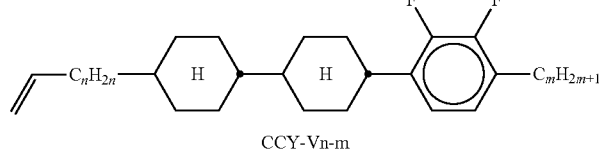
CCY-Vn-m TABLE D-continued
Illustrative structures
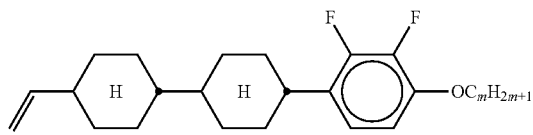
CCY-V-Om
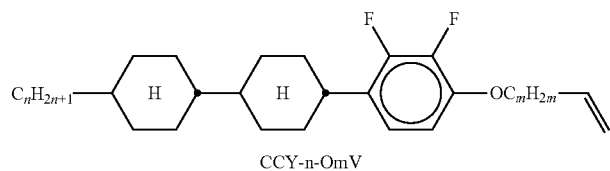
CCY-n-OmV
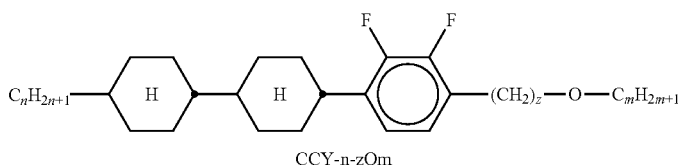
CCY-n-zOm
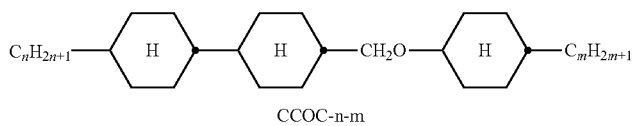
CCOC-n-m
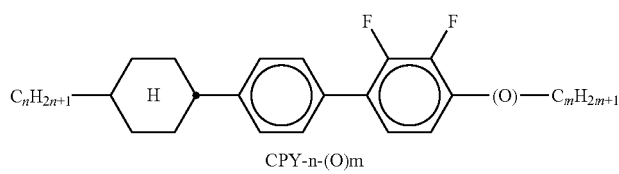
CPY-n-(O)m
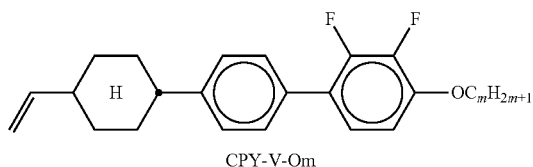
CPY-V-Om
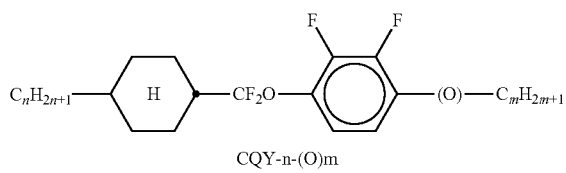
CQY-n-(O)m
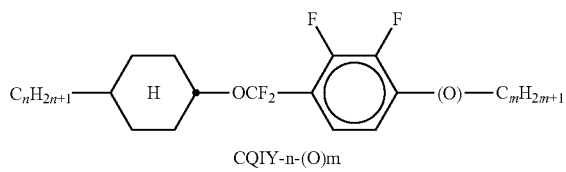
CQIY-n-(O)m
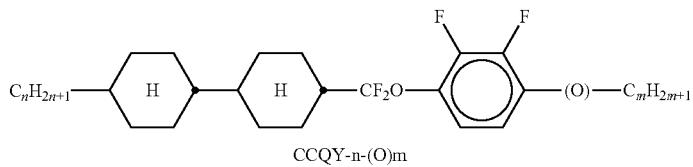
CCQY-n-(O)m TABLE D-continued
Illustrative structures
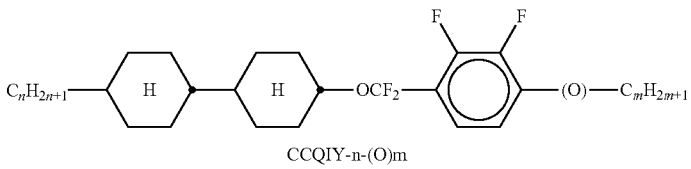
CCQIY-n-(O)m
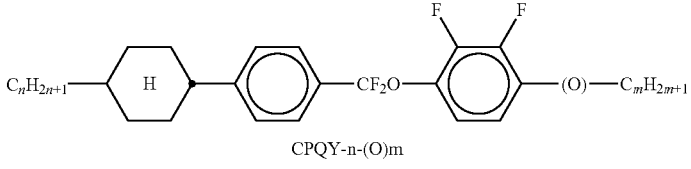
CPQY-n-(O)m
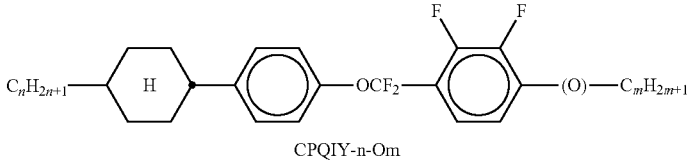
CPQIY-n-Om
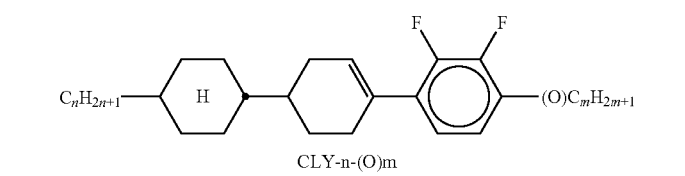
CLY-n-(O)m
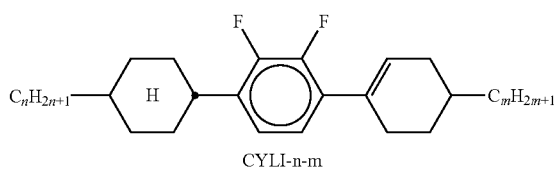
CYLI-n-m
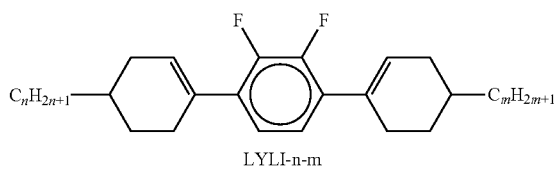
LYLI-n-m
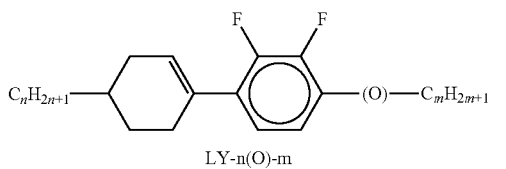
LY-n(O)-m
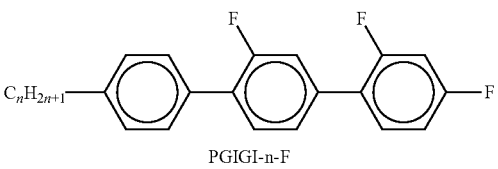
PGIGI-n-F
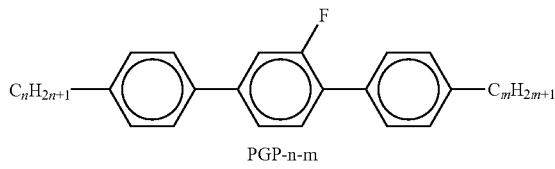
PGP-n-m TABLE D-continued
Illustrative structures
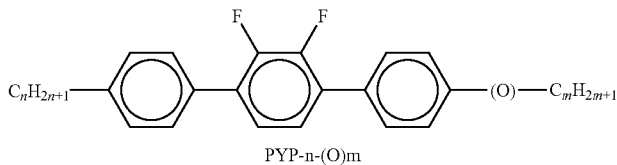
PYP-n-(O)m
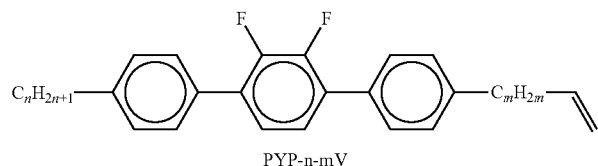
PYP-n-mV
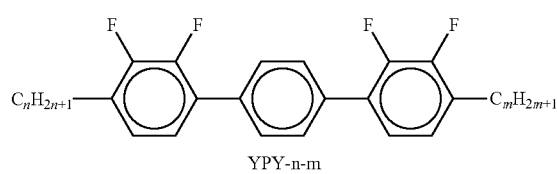
YPY-n-m
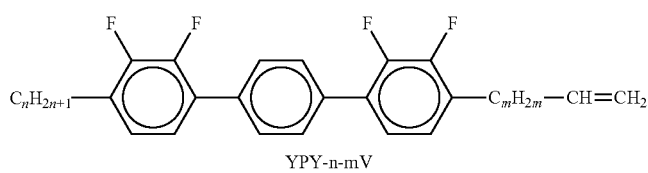
YPY-n-mV
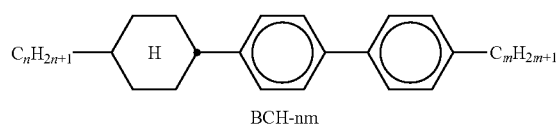
BCH-nm
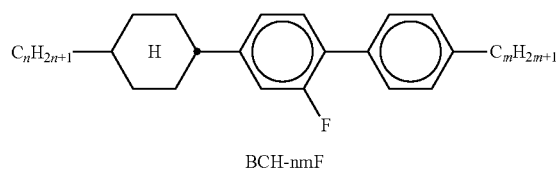
BCH-nmF
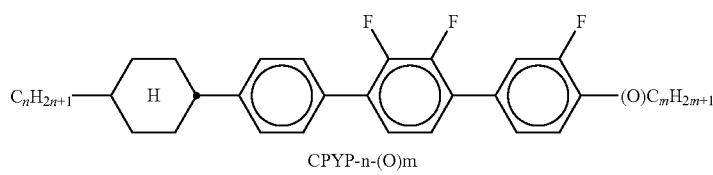
CPYP-n-(O)m
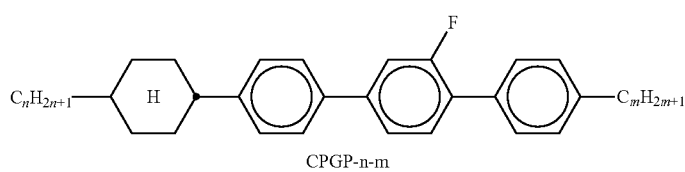
CPGP-n-m
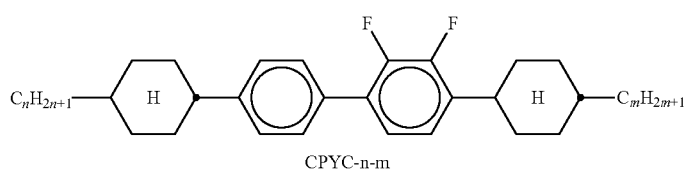
CPYC-n-m TABLE D-continued
| Illustrative structures |
|---|
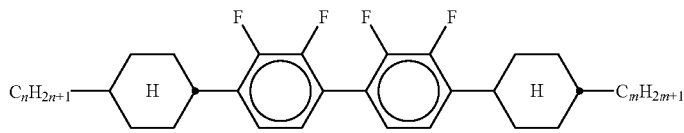
CYYC-n-m
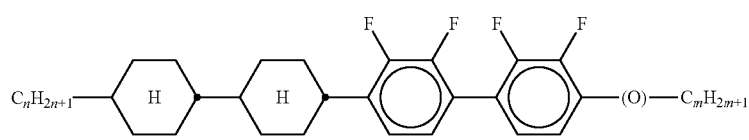
CCYY-n-m
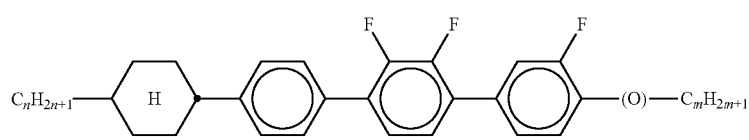
CPYG-n-(O)m
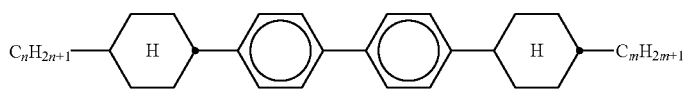
CBC-nm
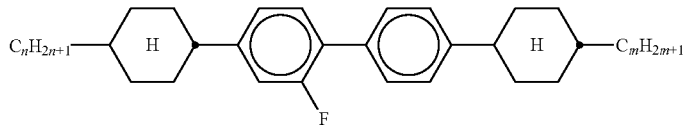
CBC-nmF
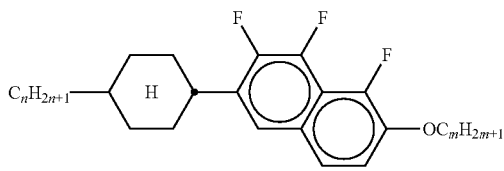
CNap-n-Om
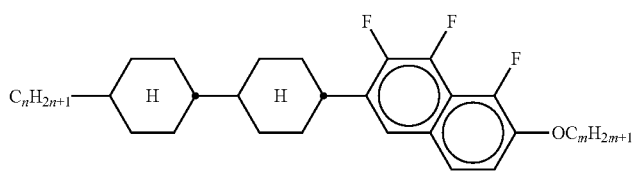
CCNap-n-Om
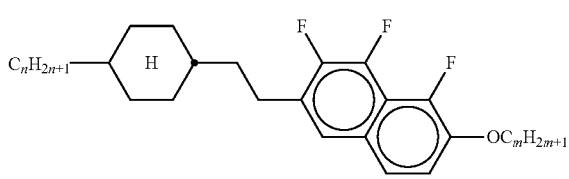
CENap-n-Om

TABLE D-continued

Illustrative structures

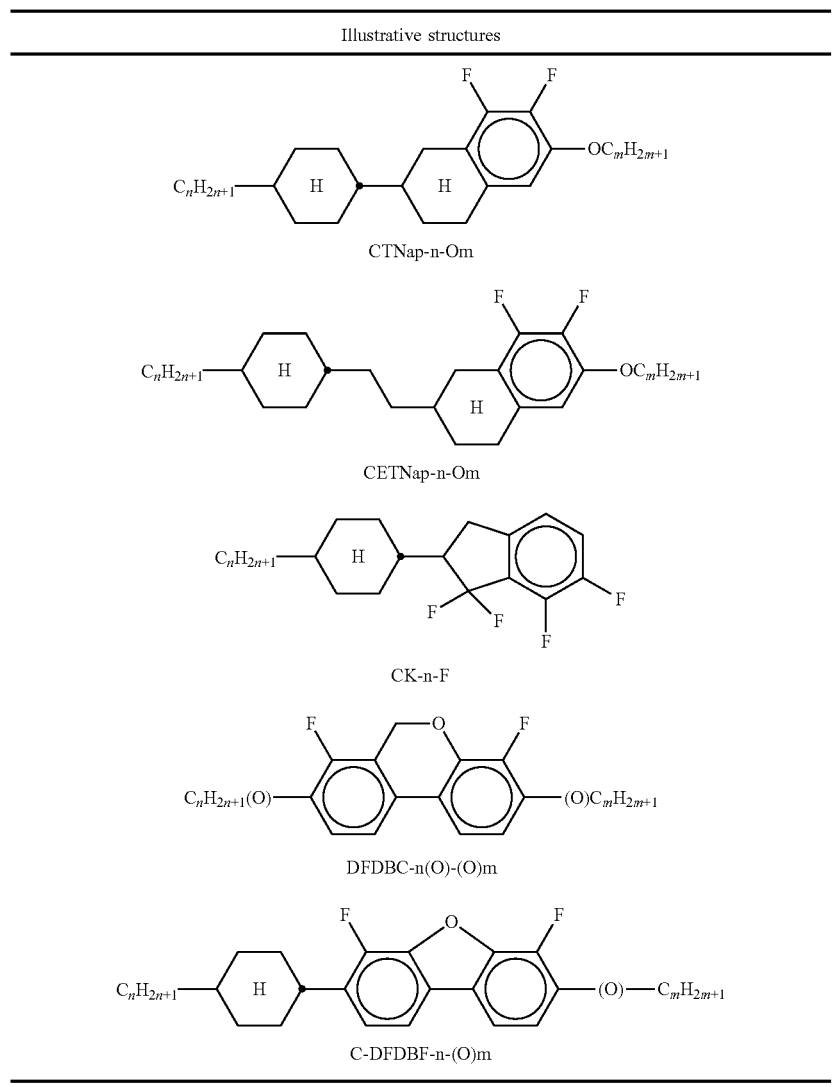

wherein n, m and l preferably, independently of one another, denote 1 to 7.

The following table, Table E, shows illustrative compounds which can be used as additional stabilisers in the mesogenic media according to the present invention.

TABLE E

Table E shows possible stabilisers which can be added to the LC media according to the invention.
($n$ here denotes an integer from 1 to 12, preferably 1, 2, 3, 4, 5, 6, 7 or 8, terminal methyl groups are not shown).

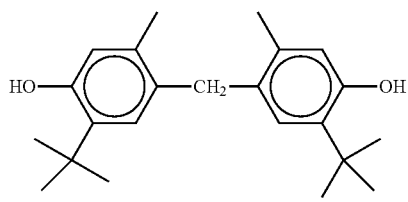

TABLE E-continued

Table E shows possible stabilisers which can be added to the LC media according to the invention.
($n$ here denotes an integer from 1 to 12, preferably 1, 2, 3, 4, 5, 6, 7 or 8, terminal methyl groups are not shown).

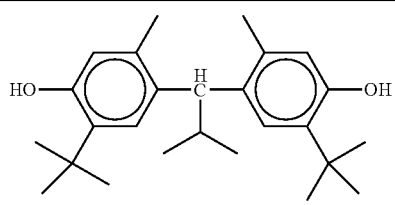

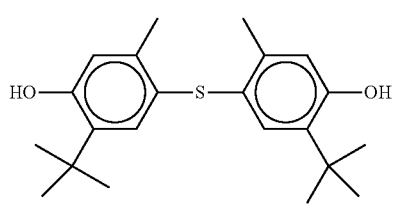

TABLE E-continued
Table E shows possible stabilisers which can be added to the LC media according to the invention.
(*n* here denotes an integer from 1 to 12, preferably 1, 2, 3, 4, 5, 6, 7 or 8, terminal methyl groups are not shown).
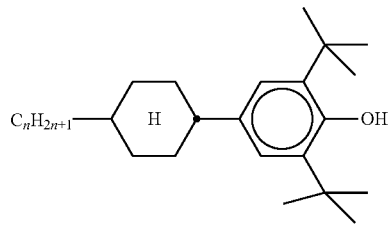
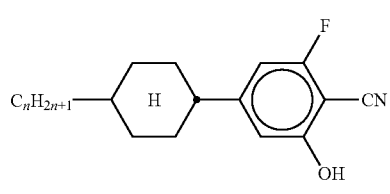
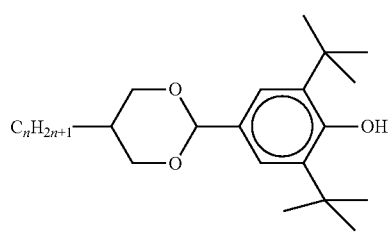
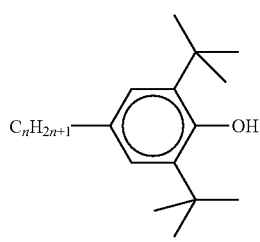
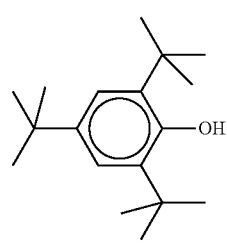
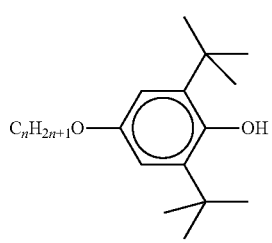
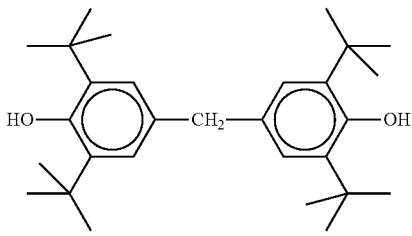
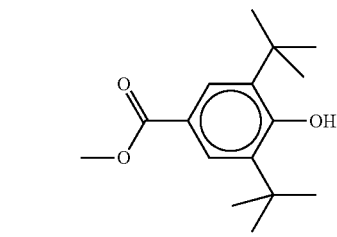
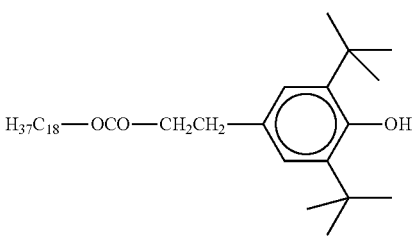
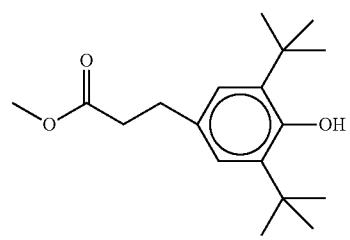
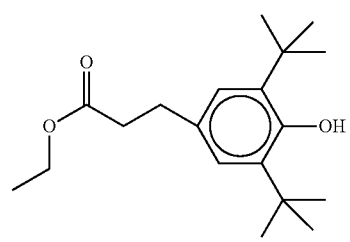
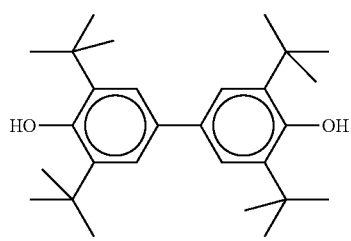

TABLE E-continued

Table E shows possible stabilisers which can be added to the LC media according to the invention.
(n here denotes an integer from 1 to 12, preferably 1, 2, 3, 4, 5, 6, 7 or 8, terminal methyl groups are not shown).

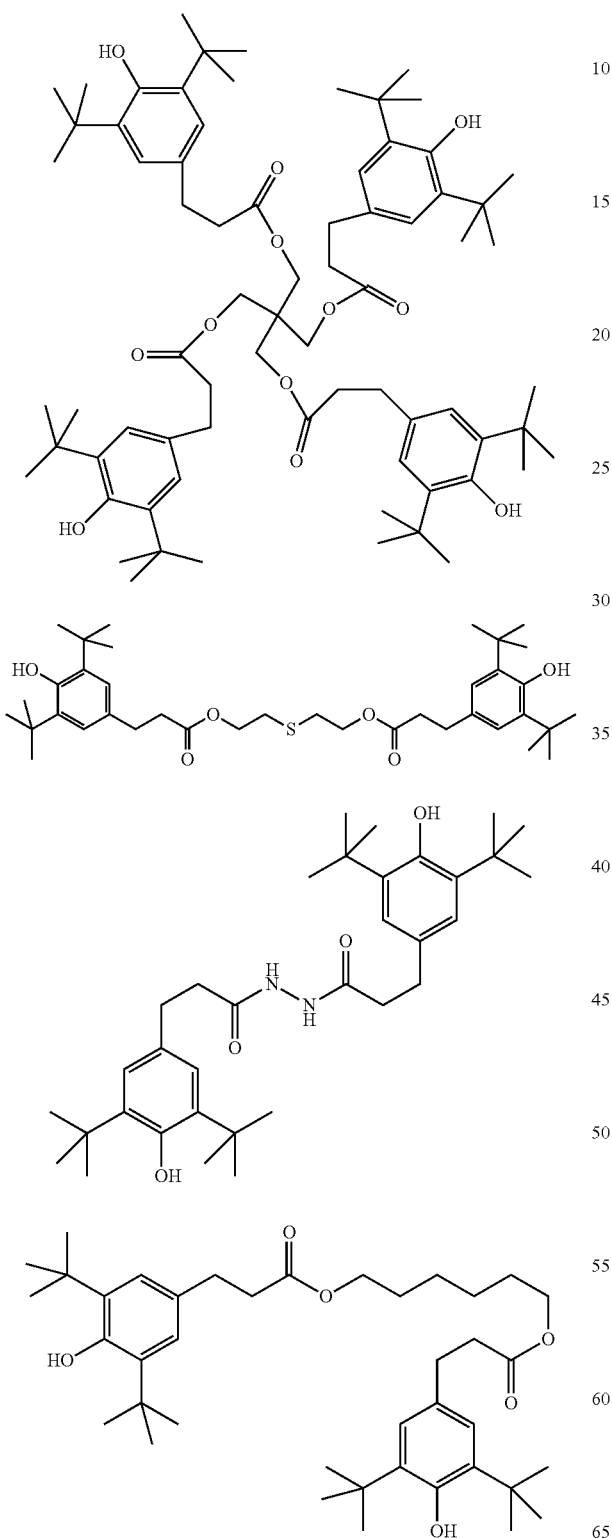

TABLE E-continued

Table E shows possible stabilisers which can be added to the LC media according to the invention.
(n here denotes an integer from 1 to 12, preferably 1, 2, 3, 4, 5, 6, 7 or 8, terminal methyl groups are not shown).

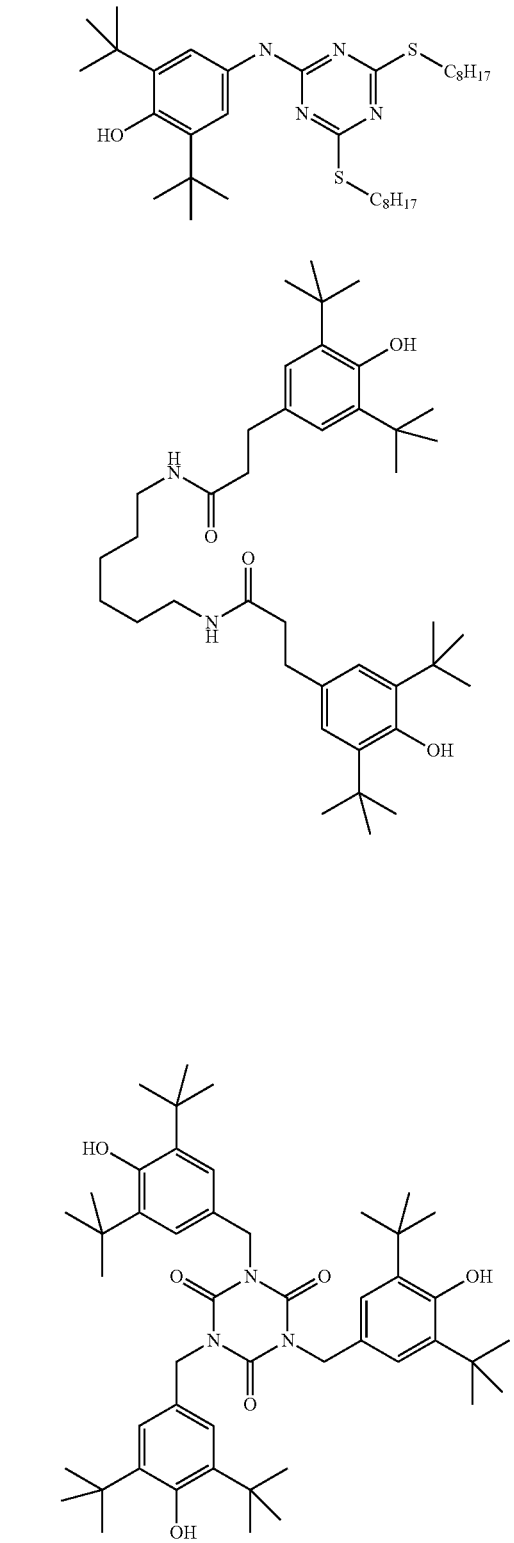

TABLE E-continued

Table E shows possible stabilisers which can be added to the LC media according to the invention.
(*n* here denotes an integer from 1 to 12, preferably 1, 2, 3, 4, 5, 6, 7 or 8, terminal methyl groups are not shown).

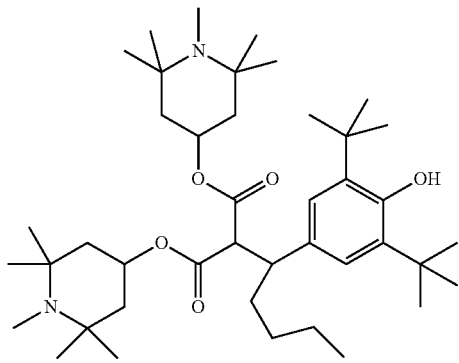 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

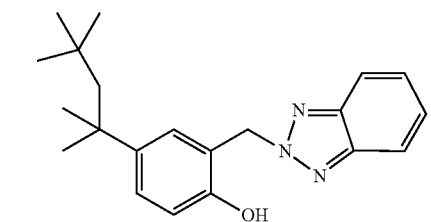 [SMILES: CC(C)(C)CC(C)(C)c1ccc(O)c(Cn2nc3ccccc3n2)c1]

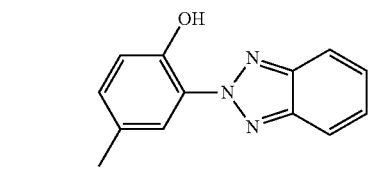 [SMILES: Cc1ccc(O)c(-n2nc3ccccc3n2)c1]

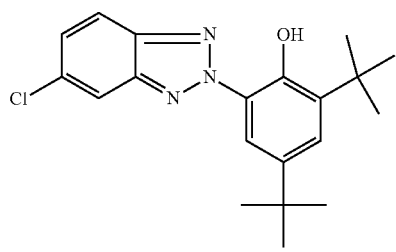 [SMILES: CC(C)(C)c1cc(-n2nc3ccc(Cl)cc3n2)c(O)c(C(C)(C)C)c1]

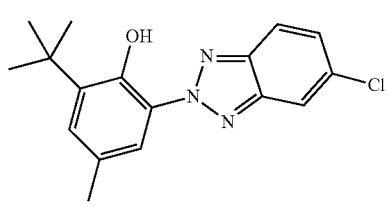 [SMILES: Cc1cc(-n2nc3ccc(Cl)cc3n2)c(O)c(C(C)(C)C)c1]

TABLE E-continued

Table E shows possible stabilisers which can be added to the LC media according to the invention.
(*n* here denotes an integer from 1 to 12, preferably 1, 2, 3, 4, 5, 6, 7 or 8, terminal methyl groups are not shown).

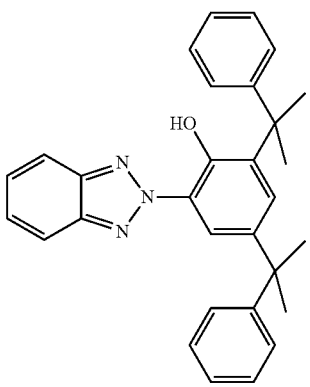 [SMILES: CC(C)(c1ccccc1)c1cc(-n2nc3ccccc3n2)c(O)c(C(C)(C)c2ccccc2)c1]

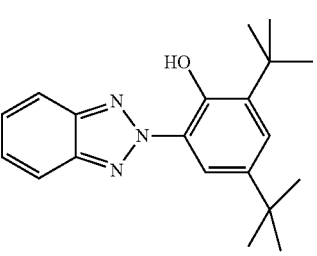 [SMILES: CC(C)(C)c1cc(-n2nc3ccccc3n2)c(O)c(C(C)(C)C)c1]

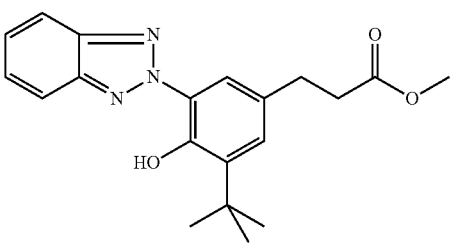 [SMILES: COC(=O)CCc1cc(-n2nc3ccccc3n2)c(O)c(C(C)(C)C)c1]

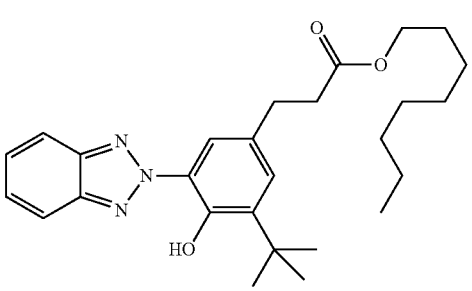 [SMILES: CCCCCCCCOC(=O)CCc1cc(-n2nc3ccccc3n2)c(O)c(C(C)(C)C)c1]

TABLE E-continued
Table E shows possible stabilisers which can be added to the LC media according to the invention.
($n$ here denotes an integer from 1 to 12, preferably 1, 2, 3, 4, 5, 6, 7 or 8, terminal methyl groups are not shown).
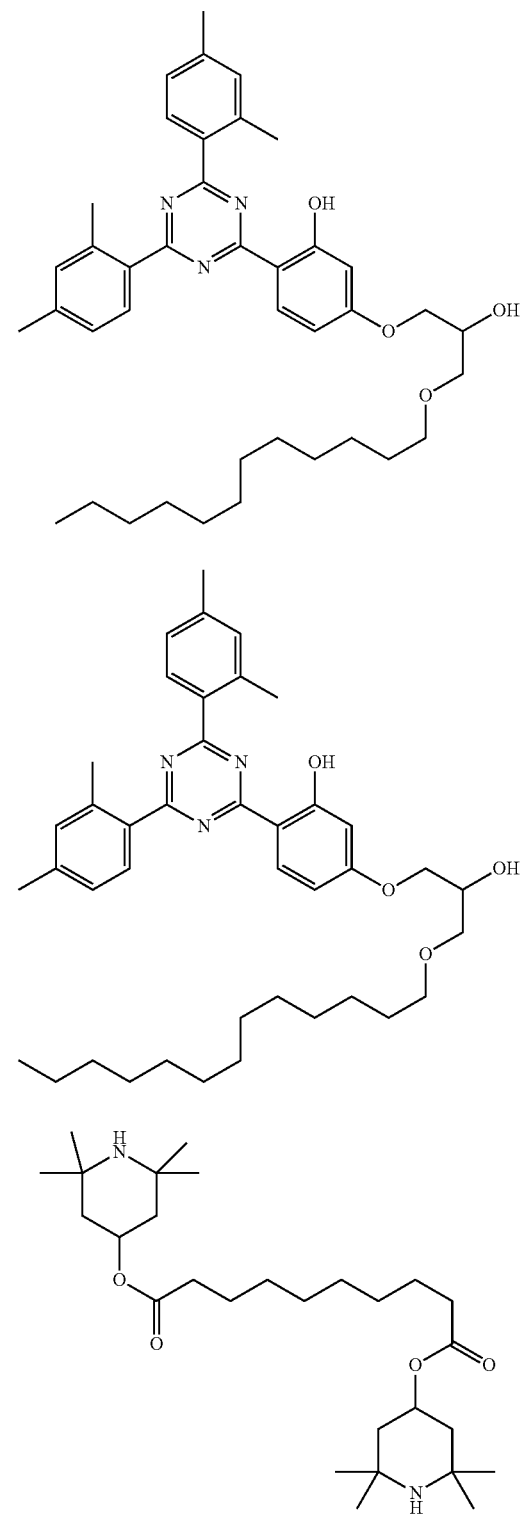
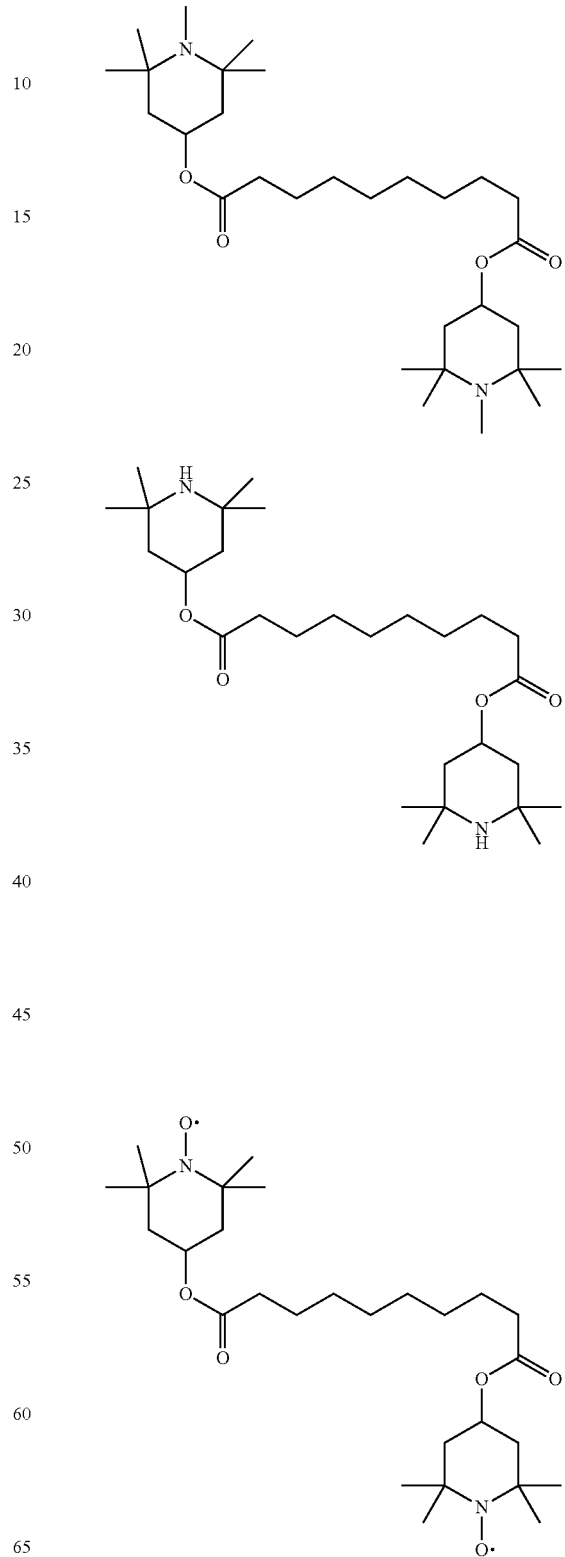

TABLE E-continued

Table E shows possible stabilisers which can be added to the LC media according to the invention.
(*n* here denotes an integer from 1 to 12, preferably 1, 2, 3, 4, 5, 6, 7 or 8, terminal methyl groups are not shown).

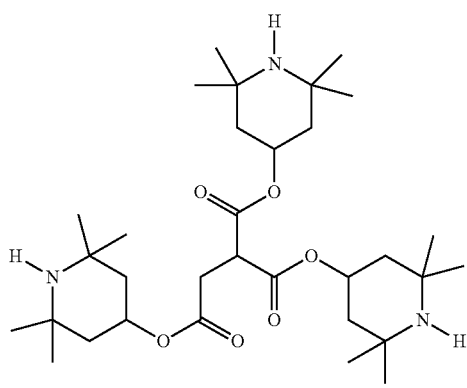

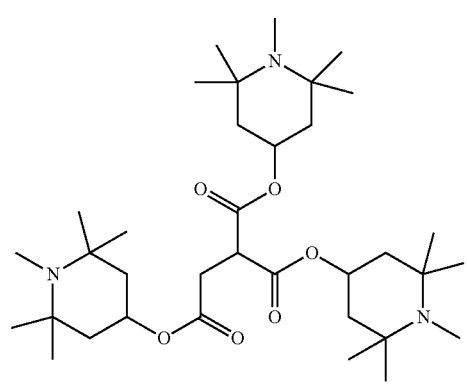

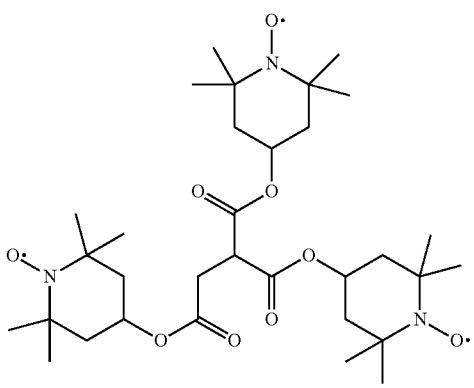

TABLE E-continued

Table E shows possible stabilisers which can be added to the LC media according to the invention.
(*n* here denotes an integer from 1 to 12, preferably 1, 2, 3, 4, 5, 6, 7 or 8, terminal methyl groups are not shown).

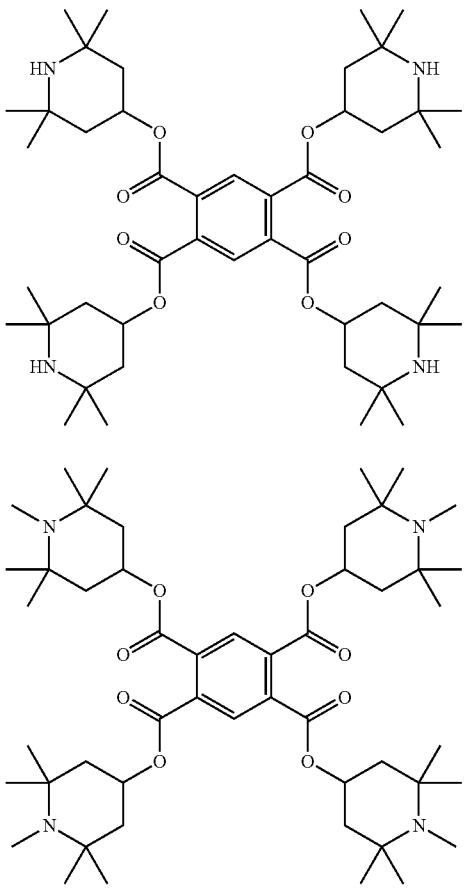

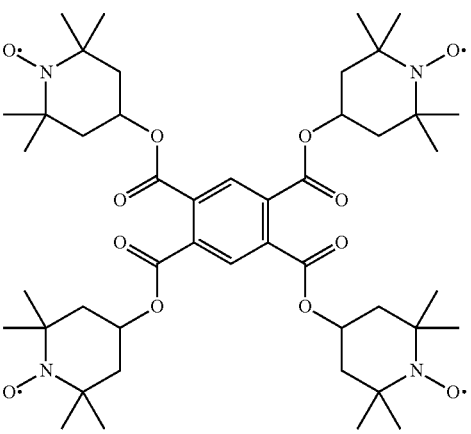

TABLE E-continued

Table E shows possible stabilisers which can be added to the LC media according to the invention.
(n here denotes an integer from 1 to 12, preferably 1, 2, 3, 4, 5, 6, 7 or 8, terminal methyl groups are not shown).

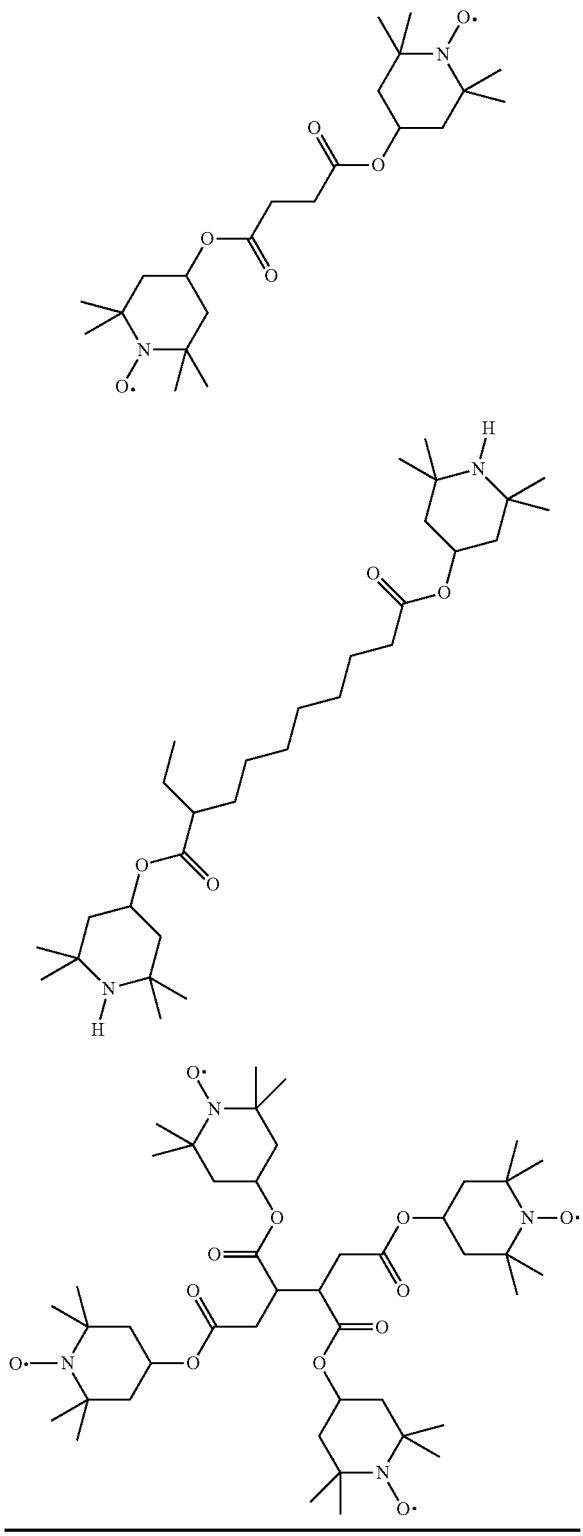

The LC media preferably comprise 0 to 10% by weight, in particular 1 ppm to 5% by weight, particularly preferably 1 ppm to 1% by weight, of stabilisers.

Table F below shows illustrative compounds which can preferably be used as chiral dopants in the mesogenic media according to the present invention.

TABLE F

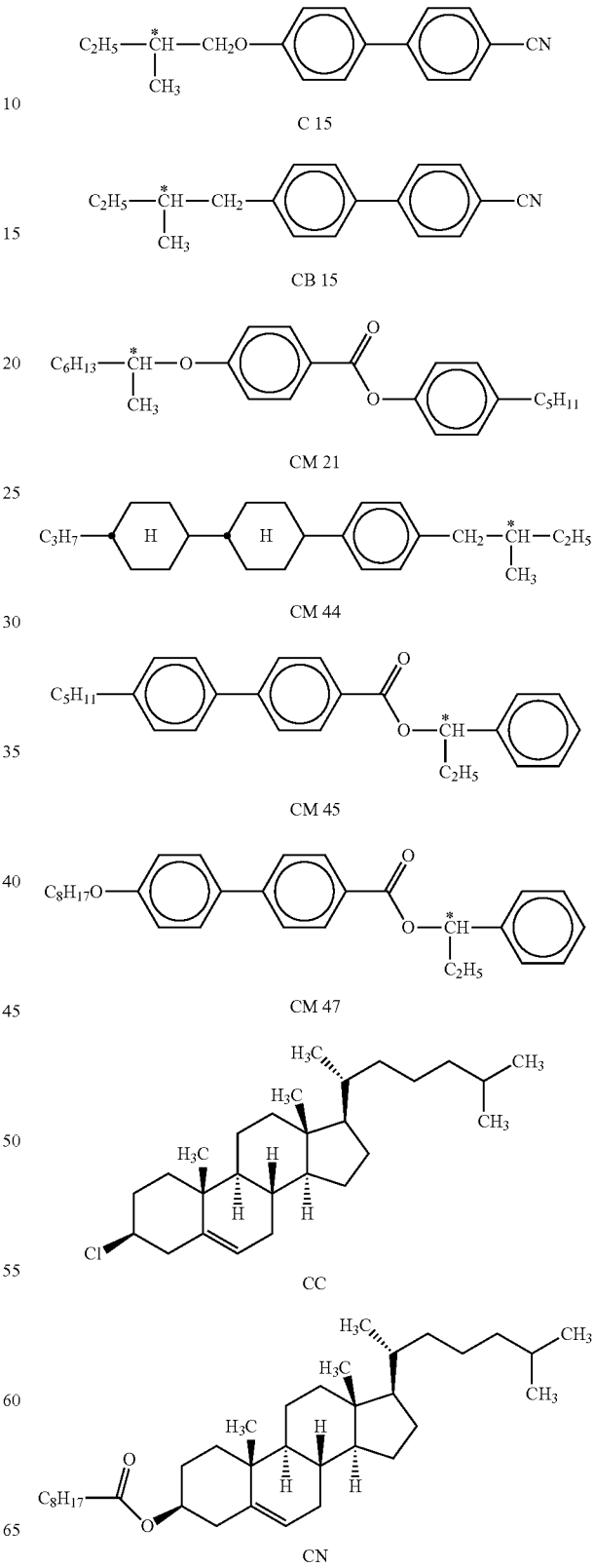

TABLE F-continued

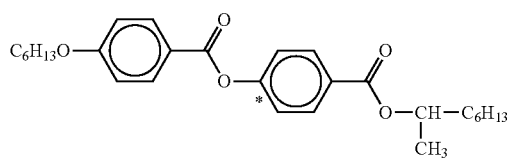

R/S-811

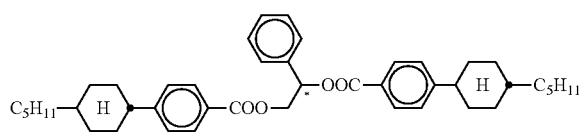

R/S-1011

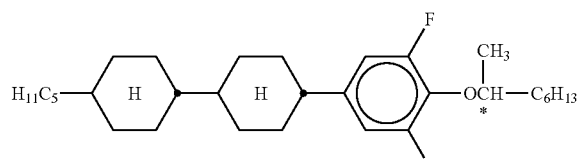

R/S-2011

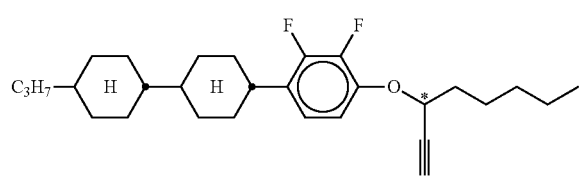

R/S-3011

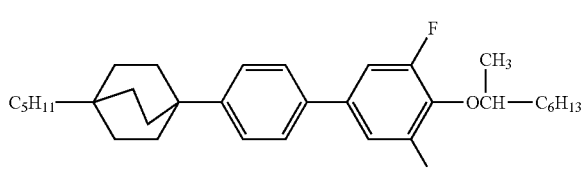

R/S-4011

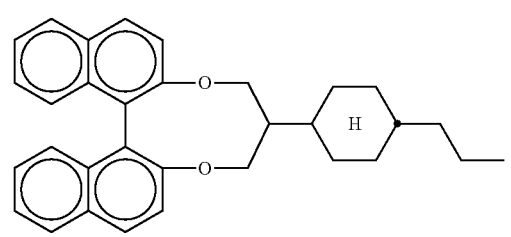

R/S-5011

In a preferred embodiment of the present invention, the mesogenic media comprise one or more compounds selected from the group of the compounds from Table F.

The mesogenic media according to the present application preferably comprise two or more, preferably four or more, compounds selected from the group consisting of the compounds from the above tables.

The liquid-crystal media according to the present invention preferably comprise seven or more, preferably eight or more, individual compounds, preferably of three or more, particularly preferably of four or more, different formulae, selected from the group of the compounds from Table D.

Hereinafter, the present invention is described in more detail and specifically with reference to the Examples, which however are not intended to limit the present invention.

EXAMPLES

Synthesis Examples

Synthesis Example 1

3-methyl-4-{[(2E)-3-[4-({6-[(3-oxoprop-1-en-2-yl)oxy]hexyl}oxy)phenyl]prop-2-enoyl]oxy}phenyl 4-{[6-(prop-2-enoyloxy)hexyl]oxy}benzoate 14

1.1 Synthesis of 1-[4-(benzyloxy)-3-methylphenyl]ethan-1-one 1

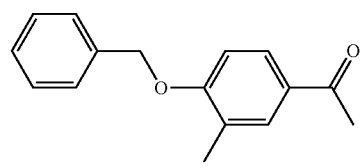

12.7 g (85.0 mmol) of 1-(4-hydroxy-3-methyl-phenyl)-ethanone, 12.7 mL (107 mmol) benzyl bromide and 7.62 g (55.0 mmol) potassium carbonate are dissolved/suspended in methyl(ethyl)ketone and stirred for 18 h under reflux. The reaction mixture is cooled down to room temperature (RT) and the precipitating solid is filtered and washed with methyl tertiary-butyl ether (MTB-E). The product is further crystallized out of heptane at 50° C. and is directly used in the next synthesis step.

1.2 Synthesis of 4-(benzyloxy)-3-methylphenyl acetate 2

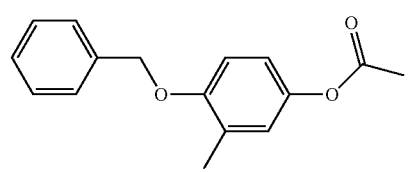

39.1 mL (0.165 mmol) m-chloroperbenzoic acid are suspended in 102 mL methylene chloride and a solution of 19.3 g (80.0 mmol) of ketone 1 in 72 mL methylene chloride is added dropwise to the reaction mixture. The yellow reaction mixture is then stepwise heated up to reflux and stirred for 16 h. The reaction mixture is cooled to room temperature (RT) and poured onto ice water. The phases are separated and the organic layer is filtered off from precipitated 3-chlorobenzoic acid, washed with sodium hydrogen carbonate, tested for peroxide remnants (with ammonia iron(II) sulphate solution), dried over sodium sulphate, filtered and evaporated under vacuum. The crude product is filtered through 900 g silica gel with toluene and ethyl acetate (95:5) to give the product as a yellow oil.

1.3 Synthesis of 4-(benzyloxy)-3-methylphenol 3

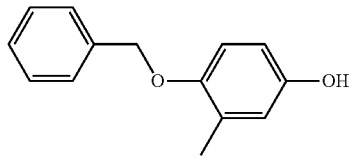

3

23.4 g (91.0 mmol) acetate 2 are solved in 181.0 mL ethanol and 5.84 mL (197.0 mmol) sodium hydroxide solution (32%) are added dropwise to the solution (the reaction solution turned to red color). The reaction mixture is stirred for 2 h at ambient temperature and then poured onto ice water and trated with HCl solution till a pH value of 1 is achieved. The reaction mixture is extracted with methyl tertiary-butyl ether (MTB-E), the organic layer dried over sodium sulphate, filtered and evaporated under vacuum. The black oil is filtered over silica gel with methylene chloride and the obtained solid is then crystallized out of heptane at −25° C. to give slightly brown colored crystals.

$^1$H NMR (500 MHz, DMSO-d6)

δ=2.13 ppm (s, 3H, CH$_3$), 4.99 (s, 2H, CH$_2$—O), 6.51 (dd, J=2.86, 8.62 Hz, 1H), 6.58 (d, J=2.49 Hz, 1H), 6.81 (d, J=8.70 Hz, 1H), 7.32 (d, J=7.23 Hz, 1H), 7.39 (t, J=7.71 Hz, 2H), 7.44 (d, J=8.70 Hz, 2H).

1.4 Synthesis of methyl 4-[(6-hydroxyhexyl)oxy]benzoate 4

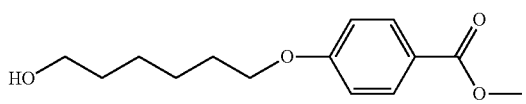

4

40.0 g (263 mmol) methyl 4-hydroxybenzoate and 43.6 g (315 mmol) are dissolved in 150 mL methyl(ethyl)ketone and 49.9 g (276 mmol) 6-bromohexan-1-ol are added and the reaction mixture is heated up to reflux and stirred for 16 h. The reaction mixture is then cooled to room temperature (RT) and the precipitating residue is filtered off, is washed with acetone and dried under vacuum. The crude product is crystallized at 5° C. out of toluene and the product can be used in the next step without further purification.

1.5 Synthesis of methyl 4-[(6-{[tris(propan-2-yl)silyl]oxy}hexyl)oxy]benzoate 5

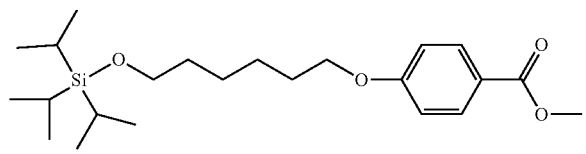

5

18.8 g (74.51 mmol) ester 4 and 0.45 g (3.73 mmol) 4-dimethylaminopyridine are solved in 90 mL N,N-dimethylformamide (DMF). 15.8 g (81.96 mmol) chloro-triisopropyl-silane (dissolved in 30 mL DMF) are added dropwise to the reaction mixture at room temperature (RT) and stirred for 16 h. The reaction mixture is diluted with methyl tertiary-butyl ether (MTB-E) and poured in ice water. The layers are separated and the organic layer is dried over sodium sulphate, filtered and evaporated under vacuum to give the product as an oil which is further purified by column chromatography with silica gel and 1-chlorobutane. The product is a slightly yellow oil.

1.6 Synthesis of 4-[(6-{[tris(propan-2-yl)silyl]oxy}hexyl)oxy]benzoic acid 6

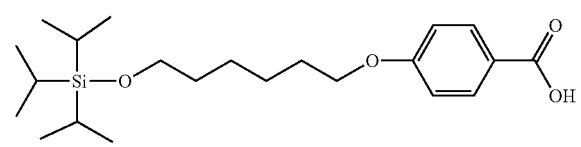

6

27.0 g (66.0 mmol) of ester 5 are dissolved in a mixture of 160 mL methanol and 80 mL tetrahydrofuran and 90 mL NaOH (2N). The reaction mixture is stirred for 2 h at 40° C. The reaction mixture is cooled to room temperature (RT), poured cautiously onto ice water, neutralized with HCl (2N) and extracted with ethyl acetate. The organic layer is washed with brine, dried over sodium sulphate, filtered and evaporated under vacuum to give the product as a white solid which is purified by crystallization out of ethyl acetate at 3° C. to give white crystalline solid.

$^1$H NMR (500 MHz, DMSO-d6)

δ=1.02 ppm (m$_c$, 21 H, Si—(C$_3$H$_7$)$_3$), 1.34-1.47 (m, 4H, CH$_2$), 1.51 (quint, J=6.57 Hz, 2H, CH$_2$), 1.73 (quint, J=6.01 Hz, 2H, CH$_2$), 3.69 (t, J=6.33 Hz, 2H, CH$_2$), 4.02 (t, J=6.45 Hz, 2H, CH$_2$), 6.98 (d, J=8.91 Hz, 2H), 7.87 (J=8.89 Hz, 2H).

1.7 Synthesis of 4-(benzyloxy)-3-methylphenyl 4-[(6-{[tris(propan-2-yl)silyl]oxy}hexyl)oxy]benzoate 7

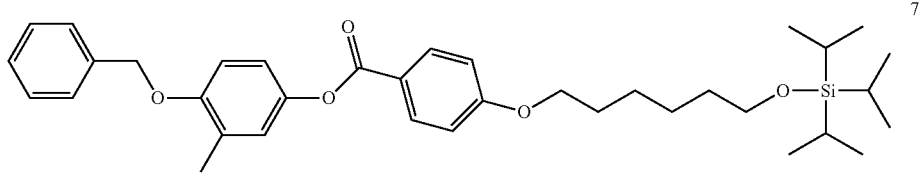 [SMILES: Cc1cc(OC(=O)c2ccc(OCCCCCCO[Si](C(C)C)(C(C)C)C(C)C)cc2)ccc1OCc1ccccc1]

28.0 g (70.7 mmol) of acid 6, 15.5 g (72.18 mmol) phenol 3 and 1.72 g (14.15 mmol) 4-dimethylaminopyridine are solved in 280 mL methylene chloride. The reaction mixture is treated successively with 16.2 g (84.89 mmol) N-(3-dimethylaminoproyl)-N'-ethylcarbodiimide hydrochloride and stirred for 16 h at room temperature (RT). The reaction mixture is diluted with water and extracted with methylene chloride. The combined organic layers are washed with brine, dried over sodium sulphate, filtered and evaporated under vacuum to yield a yellow solid. The crude product is purified via column chromatography with silica gel and heptane/ethyl acetate (8:2) to give a colorless solid.

1.8 Synthesis of 4-hydroxy-3-methylphenyl 4-[(6-{[tris(propan-2-yl)silyl]oxy}hexyl)oxy]benzoate 8

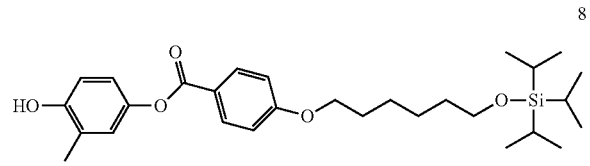 [SMILES: Cc1cc(OC(=O)c2ccc(OCCCCCCO[Si](C(C)C)(C(C)C)C(C)C)cc2)ccc1O]

39.0 g (65.8 mmol) of compound 7 are dissolved in 390 mL tetrahydrofuran and 15.0 g (140.9 mmol) Pd—C (5% basic) are added and the reaction mixture is treated with hydrogen atmosphere under normal pressure and room temperature for 45 min. The catalyst was filtered off and the reaction mixture was evaporated under vacuum. The crude product (oil which crystallizes) is purified via column chromatography with 1-chlorobutane and ethyl acetate (8:2). The resulting product is crystallized with acetonitrile.

$^1$H NMR (500 MHz, CDCl$_3$)

δ=1.06 (m$_c$, 21 H, Si—(C$_3$H$_7$)$_3$), 1.40-1.53 (m, 2H, CH$_2$), 1.56 (quint, J=7.73 Hz, 2H, CH$_2$), 1.83 (7.82 Hz, 2H, CH$_2$), 2.25 (s, 3H, CH$_3$), 3.70 (t, J=6.46 Hz, 2H, CH$_2$), 4.04 (t, J=6.53 Hz, 2H, CH$_2$), 4.78 (s, 1H, OH), 6.76 (d, J=8.58 Hz, 1H), 6.88 (dd, J=2.76, 8.56 Hz, 1H), 6.95 (m$_c$, 3 H), 8.12 (d, J=8.91 Hz).

1.9 Synthesis of methyl (2E)-3-{4-[(6-hydroxyhexyl)oxy]phenyl}-prop-2-enoate 9

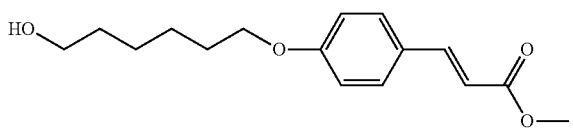

25.9 g (145 mmol) methyl (2E)-3-(4-hydroxyphenyl) prop-2-enoate, 24.2 g (175 mmol) potassium carbonate are solved in 451 mL N,N-dimethylformamide (DMF) and heated to 90° C. 28.7 g (159 mmol) 6-bromohexan-1-ol is added and the mixture is stirred at 90° C. for 16 h. The reaction mixture is cooled to room temperature (RT), diluted with water and methyl tertiary-butyl ether (MTB-E) and the layers are separated. The organic layer is washed with water and brine and is filtered and evaporated under vacuum. The resulting crude product is crystallized from toluene to give white crystalline solid.

1.10 Synthesis of methyl (2E)-3-{4-[(6-{[tris(propan-2-yl)silyl]oxy}-hexyl)oxy]phenyl}prop-2-enoate 10

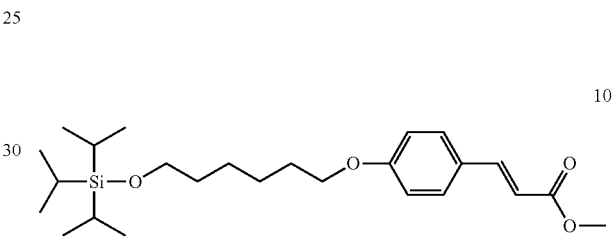

26.5 g (93.5 mmol) ester 9 are dissolved in N,N-dimethylformamide (DMF) and 0.57 g (4.67 mmol) 4-dimethylaminopyridine is added. 19.8 g (102.8 mmol) chloro-triisopropyl-silane (dissolved in 36 mL DMF) are added dropwise and the reaction mixture is stirred at room temperature for 16 h. The reaction mixture is diluted with methyl tertiary-butyl ether (MTB-E) and poured onto ice water. The organic layer is separated, dried over sodium sulphate, filtered and evaporated under vacuum. The crude product is purified via column chromatography (silica gel, heptane/MTB-E 9:1) to yield a colorless oil.

1.11 Synthesis of methyl (2E)-3-{4-[(6-{[tris(propan-2-yl)silyl]oxy}-hexyl)oxy]phenyl}prop-2-enoate 11

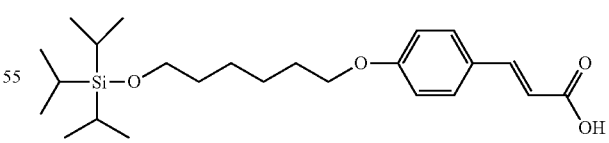

33.7 g (77.0 mmol) is dissolved in 187 mL methanol and 94 mL tetrahydrofuran. 97.4 mL (195 mmol) NaOH (2N) is added and the reaction mixture is stirred at 38° C. for 4 h. The mixture is cooled to room temperature (RT) and poured in ice water. 2N HCl is added to get a pH value of 5-6 followed by an extraction with ethyl acetate. The combined organic layers are washed with brine, dried over sodium sulphate, filtered and evaporated under vacuum. The crude product is crystallized with acetonitrile to give a white crystalline solid.

¹H NMR (500 MHz, DMSO-d6)

δ=1.02 ppm (s, 21H, Si—(C₃H₇)₃), 1.41 (m_c, 4 H, CH₂), 1.52 (quint, J=6.77 Hz, 2H, CH₂), 1.72 (quint, J=7.39 Hz, 2H, CH₂), 3.66 (t, J=6.36 Hz, 2H, CH₂), 4.00 (t, J=6.46 Hz, 2H, CH₂), 6.37 (d, J=15.96 Hz, 1H, trans —HC=CH—), 6.94 (d, J=8.78 Hz, 1H), 7.54 (d, J=15.94 Hz, 1H, trans —HC=CH—), 7.62 (d, J=8.78 Hz, 1H).

1.12 Synthesis of 3-methyl-4-{[(2E)-3-{4-[(6-{[tris(propan-2-yl)silyl]-oxy}hexyl)oxy]phenyl}prop-2-enoyl]oxy}phenyl 4-[(6-{[tris(propan-2-yl)silyl]oxy}hexyl)oxy]benzoate 12

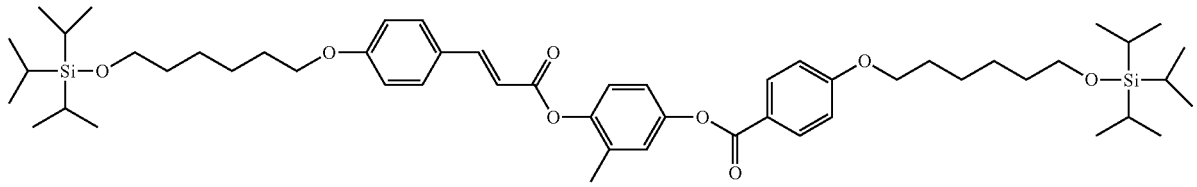

12

15.7 g (31.4 mmol) phenole 8, 13.9 g (32.9 mmol) acid 11, 0.76 g (6.29 mmol) 4-dimethylaminopyridine are dissolved in 100 mL methylene chloride and 7.22 g (37.71 mmol) N-(3-dimethylaminoproyl)-N'-ethylcarbodiimide hydrochloride is added portionwise to the reaction mixture. The yellow reaction mixture is stirred for 16 h at room temperature (RT), diluted with water an extracted with methylene chloride. The organic layer is dried over sodium sulphate, filtered and evaporated under vacuum. The crude product is crystallized from ethyl acetate to give white crystalline solid.

1.13 Synthesis of 4-{[(2E)-3-{4-[(6-hydroxyhexyl)oxy]phenyl}prop-2-enoyl]oxy}-3-methylphenyl 4-[(6-hydroxyhexyl)oxy]benzoate 13

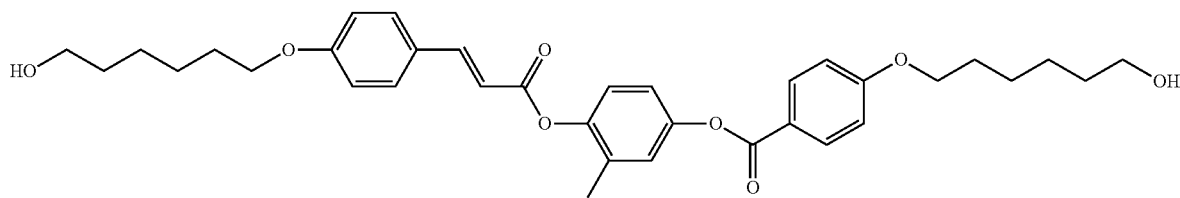

13

21.5 g (23.8 mmol) cinnamate 12 are dissolved in 151 mL methylene chloride and cooled to 3° C. 19.1 mL (118.9 mmol) triethylamin tris hydrofluoride are added dropwise. The reaction mixture is then stirred for 16 h at room temperature and poured in water. The layers are separated and the organic layer is washed with brine, dried over sodium sulphate and evaporated under vacuum to give a white solid. The crude product is crystallized out of acetonitrile and the product is obtained as a white crystalline solid.

1.14 Synthesis of 3-methyl-4-{[(2E)-3-[4-({6-[(3-oxoprop-1-en-2-yl)oxy]hexyl}oxy)phenyl]prop-2-enoyl]oxy}phenyl 4-{[6-(prop-2-enoyloxy)hexyl]oxy}benzoate 14

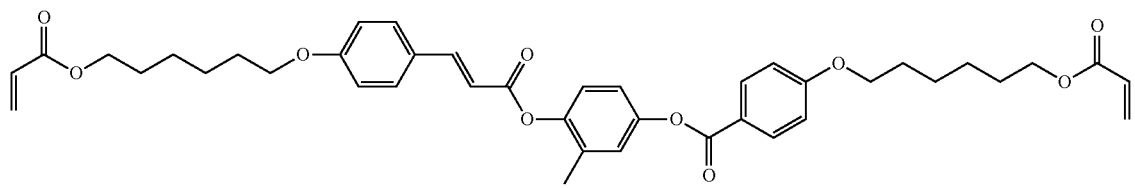

14

7.50 g (12.6 mmol) of cinnamate 13 is dissolved in 243 mL methylene chloride. 2.74 g (38.0 mmol) acrylic acid, 0.93 g (7.61 mmol) 4-dimethylaminopyridine are added to the solution and the mixture is cooled to 3° C. 6.7 mL (38.0 mmol) N-(3-dimethylaminoproyl)-N'-ethylcarbodiimide (dissolved in 5 mL methylene chloride) are added dropwise to the reaction mixture so that the temperature stays below 100° C. The mixture is stirred for further 30 min with ice cooling and is stirred for 16 h at room temperature. During this time the reaction mixture turned to a clear solution. The reaction solution is evaporated under vacuum and purified via column chromatography with 1-chlorobutane and ethyl acetate (9:1). The obtained product is then crystallized from acetonitrile to give a white crystalline solid.

Phase sequence: K 59 N 147.6 I $^1$H NMR (500 MHz, CDCl$_3$)

δ=1.38-1.63 ppm (m, 8H, CH$_2$), 1.75 (m$_c$, 4 H, CH$_2$), 1.86 (m$_c$, 4 H, CH$_2$), 2.26 (s, 3H, CH$_3$), 4.04 (t, J=6.4 Hz, 2H, CH$_2$), 4.07 (t, J=6.4 Hz, 2H, CH$_2$), 4.20 (t, J=6.62 Hz, 2H, CH$_2$), 4.21 (t, J=6.62 Hz, 2H, CH$_2$), 5.84 (d, J=10.44 Hz, 2H, O(CO)CH=CH$_{(cis)}$H), 6.15 (dd, J=10.44, 17.35 Hz, 2H, O(CO)CH=CH$_2$), 6.43 (d, J=17.34 Hz, 2H, O(C=O)—CH=CH$_{(trans)}$H), 6.54 (d, J=15.92 Hz, 1H, trans —HC=CH—), 6.95 (d, J=8.69, 2H), 6.99 (d, J=8.86, 2H), 7.09 (dd, J=2.71, 8.59 Hz, 1H), 7.14 (d$_{(overlapped)}$, J=3.0 Hz, 1H), 7.15 (d$_{(overlapped)}$, J=8.82 Hz, 1H), 7.57 (d, J=8.68 Hz, 2H), 7.87 (d, J=15.89 Hz, 1H, trans —HC=CH—), 8.16 (d, J=8.82 Hz, 2H).

Synthesis Example 2

Synthesis of [3-ethyl-4-[(E)-3-(4-prop-2-enoyloxyphenyl)prop-2-enoyl]oxy-phenyl] (E)-3-(4-prop-2-enoyloxyphenyl)prop-2-enoate (19)

2.1 Synthesis of methyl (E)-3-(4-tetrahydropyran-2-yloxyphenyl)prop-2-enoate (15)

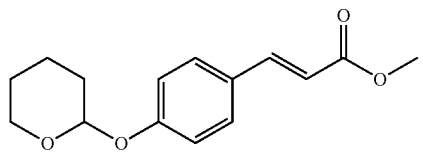

15

10.00 g (56.12 mmol) methyl (2E)-3-(4-hydroxyphenyl)prop-2-enoate are suspended in 100 ml methylene chloride. After adding 2.12 g (8.44 mmol) toluene-4-sufonatepyridinium 10.15 ml (112 mmol) 3,4-dihydro-2H-pyrane dissolved in 70 ml methyle chloride are added dropwise. The mixture is stirred overnight. After adding water the organic layer is separated, washed with bicarbonate sol. and brine, dried over sodium sulfate and evaporated. The residue is purified via column chromatography with n-heptane/ethyl acetate to give a white solid.

2.2 Synthesis of (E)-3-(4-tetrahydropyran-2-yloxyphenyl)prop-2-enoic acid (16)

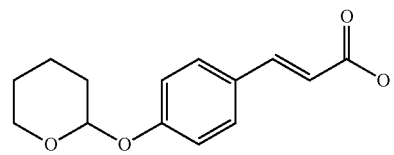

16

14.5 g (55.28 mmol) of cinnamate 15 are dissolved in 200 ml methanol at 40° C. 70 ml of 2 mol/l sodium hydroxide sol. are added. After 2 h refluxing the mixture is acidified (pH 4.5) with hydrochloric acid an extracted with ethyl acetate. The organic layer is dried over sodiumsulfate and the solvent is evaporated. 16 is obtained as a yellowish solid.

2.3 Synthesis of [3-ethyl-4-[(E)-3-(4-tetrahydropyran-2-yloxyphenyl)prop-2-enoyl]oxy-phenyl] (E)-3-(4-tetrahydropyran-2-yloxyphenyl)prop-2-enoate (17)

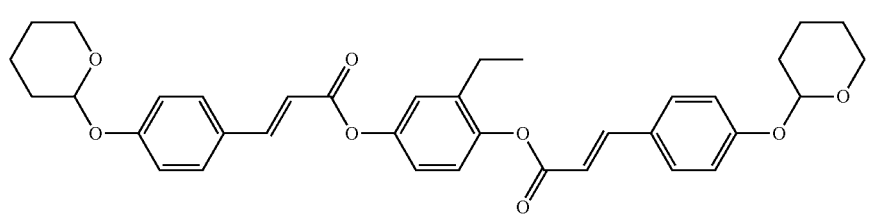

17

10.07 g (52.55 mmol) N-(3-dimethylaminoproyl)-N'-ethylcarbo-diimide hydro chloride are added to a solution of 11.86 g (47.77 mmol) of the cinnamatic acid 16, 1.17 g (9.55 mmol) dithylamino pyridine (DMAP) and 3.3 g (23.88 mmo) 2-ethyl benzene-1,4-diol are dissolved in 150 ml methylene chloride. The solution was stirred at room temperature over night. Water is added to the mixture which is extracted with methylene chloride afterwards. The organic layer is dried over sodium sulfate and evaporated. The residue is purified via column chromatography with 1-chlorobutane and ethyl acetate to obtain a white solid.

2.4 Synthesis of [3-ethyl-4-[(E)-3-(4-hydroxyphenyl)prop-2-enoyl]oxy-phenyl] (E)-3-(4-hydroxyphenyl)prop-2-enoate (18)

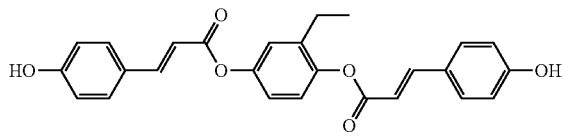

18

30.0 ml hydrochloric acid (2 mol/l, 60 mmol) are added to a solution of 11.60 g (19.38 mmol) 18 in 400 ml THF at a temperature below 10° C. The mixture is stirred at room temperature for 4, neutralized with sodium bicarbonate sol. and extracted with ethylene acetate. The organic layer is washed with brine, dried over sodium sulfate, filtrated and evaporated obtain a white solid.

2.5 Synthesis of methyl [3-ethyl-4-[(E)-3-(4-prop-2-enoyloxyphenyl)prop-2-enoyl]oxy-phenyl] (E)-3-(4-prop-2-enoyloxyphenyl)prop-2-enoate (19)

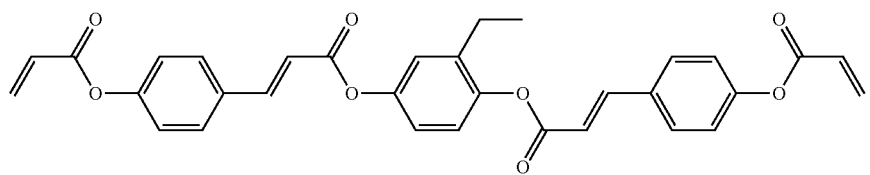

19

2.00 g (4.65 mmol) of cinnamate 18 is suspended in 60 mL methylene chloride. 0.77 g (10.69 mmol) acrylic acid, 56.8 mg (0.46 mmol) 4-dimethylaminopyridine are added to the suspension and the mixture is cooled to 3° C. 1.89 mL (10.69 mmol) N-(3-dimethylaminoproyl)-N'-ethylcarbo-diimide (dissolved in 5 mL methylene chloride) are added dropwise to the reaction mixture so that the temperature stays below 10° C. The mixture is stirred for further 30 min with ice cooling and is stirred for 16 h at room temperature. During this time the reaction mixture turned to a clear solution. The reaction solution is evaporated under vacuum and purified via column chromatography with 1-chlorobutane and ethyl acetate. The obtained product is then crystallized from acetonitrile to give a white crystalline solid, m.p. 175° C. (decomp.).

$^1$H NMR (500 MHz, DMSO)

δ=1.16 ppm (t, J=7.61 Hz, 3H, CH$_3$), 2.55 (q, J=7.61 Hz, 2H, CH$_2$), 6.21 (dd, J=1.1 Hz, J=10.44 Hz, 2H, O(CO)CH=CH$_{(cis)}$H), 6.46 (dd, J=10.38, 17.35 Hz, 2H, O(CO)CH=CH$_2$), 6.60 (d, J=17.35 Hz, 2H, O(C=O)—CH=CH$_{(trans)}$H), 6.92 (d, J=16.23 Hz, 1H, trans —HC=CH—), 6.97 (d, J=16.17 Hz, 1H, trans —HC=CH—), 7.16 (dd, J=2.89, J=8.67, 1H), 7.25 (m, 2H), 7.33 (dd, J=1.16, 8.56 Hz, 4H), 7.95 (m$_c$, 6H).

Synthesis Example 3

Synthesis of

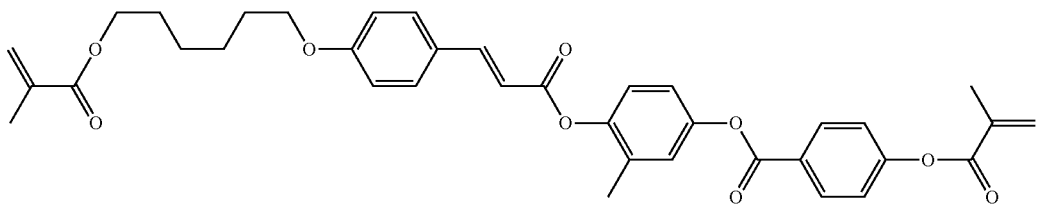 [SMILES: C=C(C)C(=O)OCCCCCCOc1ccc(/C=C/C(=O)Oc2ccc(OC(=O)c3ccc(OC(=O)C(=C)C)cc3)cc2C)cc1]

3.1 Synthesis of methyl 4-triisopropylsilyloxybenzoate (20)

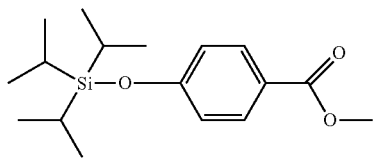

20

5.61 g (37.25 mmol) methyl 4-hydroxybenzoate and 0.22 g (1.86 mmol) 4-dimethylaminopyridine are solved in 45 mL N,N-dimethylformamide (DMF). 7.9 g (41.00 mmol) chloro-triisopropyl-silane (dissolved in 30 mL DMF) are added dropwise to the reaction mixture at room temperature (RT) and stirred for 16 h. The reaction mixture is diluted with methyl tertiary-butyl ether (MTB-E) and poured in ice water. The layers are separated and the organic layer is dried over sodium sulphate, filtered and evaporated under vacuum to give the product as an oil which is further purified by column chromatography with silica gel and chloro butane as a solvent.

3.2 Synthesis of 4-triisopropylsilyloxybenzoic acid 21

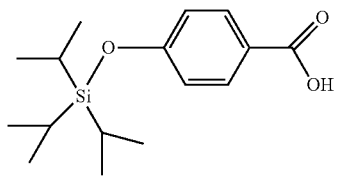

21

9.26 g (30.0 mmol) of ester 20 are dissolved in a mixture of 130 mL methanol and 65 mL tetrahydrofuran and 75 mL NaOH (2N). The reaction mixture is stirred for 2 h at 40° C. The reaction mixture is cooled to room temperature (RT), poured cautiously onto ice water, neutralized with HCl (2N) and extracted with ethyl acetate. The organic layer is washed with brine, dried over sodium sulphate, filtered and evaporated under vacuum to give the product as a white solid which is purified by crystallization out of ethyl acetate at 3° C. to give white crystalline solid.

3.3 Synthesis of (4-benzyloxy-3-methyl-phenyl) 4-triisopropylsilyloxybenzoate 22

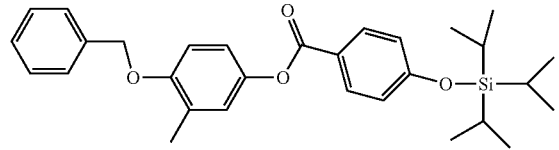

22

7.3 g (25 mmol) of acid 21, 5.2 g (26 mmol) phenol 3 and 0.62 g (5.1 mmol) 4-dimethylaminopyridine are solved in 100 mL methylene chloride. The reaction mixture is treated successively with 5.8 g (29.5 mmol) N-(3-dimethylamino-proyl)-N'-ethylcarbodiimide hydrochloride and stirred for 16 h at room temperature (RT). The reaction mixture is diluted with water and extracted with methylene chloride. The combined organic layers are washed with brine, dried over sodium sulphate, filtered and evaporated under vacuum to yield a yellow solid. The crude product is purified via column chromatography with silica gel and heptane/ethyl acetate (8:2)

3.4 Synthesis of (4-hydroxy-3-methyl-phenyl) 4-triisopropylsilyloxybenzoate 23

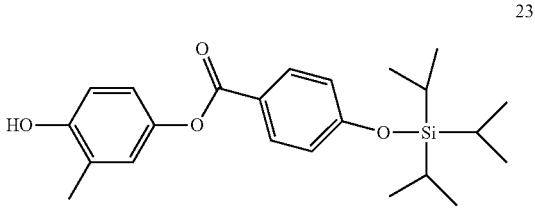 [SMILES: Cc1cc(OC(=O)c2ccc(O[Si](C(C)C)(C(C)C)C(C)C)cc2)ccc1O]

23

9.85 g (20 mmol) of compound 22 are dissolved in 120 mL tetrahydrofuran and 4.56 g (42.8 mmol) Pd—C (5% basic) are added and the reaction mixture is treated with hydrogen atmosphere under normal pressure and room temperature for 45 min. The catalyst was filtered off and the reaction mixture was evaporated under vacuum. The crude product (oil which crystallizes) is purified via column chromatography with 1-chlorbutane and ethyl acetate (8:2). The resulting product is crystallized with acetonitrile.

3.5 Synthesis of [3-methyl-4-[(E)-3-[4-(6-triisopropylsilyloxyhexoxy)-phenyl]prop-2-enoyl]oxy-phenyl] 4-triisopropylsilyloxybenzoate 24

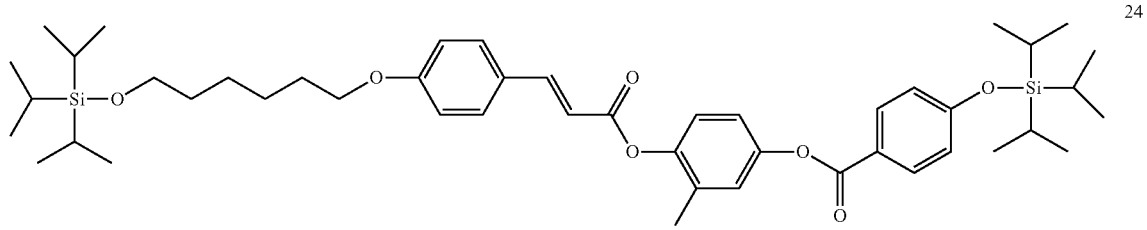 [SMILES: Cc1cc(OC(=O)c2ccc(O[Si](C(C)C)(C(C)C)C(C)C)cc2)ccc1OC(=O)/C=C/c1ccc(OCCCCCCO[Si](C(C)C)(C(C)C)C(C)C)cc1]

6.0 g (15.0 mmol) phenole 23, 6.7 g (16 mmol) acid 11, 0.37 g (3.04 mmol) 4-dimethylaminopyridine are dissolved in 50 mL methylene chloride and 3.5 g (18.2 mmol) N-(3-dimethylaminoproyl)-N'-ethylcarbodiimide hydrochloride is added portionwise to the reaction mixture. The yellow reaction mixture is stirred for 16 h at room temperature (RT), diluted with water an extracted with methylene chloride. The organic layer is dried over sodium sulphate, filtered and evaporated under vacuum. The crude product is crystallized from ethyl acetate to give white crystalline solid.

3.6 Synthesis of [4-[(E)-3-[4-(6-hydroxyhexoxy)phenyl]prop-2-enoyl]oxy-3-methyl-phenyl] 4-hydroxybenzoate 25

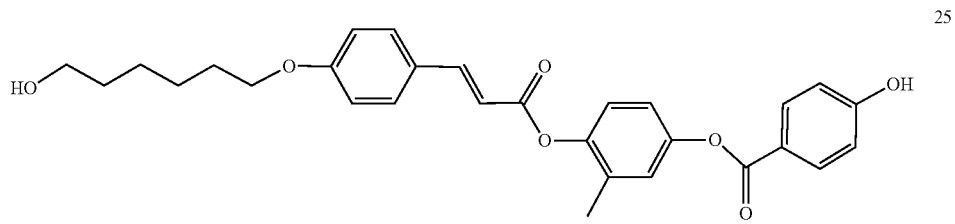 [SMILES: Cc1cc(OC(=O)c2ccc(O)cc2)ccc1OC(=O)/C=C/c1ccc(OCCCCCCO)cc1]

16.1 g (20.0 mmol) cinnamate 24 are dissolved in 125 mL methylene chloride and cooled to 3° C. 15.9 mL (157 mmol) triethylamin tris hydrofluoride are added dropwise. The reaction mixture is then stirred for 16 h at room temperature and poured in water. The layers are separated and the organic layer is washed with brine, dried over sodium sulphate and evaporated under vacuum to give a white solid. The crude product is crystallized out of acetonitrile and the product is obtained as a white crystalline solid.

3.7 Synthesis of [3-methyl-4-[(E)-3-[4-[6-(2-methylprop-2-enoyloxy)hexoxy]phenyl]prop-2-enoyl]oxy-phenyl] 4-(2-methylprop-2-enoyloxy)benzoate 26

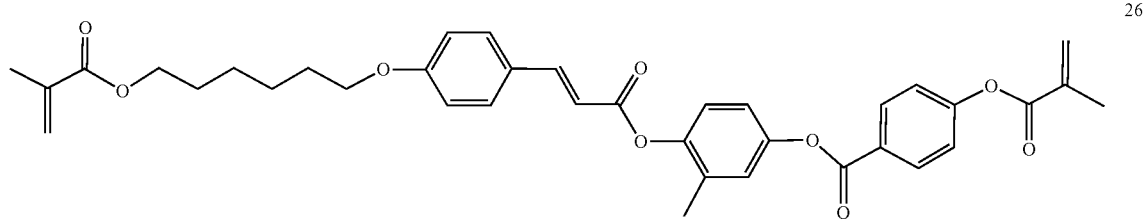 [SMILES: C=C(C)C(=O)OCCCCCCOc1ccc(/C=C/C(=O)Oc2ccc(OC(=O)c3ccc(OC(=O)C(=C)C)cc3)cc2C)cc1]

8.34 g (17.0 mmol) of cinnamate 25 is dissolved in 330 mL methylene chloride. 4.41 g (51.3 mmol) methacrylic acid, 1.43 g (10.16 mmol) 4-dimethylaminopyridine are added to the solution and the mixture is cooled to 3° C. 8.9 mL (51.0 mmol) N-(3-dimethylaminoproyl)-N'-ethylcarbodiimide (dissolved in 77 mL methylene chloride) are added dropwise to the reaction mixture so that the temperature stays below 10° C. The mixture is stirred for further 30 min with ice cooling and is stirred for 16 h at room temperature. During this time the reaction mixture turned to a clear solution. The reaction solution is evaporated under vacuum and purified via column chromatography with 1-chlorobutane and ethyl acetate (9:1). The obtained product is then crystallized from acetonitrile to give a white crystalline solid.

In analogy to Synthesis examples 1 to 3, the following compounds are obtained:

| Nr | Structure |
|---|---|
| 1 | |
| 2 | |
| 3 | |
| 4 | |
| 5 | |
| 6 | |
| 7 | |

-continued

| Nr | Structure |
|---|---|
| 8 | |
| 9 | |
| 10 | |
| 11 | |
| 12 | |
| 13 | |
| 14 | |

| Nr | Structure |
|---|---|
| 15 | (chemical structure) |
| 16 | (chemical structure) |
| 17 | (chemical structure) |
| 18 | (chemical structure) |
| 19 | (chemical structure) |
| 20 | (chemical structure) |
| 21 | (chemical structure) |

| Nr | Structure |
|---|---|
| 22 | |
| 23 | |
| 24 | |
| 25 | |
| 26 | |
| 27 | |
| 28 | |

| Nr | Structure |
|---|---|
| 29 | (structure) |
| 30 | (structure) |
| 31 | (structure) |
| 32 | (structure) |

Fabrication of Display Cells

The display cells are made with raw untreated alkali free glass using 5 μm spacer beads in Norland 65 adhesive. The cells are assembled by hand and then cured using a high pressure mercury lamp with 50 mW/cm$^2$ and 3000 mJ/cm$^2$.

Cell Filling and Curing

The LC mixtures are capillary filled using capillary action at room temp., annealed for 1 h at 100° C. and then irradiated at the same temperature with linearly polarised UV light (50 mW/cm$^2$) for 60 s. The cells are then cooled to room temperature.

Nematic Host Mixtures

The nematic LC host mixture N-1 to N-16 are prepared as indicated in the following tables.

| Mixture N-1: | | | | |
|---|---|---|---|---|
| Composition Compound | | | | |
| No. | Abbreviation | c/% | Physical properties | |
| 1 | CC-3-V | 37.00 | T(N, I) = | 73.5° C. |
| 2 | CCY-3-O1 | 5.00 | $n_e$ (20° C., 589.3 nm) = | 1.583 |
| 3 | CCY-3-O2 | 9.50 | Δn (20° C., 589.3 nm) = | 0.1005 |
| 4 | CCY-4-O2 | 5.00 | $\varepsilon_\perp$ (20° C., 1 kHz) = | 3.70 |
| 5 | CPY-2-O2 | 10.00 | Δε (20° C., 1 kHz) = | −3.65 |
| 6 | CPY-3-O2 | 10.00 | $k_1$ (20° C.) = | 12.7 |
| 7 | CY-3-O2 | 11.50 | $k_3$ (20° C.) = | 14.7 |
| 8 | PY-3-O2 | 12.00 | $\gamma_1$ (20° C.) = | 93 |
| Σ | | 100.0 | | |

| Mixture N-2: | | | | |
|---|---|---|---|---|
| Composition Compound | | | | |
| No. | Abbreviation | c/% | Physical properties | |
| 1 | CC-3-V | 36.00 | T(N, I) = | 78.0° C. |
| 2 | CC-3-V1 | 5.00 | $n_e$ (20° C., 589.3 nm) = | 1.5907 |
| 3 | CCP-V-1 | 8.00 | Δn (20° C., 589.3 nm) = | 0.1095 |
| 4 | PGP-2-2V | 3.00 | $\varepsilon_\parallel$ (20° C., 1 kHz) = | 16.6 |
| 5 | CCQU-3-F | 9.50 | Δε (20° C., 1 kHz) = | 9.6 |
| 6 | PUQU-3-F | 8.50 | $k_1$ (20° C.) = | 12.1 |
| 7 | APUQU-2-F | 5.00 | $k_3$ (20° C.) = | 13.4 |
| 8 | APUQU-3-F | 8.00 | $\gamma_1$ (20° C.) = | 78 |

Mixture N-2:

| No. | Abbreviation | c/% | Physical properties | | |
|---|---|---|---|---|---|
| 9 | PGUQU-3-F | 4.00 | | | |
| 10 | PGUQU-4-F | 8.00 | | | |
| 11 | PGUQU-5-F | 5.00 | | | |
| Σ | | 100.0 | | | |

Mixture N-3:

| No. | Abbreviation | c/% | Physical properties | | |
|---|---|---|---|---|---|
| 1 | APUQU-2-F | 6.00 | T (N, I) = | 73.5° C. | |
| 2 | APUQU-3-F | 6.00 | $n_e$ (20° C., 589.3 nm) = | 1.5902 | |
| 3 | CC-3-V | 44.5 | Δn (20° C., 589.3 nm) = | 0.1086 | |
| 4 | CC-3-V1 | 4.00 | $\varepsilon_\parallel$ (20° C., 1 kHz) = | 12.9 | |
| 5 | CCP-3-OT | 7.00 | Δε (20° C., 1 kHz) = | 9.6 | |
| 6 | CCP-V-1 | 5.00 | $k_1$ (20° C.) = | 12.4 | |
| 7 | CPGU-3-OT | 3.00 | $k_3$ (20° C.) = | 13.8 | |
| 8 | PGP-2-2V | 5.50 | $\gamma_1$ (20° C.) = | 67 | |
| 9 | PGUQU-3-F | 6.00 | | | |
| 10 | PGUQU-4-F | 7.00 | | | |
| 11 | PGUQU-5-F | 3.00 | | | |
| 12 | PUQU-3-F | 6.00 | | | |
| Σ | | 100.0 | | | |

Mixture N-4:

| No. | Abbreviation | c/% | Physical properties | |
|---|---|---|---|---|
| 1 | CC-3-V | 44.00 | T (N, I) [° C.] = | 80.5 |
| 2 | CC-3-V1 | 12.00 | $n_e$ (20° C., 589.3 nm) = | 1.5865 |
| 3 | CCP-V-1 | 11.00 | Δn (20° C., 589.3 nm) = | 0.0991 |
| 4 | CCP-V2-1 | 9.00 | $\varepsilon_\parallel$ (20° C., 1 kHz) = | 5.3 |
| 5 | PGP-2-3 | 6.00 | Δε (20° C., 1 kHz) = | 2.7 |
| 6 | PGUQU-3-F | 6.00 | $k_1$ (20° C.) = | 14.6 |
| 7 | APUQU-3-F | 4.50 | $k_3$ (20° C.) = | 15.9 |
| 8 | PP-1-2V1 | 7.00 | $\gamma_1$ (20° C.) [mPa s] = | 53 |
| 9 | PPGU-3-F | 0.50 | | |
| Σ | | 100.0 | | |

Mixture N-5:

| No. | Abbreviation | c/% | Physical properties | |
|---|---|---|---|---|
| 1 | CC-3-V | 37.00 | T (N, I) = | 94.5 |
| 2 | CC-3-V1 | 9.50 | $n_e$ (20° C., 589.3 nm) = | 1.5894 |
| 3 | CCP-V-1 | 11.50 | Δn (20° C., 589.3 nm) = | 0.1049 |
| 4 | CCP-V2-1 | 3.00 | $\varepsilon_\parallel$ (20° C., 1 kHz) = | 7.8 |
| 5 | PGP-2-2V | 10.50 | Δε (20° C., 1 kHz) = | 4.9 |
| 6 | APUQU-3-F | 5.00 | $k_1$ (20° C.) = | 15.6 |
| 7 | APUQU-2-F | 5.00 | $k_3$ (20° C.) = | 17.1 |
| 8 | PGUQU-4-F | 3.50 | $\gamma_1$ (20° C.) [mPa s] = | 67 |
| 9 | PGUQU-3-F | 2.00 | | |
| 10 | CCP-3-OT | 9.00 | | |
| 11 | CCP-5-OT | 2.00 | | |
| 12 | CCQU-3-F | 2.00 | | |
| Σ | | 100.0 | | |

Mixture N-6:

| No. | Abbreviation | c/% | Physical properties | |
|---|---|---|---|---|
| 1 | CC-3-V | 34.00 | T (N, I) [° C.] = | 100 |
| 2 | CC-3-V1 | 2.50 | $n_e$ (20° C., 589.3 nm) = | 1.5782 |
| 3 | CCP-V-1 | 10.00 | Δn (20° C., 589.3 nm) = | 0.1003 |
| 4 | PUQU-3-F | 7.00 | $\varepsilon_\parallel$ (20° C., 1 kHz) = | 12.3 |
| 5 | PGUQU-n-F | 4.00 | Δε (20° C., 1 kHz) = | 9.1 |
| 6 | CPGU-3-OT | 6.00 | $k_1$ (20° C.) = | 14.2 |
| 7 | CCGU-3-F | 4.00 | $k_3$ (20° C.) = | 17.3 |
| 8 | APUQU-3-F | 8.00 | $\gamma_1$ (20° C.) [mPa s] = | 99 |
| 9 | CCU-3-F | 4.50 | | |
| 10 | CCP-3-OT | 4.00 | | |
| 11 | CCP-5-OT | 3.00 | | |
| 12 | CCQU-3-F | 10.00 | | |
| 13 | CPPC-3-3 | 3.00 | | |
| Σ | | 100.0 | | |

Mixture N-7:

| No. | Abbreviation | c/% | Physical properties | |
|---|---|---|---|---|
| 1 | CC-3-V | 40.50 | T (N, I) [° C.] = | 80 |
| 2 | CC-3-V1 | 6.00 | $n_e$ (20° C., 589.3 nm) = | 1.5996 |
| 3 | CCP-V-1 | 9.50 | Δn (20° C., 589.3 nm) = | 0.1127 |
| 4 | CPU-3-F | 7.00 | $\varepsilon_\parallel$ (20° C., 1 kHz) = | 10.1 |
| 5 | CPGU-3-OT | 5.00 | Δε (20° C., 1 kHz) = | 6.9 |
| 6 | APUQU-2-F | 5.00 | $k_1$ (20° C.) = | 13.2 |
| 7 | APUQU-3-F | 7.50 | $k_3$ (20° C.) = | 13.3 |
| 8 | PGP-2-3 | 6.00 | $\gamma_1$ (20° C.) [mPa s] = | 63 |
| 9 | PGP-2-4 | 6.00 | | |
| 10 | PPGU-3-F | 0.50 | | |
| 11 | PUQU-3-F | 7.00 | | |
| Σ | | 100.0 | | |

Mixture N-8:

| No. | Abbreviation | c/% | Physical properties | |
|---|---|---|---|---|
| 1 | CGPC-3-3 | 3.00 | T (N, I) [° C.] = | 90.4 |
| 2 | CGPC-5-3 | 3.00 | $n_e$ (20° C., 589.3 nm) = | 1.5760 |
| 3 | CC-3-V | 42.50 | Δn (20° C., 589.3 nm) = | 0.0913 |
| 4 | CC-3-V1 | 8.00 | $\varepsilon_\parallel$ (20° C., 1 kHz) = | 7.0 |
| 5 | CCP-3-1 | 5.00 | Δε (20° C., 1 kHz) = | 4.3 |
| 6 | CCP-3-3 | 5.00 | $k_1$ (20° C.) = | 14.3 |

Mixture N-8:

Composition Compound

| No. | Abbreviation | c/% | Physical properties | |
|---|---|---|---|---|
| 7 | CCP-V-1 | 12.00 | $k_3$ (20° C.) = | 18.1 |
| 8 | CCP-V2-1 | 3.50 | $\gamma_1$ (20° C.) [mPa s] = | 77 |
| 9 | DGUQU-4-F | 2.00 | | |
| 10 | PGUQU-3-F | 1.50 | | |
| 11 | PGUQU-4-F | 1.00 | | |
| 12 | PGUQU-5-F | 3.00 | | |
| 13 | PPGU-3-F | 0.50 | | |
| 14 | PUQU-3-F | 10.00 | | |
| Σ | | 100.00 | | |

Mixture N-9:

Composition Compound

| No. | Abbreviation | c/% | Physical properties | |
|---|---|---|---|---|
| 1 | APUQU-2-F | 6.00 | T (N, I) [° C.] = | 79.5 |
| 2 | APUQU-3-F | 6.00 | $n_e$ (20° C., 589.3 nm) = | 1.5937 |
| 3 | CC-3-V | 44.50 | Δn (20° C., 589.3 nm) = | 0.1095 |
| 4 | CCP-V-1 | 12.50 | $\varepsilon_\parallel$ (20° C., 1 kHz) = | 15.1 |
| 5 | CPGU-3-OT | 5.00 | Δε (20° C., 1 kHz) = | 11.6 |
| 6 | DPGU-4-F | 2.00 | $k_1$ (20° C.) = | 11.9 |
| 7 | PGP-2-2V | 1.50 | $k_3$ (20° C.) = | 13.5 |
| 8 | PGUQU-3-F | 4.50 | $\gamma_1$ (20° C.) [mPa s] = | 72 |
| 9 | PGUQU-4-F | 8.00 | | |
| 10 | PUQU-3-F | 10.00 | | |
| Σ | | 100.00 | | |

Mixture N-10:

Composition Compound

| No. | Abbreviation | c/% | Physical properties | |
|---|---|---|---|---|
| 1 | APUQU-2-F | 6.00 | T (N, I) [° C.] = | 94.6 |
| 2 | APUQU-3-F | 6.00 | $n_e$ (20° C., 589.3 nm) = | 1.5767 |
| 3 | PGUQU-3-F | 3.00 | Δn (20° C., 589.3 nm) = | 0.0919 |
| 4 | CCGU-3-F | 4.00 | $\varepsilon_\parallel$ (20° C., 1 kHz) = | 7.0 |
| 5 | CC-3-V | 42.00 | Δε (20° C., 1 kHz) = | 4.3 |
| 6 | CC-3-V1 | 8.00 | $k_1$ (20° C.) = | 15.0 |
| 7 | PP-1-2V1 | 3.00 | $k_3$ (20° C.) = | 18.8 |
| 8 | CCP-V-1 | 15.50 | $\gamma_1$ (20° C.) [mPa s] = | 75 |
| 9 | CCP-V2-1 | 15.50 | | |
| 10 | PPGU-3-F | 0.50 | | |
| Σ | | 100.00 | | |

Mixture N-11:

Composition Compound

| No. | Abbreviation | c/% | Physical properties | |
|---|---|---|---|---|
| 1 | CC-3-V | 36.00 | T (N, I) [° C.] = | 78 |
| 2 | CC-3-V1 | 5.00 | $n_e$ (20° C., 589.3 nm) = | 1.5907 |
| 3 | CCP-V-1 | 8.00 | Δn (20° C., 589.3 nm) = | 0.1095 |
| 4 | PGP-2-2V | 3.00 | $\varepsilon_\parallel$ (20° C., 1 kHz) = | 16.6 |
| 5 | CCQU-3-F | 9.50 | Δε (20° C., 1 kHz) = | 12.9 |
| 6 | PUQU-3-F | 8.50 | $k_1$ (20° C.) = | 12.1 |
| 7 | APUQU-2-F | 5.00 | $k_3$ (20° C.) = | 13.4 |
| 8 | APUQU-3-F | 8.00 | $\gamma_1$ (20° C.) [mPa s] = | 78 |
| Σ | PGUQU-3-F | 4.00 | | |
|  | PGUQU-4-F | 8.00 | | |
|  | PGUQU-5-F | 5.00 | | |
|  | | 100.00 | | |

Mixture N-12:

Composition Compound

| No. | Abbreviation | c/% | Physical properties | |
|---|---|---|---|---|
| 1 | APUQU-2-F | 6.00 | T (N, I) [° C.] = | 94 |
| 2 | APUQU-3-F | 8.00 | $n_e$ (20° C., 589.3 nm) = | 1.5776 |
| 3 | CDUQU-3-F | 10.00 | Δn (20° C., 589.3 nm) = | 0.1038 |
| 4 | DGUQU-4-F | 4.00 | $\varepsilon_\parallel$ (20° C., 1 kHz) = | 21.1 |
| 5 | DPGU-4-F | 5.00 | Δε (20° C., 1 kHz) = | 17.3 |
| 6 | PGUQU-3-F | 3.00 | $k_1$ (20° C.) = | 15.9 |
| 7 | PGUQU-4-F | 7.00 | $k_3$ (20° C.) = | 16.1 |
| 8 | CCQU-3-F | 9.00 | $\gamma_1$ (20° C.) [mPa s] = | 111 |
| 9 | CC-3-2V1 | 10.00 | | |
| 10 | CC-3-V | 24.50 | | |
| 11 | CC-3-V1 | 9.50 | | |
| 12 | CCP-3-OT | 4.00 | | |
| Σ | | 100.00 | | |

Mixture N-13:

Composition Compound

| No. | Abbreviation | c/% | Physical properties | |
|---|---|---|---|---|
| 1 | CC-3-V | 30.00 | T (N, I) [° C.] = | 87 |
| 2 | CC-3-V1 | 10.00 | $n_e$ (20° C., 589.3 nm) = | 1.5829 |
| 3 | CC-3-4 | 2.50 | Δn (20° C., 589.3 nm) = | 0.1019 |
| 4 | CCP-V-1 | 1.50 | $\varepsilon_\parallel$ (20° C., 1 kHz) = | 3.5 |
| 5 | PGIY-2-O4 | 4.00 | Δε (20° C., 1 kHz) = | −3.7 |
| 6 | CCY-3-O2 | 10.00 | $k_1$ (20° C.) = | 15.2 |
| 7 | CCY-5-O2 | 2.00 | $k_3$ (20° C.) = | 18.0 |
| 8 | CLY-3-O2 | 8.00 | $\gamma_1$ (20° C.) [mPa s] = | 112 |
| 9 | CPY-2-O2 | 6.00 | | |
| 10 | CPY-3-O2 | 10.00 | | |
| 11 | CY-3-O2 | 12.00 | | |
| 12 | B-2O-O5 | 4.00 | | |
| Σ | | 100.00 | | |

Mixture N-14:

Composition Compound

| No. | Abbreviation | c/% | Physical properties | |
|---|---|---|---|---|
| 1 | CPP-3-2 | 4.50 | T (N, I) [° C.] = | 86 |
| 2 | CC-3-V | 23.50 | $n_e$ (20° C., 589.3 nm) = | 1.5962 |
| 3 | CC-3-O1 | 4.00 | Δn (20° C., 589.3 nm) = | 0.1118 |

Mixture N-14:

Composition

| No. | Abbreviation | c/% |
|-----|--------------|-----|
| 4 | CCY-3-O2 | 4.00 |
| 5 | CCY-3-O3 | 7.00 |
| 6 | CCY-4-O2 | 8.00 |
| 7 | CLY-3-O2 | 8.00 |
| 8 | CPY-2-O2 | 7.00 |
| 9 | CPY-3-O2 | 11.00 |
| 10 | CY-3-O2 | 11.00 |
| 11 | PY-3-O2 | 12.00 |
| Σ | | 100.00 |

Physical properties

| | |
|---|---|
| $\varepsilon_\parallel$ (20° C., 1 kHz) = | 3.7 |
| $\Delta\varepsilon$ (20° C., 1 kHz) = | -4.3 |
| $k_1$ (20° C.) = | 15.0 |
| $k_3$ (20° C.) = | 16.7 |
| $\gamma_1$ (20° C.) [mPa s] = | 143 |

Mixture N-15:

Composition

| No. | Abbreviation | c/% |
|-----|--------------|-----|
| 1 | CC-3-V | 37.00 |
| 2 | PY-3-O2 | 11.50 |
| 3 | CCY-3-O2 | 5.00 |
| 4 | CY-3-O2 | 11.50 |
| 5 | CCY-3-O1 | 5.00 |
| 6 | CCY-4-O2 | 4.00 |
| 7 | CLY-3-O2 | 7.00 |
| 8 | CPY-2-O2 | 9.00 |
| 9 | CPY-3-O2 | 10.00 |
| Σ | | 100.00 |

Physical properties

| | |
|---|---|
| T (N, I) [° C.] = | 75.2 |
| $n_e$ (20° C., 589.3 nm) = | 1.5837 |
| $\Delta n$ (20° C., 589.3 nm) = | 0.1016 |
| $\varepsilon_\parallel$ (20° C., 1 kHz) = | 3.7 |
| $\Delta\varepsilon$ (20° C., 1 kHz) = | -3.7 |
| $k_1$ (20° C.) = | 13.2 |
| $k_3$ (20° C.) = | 15.2 |
| $\gamma_1$ (20° C.) [mPa s] = | 99 |

Mixture N-16:

Composition

| No. | Abbreviation | c/% |
|-----|--------------|-----|
| 1 | CCY-3-O1 | 6.00 |
| 2 | CC-3-V | 31.50 |
| 3 | CPY-2-O2 | 10.00 |
| 4 | CPY-3-O2 | 10.00 |
| 5 | PYP-2-3 | 4.00 |
| 6 | CCY-3-O2 | 6.00 |
| 7 | CCY-4-O2 | 2.00 |
| 8 | CLY-3-O2 | 5.00 |
| 9 | CY-3-O2 | 15.00 |
| 10 | CY-5-O2 | 5.00 |
| 11 | CY-3-O4 | 5.50 |
| Σ | | 100.00 |

Physical properties

| | |
|---|---|
| T (N, I) [° C.] = | 75.5 |
| $n_e$ (20° C., 589.3 nm) = | 1.5823 |
| $\Delta n$ (20° C., 589.3 nm) = | 0.1011 |
| $\varepsilon_\parallel$ (20° C., 1 kHz) = | 3.8 |
| $\Delta\varepsilon$ (20° C., 1 kHz) = | -4.1 |
| $k_1$ (20° C.) = | 13.3 |
| $k_3$ (20° C.) = | 15.1 |
| $\gamma_1$ (20° C.) [mPa s] = | 113 |

Mixture Examples

Nematic LC mixtures M-1 to M-16 according to the invention are prepared from the nematic host mixtures N-1 to N-16 listed above and photoalignment additives of formula I, according to the compositions given in the following table.

| Mixture example | Host Mixture | c [%] of Host Mixture | Photoalignment additive Compound | c [%] |
|---|---|---|---|---|
| M-1 | N-1 | 99.00 | Synthesis Example 1 | 1.00 |
| M-2 | N-2 | 99.00 | Synthesis Example 1 | 1.00 |
| M-3 | N-3 | 99.00 | Synthesis Example 1 | 1.00 |
| M-4 | N-4 | 99.00 | Synthesis Example 1 | 1.00 |
| M-5 | N-5 | 99.00 | Synthesis Example 1 | 1.00 |
| M-6 | N-6 | 99.00 | Synthesis Example 1 | 1.00 |
| M-7 | N-7 | 99.00 | Synthesis Example 1 | 1.00 |
| M-8 | N-8 | 99.00 | Synthesis Example 1 | 1.00 |
| M-9 | N-9 | 99.00 | Synthesis Example 1 | 1.00 |
| M-10 | N-10 | 99.00 | Synthesis Example 1 | 1.00 |
| M-11 | N-11 | 99.00 | Synthesis Example 1 | 1.00 |
| M-12 | N-12 | 99.00 | Synthesis Example 1 | 1.00 |
| M-13 | N-13 | 99.00 | Synthesis Example 1 | 1.00 |
| M-14 | N-14 | 99.00 | Synthesis Example 1 | 1.00 |
| M-15 | N-15 | 99.00 | Synthesis Example 1 | 1.00 |
| M-16 | M-16 | 99.00 | Synthesis Example 1 | 1.00 |

Alignment Experiments

Test displays are fabricated using raw untreated glass or ITO glass, are then filled with a nematic mixture according to mixture examples M-1 and M-2, respectively, and then cured, as described above.

Next, the alignment quality is studied between crossed polarisers on a light box. A good dark state is observed when the cells are placed between crossed polarisers. A good transmissive state is observed when the cells are rotated by 45°.

This shows, that excellent uniform planar alignment is achieved with mixtures from examples M1 and M-2.

In a comparative experiment, a test display is filled with a nematic host mixture N-1 without a photoalignment additive of formula I and is cured in the same way as described for Mixture Examples M-1 and M-2 according to the invention. In the comparative experiment, under all polarizer configurations an inhomogeneous transmissive state is observed.

The invention claimed is:

1. A liquid crystalline mixture comprising a photoalignment component A) comprising one or more photoreactive compounds of formula I, and a liquid-crystalline component B), comprising one or more mesogenic liquid-crystalline compounds,
wherein formula I is as follows:

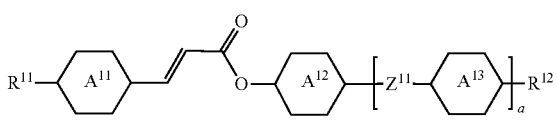

wherein
$A^{11}$ denotes an aryl or heteroaryl group, which may be substituted by one or more radicals L,
$A^{12}$, $A^{13}$ are each, independently of one another, defined like $A^{11}$ or denote a cycloalkyl group having 3 to 10 C atoms, in which 1 to 4 non-adjacent $CH_2$ groups may be replaced by O and in which one or more H atoms may be replaced by a group L,
L on each occurrence, identically or differently, denotes OH, F, Cl, Br, I, —CN, —$NO_2$, $SF_5$, —NCO, —NCS, —OCN, —SCN, —C(=O)N(R$^z$)$_2$, —C(=O)R$^z$, —N(R$^z$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, Z$^{11}$ on each occurrence, identically or differently, denotes —CH$_2$CH$_2$—, —CF$_2$CF$_2$—, —CF$_2$CH$_2$—, —CH$_2$CF$_2$—, —C(O)O—, —OC(O)—, —CH=CH—COO—, —OCO—CH=CH—, or a single bond, R$^{11}$ and R$^{12}$ identically or differently, denote a group P-Sp-, or halogen, CN, optionally fluorinated alkyl or alkenyl with up to 15 C atoms in which one or more non adjacent CH$_2$-groups may be replaced by —O—, —S—, —CO—, —C(O)O—, —O—C(O)—, O—C(O)—O—, with the proviso that at least one of R$^{11}$ and R$^{12}$ denotes a group P-Sp-, R$^z$ each, independently of one another, denote H or alkyl having 1-12 C atoms, P a polymerisable group, Sp a spacer group or a single bond, a denotes 0 to 1.

2. The liquid crystalline mixture according to claim 1, wherein component A) comprises one or more compounds of formula I of formulae I-1 to I-8

I-1
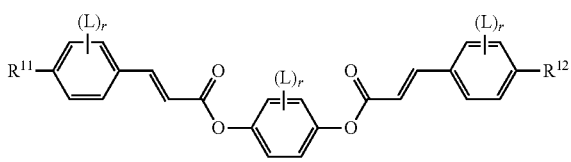

I-2
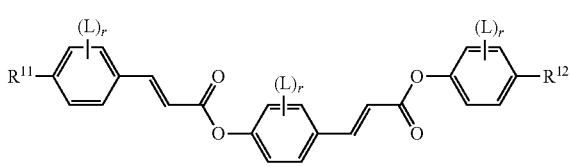

I-3
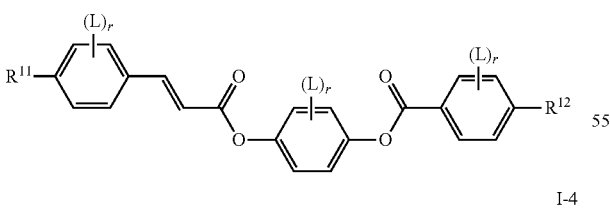

I-4
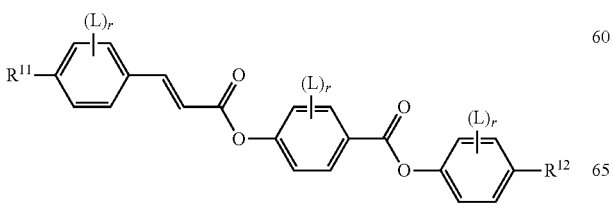

I-5
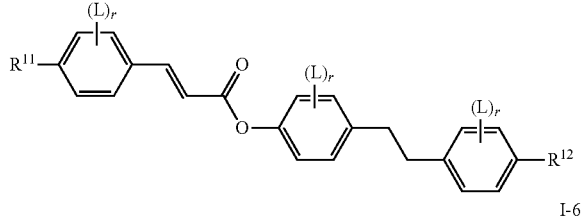

I-6
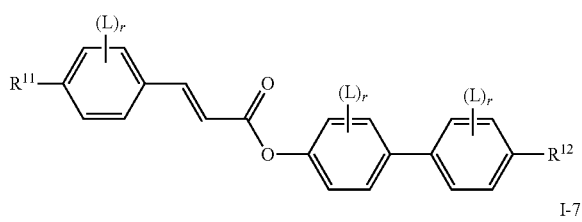

I-7
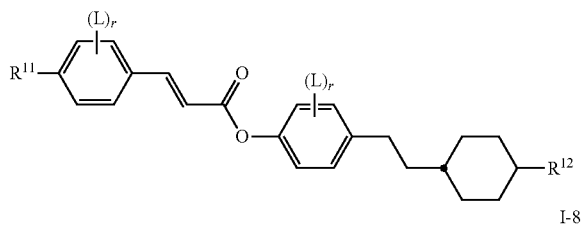

I-8 wherein R$^{11}$ and R$^{12}$ and L are defined as indicated in claim 1, and r, on each occurrence, identically or differently, is 0, 1 or 2.

3. The liquid crystalline mixture according to claim 1, wherein the total concentration of compounds of formula I in the mixture is from 0.01 to 10% by weight.

4. The liquid crystalline mixture according to claim 1, additionally comprising a polymerisable component C) comprising one or more compounds of formula P P$^a$-(Sp$^a$)$_{s1}$-A$^2$-(Z$^1$-

A$^1$)$_{n2}$-(Sp$^b$)$_{s2}$-P$^b$      P wherein

P$^a$, P$^b$ each, independently of one another, denote a polymerisable group,

Sp$^a$, Sp$^b$ on each occurrence, identically or differently, denote a spacer group, s1, s2 each, independently of one another, are 0 or 1, A$^1$, A$^2$ each, independently of one another, denote:
  a) trans-1,4-cyclohexylene, 1,4-cyclohexenylene or 4,4"-bicyclohexylene, wherein, in addition, one or more non-adjacent CH$_2$ groups may be replaced by —O— and/or —S— and wherein, in addition, one or more H atoms may be replaced by F,
  b) 1,4-phenylene or 1,3-phenylene, wherein, in addition, one or two CH groups may be replaced by N and wherein, in addition, one or more H atoms may be replaced by L,
  c) tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl or selenophene-2,5-diyl, each of which may also be mono- or polysubstituted by L, d) saturated, partially unsaturated or fully unsaturated, optionally substituted, polycyclic radicals having 5 to 20 cyclic C atoms, one or more of which may, in addition, be replaced by heteroatoms, selected from:

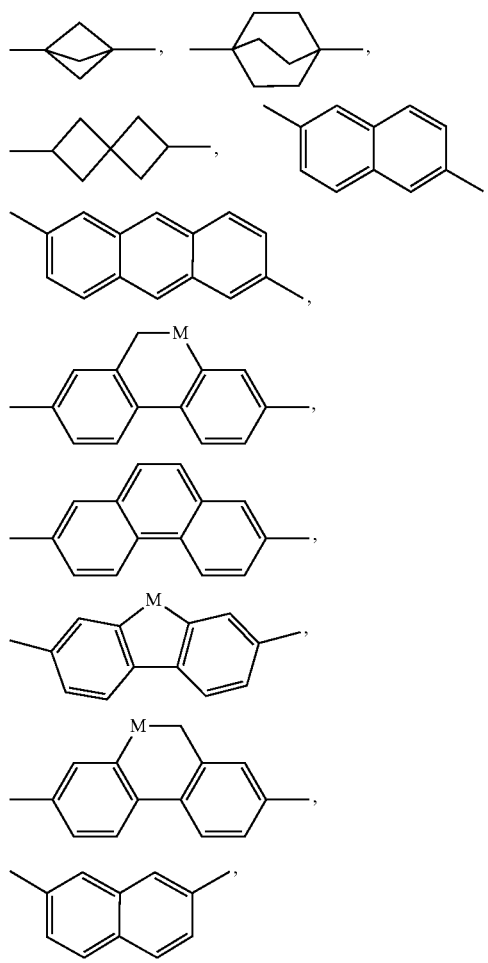

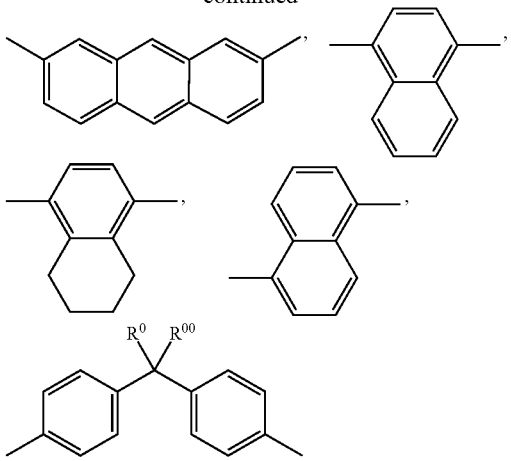

where, in addition, one or more H atoms in these radicals may be replaced by L, and/or one or more double bonds may be replaced by single bonds, and/or one or more CH groups may be replaced by N, n2 is 0, 1, 2 or 3, $Z^1$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^0$R$^{00}$)—, —CH$_2$CF$_2$—, —CF$_2$CF$_2$— or a single bond, L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having up to 12 C atoms, $R^0$, $R^{00}$ each, independently of one another, denote H, F or straight-chain or branched alkyl having 1 to 12 C atoms, wherein, in addition, one or more H atoms may be replaced by F, M denotes —O—, —S—, —CH$_2$—, —CHY$^1$— or —CY$^1$Y$^2$—, and $Y^1$ and $Y^2$ each, independently of one another, have one of the meanings indicated above for $R^0$ or denote Cl or CN.

5. The liquid crystalline mixture according to claim 1, wherein the concentration of polymerisable compounds of formula P is 0.01 to 10% by weight.

6. The liquid crystalline mixture according to claim 1, additionally comprising one or more compounds of formula P of the sub-formulae P10-1-1 or P10-1-2

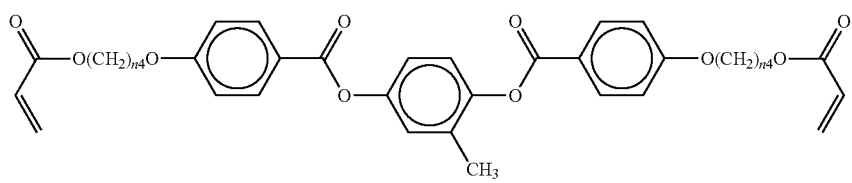

P10-1-1

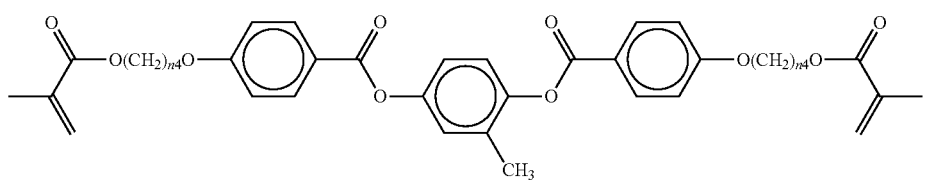

P10-1-2 wherein n4 is an integer from 1 to 10.

7. The liquid crystalline mixture according to claim 1, wherein the LC host mixture has negative dielectric anisotropy.

8. The liquid crystalline mixture according to claim 1, wherein the LC host mixture comprises one or more compounds of the following formulae:

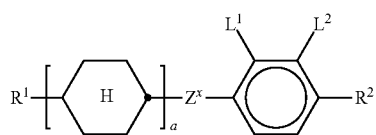

CY

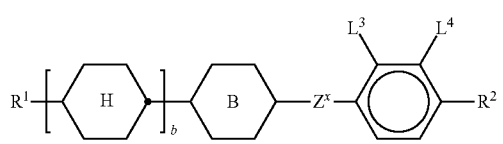

PY wherein a is 1 or 2, b is 0 or 1,

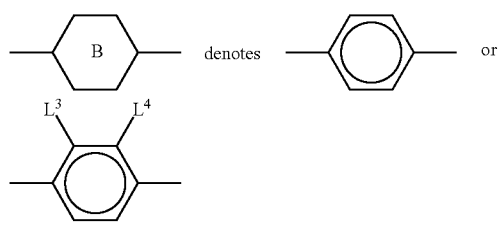

$R^1$ and $R^2$ each, independently of one another, denote alkyl having 1 to 12 C atoms, where, in addition, one or two non-adjacent $CH_2$ groups may be replaced by —O—, —CH=CH—, —CO—, —O—CO— or —CO—O— in such a way that O atoms are not linked directly to one another, $Z^x$ denotes —CH=CH—, —$CH_2$O—, —$OCH_2$—, —$CF_2$O—, —$OCF_2$—, —O—, —$CH_2$—, —$CH_2CH_2$— or a single bond, $L^{1-4}$ each, independently of one another, denote F, Cl, $OCF_3$, $CF_3$, $CH_3$, $CH_2F$, $CHF_2$.

9. The liquid crystalline mixture according to claim 1, wherein the LC host mixture has positive dielectric anisotropy.

10. The liquid crystalline mixture according to claim 1, wherein the LC host mixture comprises one or more compounds of formulae II or III,

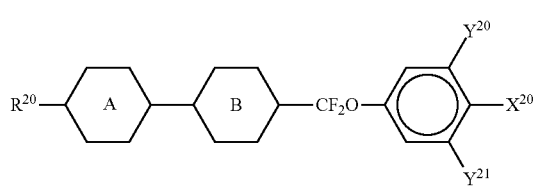

II

-continued

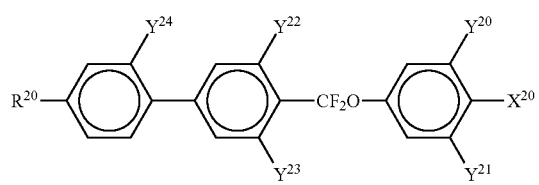

III wherein $R^{20}$ each, identically or differently, denote a halogenated or unsubstituted alkyl or alkoxy radical having 1 to 15 C atoms, where, in addition, one or more $CH_2$ groups in these radicals may each be replaced, independently of one another, by —C≡C—, —$CF_2$O—, —CH=CH—,

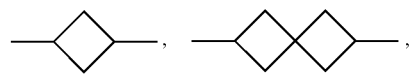

—O—, —CO—O— or —O—CO— in such a way that O atoms are not linked directly to one another, $X^{20}$ each, identically or differently, denote F, Cl, CN, $SF_5$, SCN, NCS, a halogenated alkyl radical, a halogenated alkenyl radical, a halogenated alkoxy radical or a halogenated alkenyloxy radical, each having up to 6 C atoms, and $Y^{20-24}$ each, identically or differently, denote H or F,

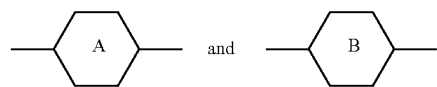

each, identically or differently, denote

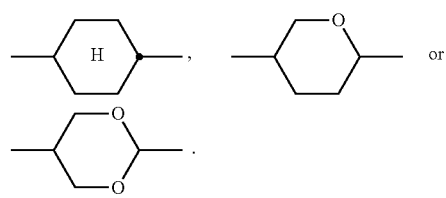

11. The liquid crystalline mixture according to claim 1, further comprising one or more compounds of formulae XI or XII

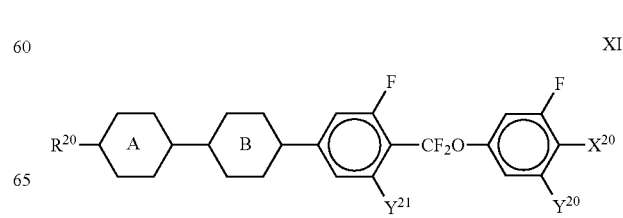

XI

-continued

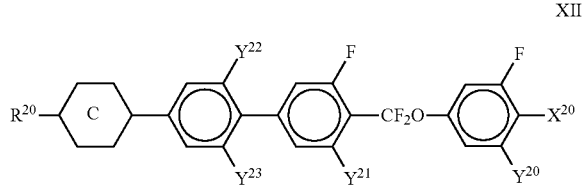

wherein
R²⁰ each, identically or differently, denote a halogenated or unsubstituted alkyl or alkoxy radical having 1 to 15 C atoms, where, in addition, one or more CH₂ groups in these radicals may each be replaced, independently of one another, by —C≡C—, —CF₂O—, —CH=CH—,

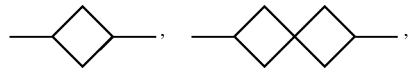

—O—, —CO—O— or —O—CO— in such a way that O atoms are not linked directly to one another, X²⁰ each, identically or differently, denote F, Cl, CN, SF₅, SCN, NCS, a halogenated alkyl radical, a halogenated alkenyl radical, a halogenated alkoxy radical or a halogenated alkenyloxy radical, each having up to 6 C atoms, and Y²⁰⁻²³ each, identically or differently, denote H or F, and

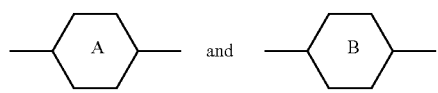

each, independently of one another, denote

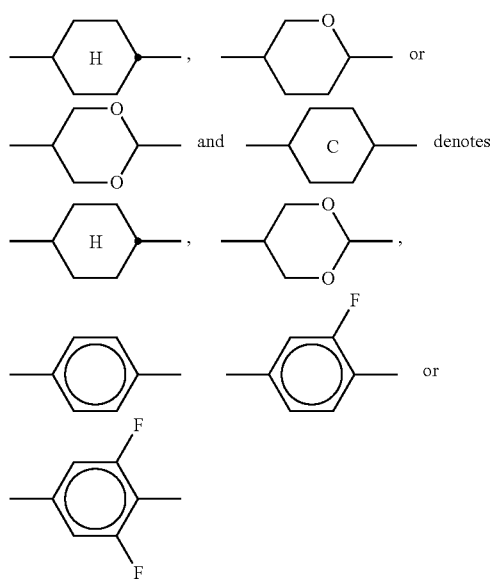

12. The liquid crystalline mixture according to claim 1, wherein the LC host mixture comprises one or more compounds of the following formula:

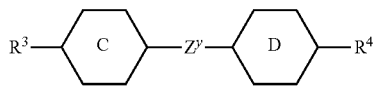

wherein the individual radicals have the following meanings:

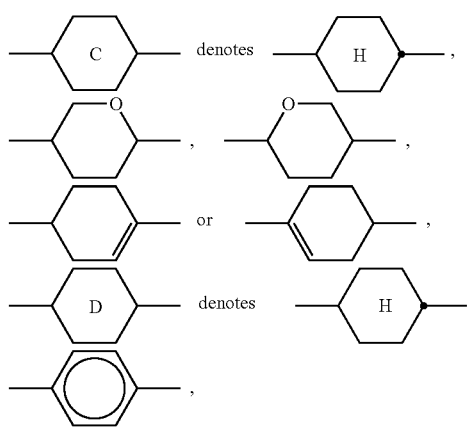

R³ and R⁴ each, independently of one another, denote alkyl having 1 to 12 C atoms, wherein, in addition, one or two non-adjacent CH₂ groups may be replaced by —O—, —CH=CH—, —CO—, —O—CO— or —CO—O— in such a way that O atoms are not linked directly to one another, Z^y denotes —CH₂CH₂—, —CH=CH—, —CF₂O—, —OCF₂—, —CH₂O—, —OCH₂—, —COO—, —OCO—, —C₂F₄—, —CF=CF— or a single bond.

13. The liquid crystalline mixture according to claim 1, wherein the LC host mixture comprises one or more compounds of the following formulae:

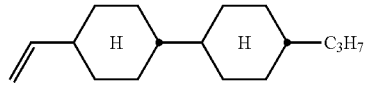

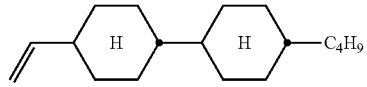

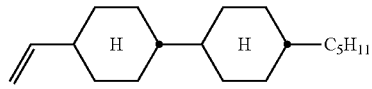

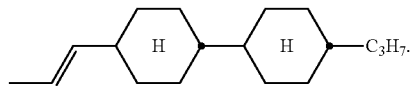

14. A process for the fabrication of a liquid crystal display, comprising at least:
providing a first substrate which includes a pixel electrode and a common electrode for generating an electric field substantially parallel to a surface of the first substrate in a pixel region;
providing a second substrate, the second substrate being disposed opposite to the first substrate;

interposing a liquid crystal mixture according to claim 1 as a liquid crystal layer between the first and second substrates;

irradiating the liquid crystal mixture with linearly polarised light causing photoalignment of the liquid crystal layer;

curing polymerisable compounds of the liquid crystal layer by irradiation with ultraviolet light or visible light having a wavelength of 450 nm or below.

15. The process according to claim 14, wherein the linearly polarised light is ultraviolet light or visible light having a wavelength of 450 nm or below.

16. A display produced by a process according to claim 14.

17. The display according to claim 16, wherein the display is an IPS or FFS display.

18. The display according to claim 16, in which both the first and the second substrate contain a rubbed or unrubbed polyimide layer.

19. The display according to claim 16, in which (1) none or (2) only one of the first and second substrates contains a polyimide layer.

20. A compound of formula I $$R^{11}-A^{11}-CH=CH-C(=O)-O-A^{12}-[Z^{11}-A^{13}]_a-R^{12} \quad I$$

wherein $A^{11}$ denotes an aryl or heteroaryl group, which may be substituted by one or more radicals L, $A^{12}$, $A^{13}$ are each, independently of one another, defined like $A^{11}$ or denote a cycloalkyl group having 3 to 10 C atoms, in which 1 to 4 non-adjacent $CH_2$ groups may be replaced by O and in which one or more H atoms may be replaced by a group L, L on each occurrence, identically or differently, denotes OH, F, Cl, Br, I, —CN, —NO$_2$, SF$_5$, —NCO, —NCS, —OCN, —SCN, —C(=O)N(R$^z$)$_2$, —C(=O)R$^z$, —N(R$^z$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, $Z^{11}$ on each occurrence, identically or differently, denotes —CH$_2$CH$_2$—, —CF$_2$CF$_2$—, —CF$_2$CH$_2$—, —CH$_2$CF$_2$—, —C(O)O—, —OC(O)—, —CH=CH—COO—, or a single bond, $R^{11}$ denotes a group P-Sp- in which Sp is a spacer group or a single bond, or $R^{11}$ denotes halogen, CN, optionally fluorinated alkyl or alkenyl with up to 15 C atoms in which one or more non adjacent CH$_2$-groups may be replaced by —O—, —S—, —CO—, —C(O)O—, —O—C(O)—, O—C(O)—O—, $R^{12}$ denotes P-Sp, in which Sp is a single bond, $R^z$ each, independently of one another, denote H or alkyl having 1-12 C atoms, P a polymerisable group, a denotes 0 or 1, wherein one or both of the groups Sp denote a single bond.

* * * * *